(12) United States Patent
Norman et al.

(10) Patent No.: US 7,277,429 B2
(45) Date of Patent: *Oct. 2, 2007

(54) CELL-BASED SWITCH FABRIC WITH DISTRIBUTED SCHEDULING

(75) Inventors: Richard S. Norman, Sutton (CA); Marcelo De Maria, Montreal (CA); Sébastien Côté, St-Bruno (CA); Carl Langlois, Montreal (CA); John Haughey, Richford, VT (US); Yves Boudreault, Ottawa (CA)

(73) Assignee: 4198638 Canada Inc., Montreal, Quebec (CA)

( * ) Notice: Subject to any disclaimer, the term of this patent is extended or adjusted under 35 U.S.C. 154(b) by 1032 days.

This patent is subject to a terminal disclaimer.

(21) Appl. No.: 09/870,800

(22) Filed: Jun. 1, 2001

(65) Prior Publication Data

US 2002/0181454 A1    Dec. 5, 2002

(51) Int. Cl.
    *H04L 12/28* (2006.01)
(52) U.S. Cl. .......... 370/389; 370/386; 370/412; 370/429; 370/395.1; 710/102; 710/106
(58) Field of Classification Search ........... 370/395.1, 370/389, 412, 413, 415, 428, 429; 710/102, 710/106, 3
See application file for complete search history.

(56) References Cited

U.S. PATENT DOCUMENTS

| | | | |
|---|---|---|---|
| 4,849,751 A | 7/1989 | Barber et al. | |
| 4,955,020 A | 9/1990 | Stone et al. | |
| 5,008,878 A | 4/1991 | Ahmadi et al. | |
| 5,043,980 A | 8/1991 | Day, Jr. et al. | |
| 5,072,366 A | 12/1991 | Simcoe | |
| 5,189,672 A * | 2/1993 | Le Bihan | 370/399 |
| 5,247,513 A | 9/1993 | Henrion et al. | |

(Continued)

FOREIGN PATENT DOCUMENTS

EP    0 241 152 A2    10/1987

(Continued)

OTHER PUBLICATIONS

Notani H et al: "An 8*8 ATM switch LSI with shared multi-buffer architecture" Proceedings of the Symposium on VLSI Circuits, Seattle, Jun. 4-6, 1992, Symposium on VLSI Circuits, New York, IEEE, US, Jun. 4, 1992, pp. 74-75, XP010064987.

(Continued)

*Primary Examiner*—Edan Orgad
*Assistant Examiner*—Andrew C. Lee

(57) ABSTRACT

A switch fabric implemented on a chip includes an array of cells and an I/O interface in communication with the array of cells for permitting exchange of data packets between said array of cells and components external to said array of cells. Each cell communicates with at least one other cell of the array, thereby permitting an exchange of data packets to take place between the cells of the array. Each cell includes a memory for receiving a data packet from another cell of the array as well as a control entity to control release of a data packet toward a selected destination cell of the array at least in part on a basis of a degree of occupancy of the memory in the destination cell. In this way, scheduling is distributed amongst the cells of the switch fabric.

43 Claims, 21 Drawing Sheets

U.S. PATENT DOCUMENTS

| | | | |
|---|---|---|---|
| 5,278,548 | A | 1/1994 | Haber |
| RE34,755 | E | 10/1994 | Eng et al. |
| RE34,811 | E | 12/1994 | Eng et al. |
| 5,377,182 | A | 12/1994 | Monacos |
| 5,408,469 | A * | 4/1995 | Opher et al. ............... 370/399 |
| 5,467,347 | A | 11/1995 | Petersen |
| 5,787,084 | A | 7/1998 | Hoang et al. |
| 5,790,539 | A | 8/1998 | Chao et al. |
| 5,831,980 | A | 11/1998 | Varma et al. |
| 5,859,835 | A | 1/1999 | Varma et al. |
| 5,938,736 | A | 8/1999 | Muller et al. |
| 5,999,527 | A | 12/1999 | Petersen |
| 6,052,373 | A * | 4/2000 | Lau ........................... 370/399 |
| 6,069,895 | A | 5/2000 | Ayandeh |
| 6,111,856 | A | 8/2000 | Huterer et al. |
| 6,134,218 | A * | 10/2000 | Holden ....................... 370/232 |
| 6,144,662 | A | 11/2000 | Colmant et al. |
| 6,157,643 | A * | 12/2000 | Ma ............................. 370/389 |
| 6,188,690 | B1 * | 2/2001 | Holden et al. .............. 370/390 |
| 6,560,629 | B1 * | 5/2003 | Harris ........................ 718/105 |
| 6,597,689 | B1 * | 7/2003 | Chiu et al. .................. 370/354 |
| 6,687,254 | B1 * | 2/2004 | Ho et al. .................... 370/412 |
| 6,731,631 | B1 * | 5/2004 | Chang et al. ............... 370/388 |
| 6,741,552 | B1 * | 5/2004 | McCrosky et al. ......... 370/218 |
| 6,754,206 | B1 * | 6/2004 | Nattkemper et al. ........ 370/369 |
| 6,807,167 | B1 * | 10/2004 | Chakrabarti et al. ........ 370/352 |
| 6,907,042 | B1 * | 6/2005 | Oguchi ....................... 370/412 |
| 6,967,926 | B1 * | 11/2005 | Williams et al. ............ 370/236 |
| 6,990,096 | B2 * | 1/2006 | Norman et al. ............. 370/386 |
| 6,990,097 | B2 * | 1/2006 | Norman et al. ............. 370/386 |
| 2002/0089977 | A1 * | 7/2002 | Chang et al. ............... 370/386 |
| 2002/0181452 | A1 * | 12/2002 | Norman et al. ............. 370/380 |
| 2002/0181454 | A1 * | 12/2002 | Norman et al. ............. 370/386 |
| 2002/0191599 | A1 * | 12/2002 | Parthasarathy et al. ..... 370/389 |

FOREIGN PATENT DOCUMENTS

| | | |
|---|---|---|
| EP | 0 680 173 A1 | 2/1995 |
| EP | 1 051 001 | 11/2000 |
| WO | WO 98/26539 | 6/1998 |

OTHER PUBLICATIONS

International Search Report PCT/CA02/00810, Aug. 1, 2003.
Annex to FORM PCT/ISA/206, PCT/CA02/00810.
French, R., Architectural Consideration for Internet Routers; retrieved from the internet guideline in file; Internet URL www.cise.ufl.edu/ rfrench, accessed Jul. 23, 2001.
Joseph Desposito; Router-On-A-Chip Manages Network Traffic with Wire-Speed QoS; Electronic Design; May 1, 2000; pp. 64-65-66.
Werner Bux et al.; Technologies and Building Blocks for Fast Packet Forwarding; IEEE Communications Magazine; Jan. 2001; pp. 70-77.
Minagawa, N. et al. ; Dept. of Comput. Scil, University of Electro-Commun. Tokyo, Japan; Implementation of a network switch on chips;(Abstract) Communications, vol. 13, No. 1; retreived on Mar. 16, 2001 from INSPEC database.
Saturn: a terabit packet switch using dual round-robin; (abstract) Globecom'00—IEEE, Global Telecommunications Conference; Dept. of Electr. Eng. Polytech, Univ.of Brooklyn, NY, U.S.A.; retrieved on Jun. 4, 2001 from INSPEC database.
Nanette J. Boden et al.; Myrinet—Gigabit-per-Second Local-Area Network [on line]; Nov. 16, 1994 Myricom, Inc.; Internet URL http://www.myrinet.com/research/publications/Hot.ps; retrieved on Mar. 14, 2001.
Vitesse Semiconductor Corporation, [on line] ; Datasheet VSC880; Jan. 5, 2001; pp. 1-20; retrieved on Jul. 23, 2001; Internet URL www.vitesse.com/products/documents.cfm.family=document-id=180.
Vitesse Semiconductor Corporation [on line] ; Datasheet VSC870; Jun. 29, 2001; pp. 1-40; retrieved Jul. 23, 2001; Internet URL www.vitesse.com.
A New Architecture for Switch and Router Design; PMC-Sierra Inc.; Dec. 22, 1999; Internet URL http://www.pmcsierra.com/pressRoom/pht/1cs_wp.pdf retrieved on Jul. 4, 2001; pp. 1-8.
Network Processor Designs for Next-Generation Networking Equipment [on line] ; EZ Chip Technologies; Internet URL http://www.ezchip.com/images/pdfs/etchip_white_paper.pdf; retrieved on Jul. 4, 2001; Dec. 1999; pp. 1-4.
Cyrel Minkenberg et al. A combined Input an dOutput Queued Packet-Switched System Based on Prizma Switch-on-a-Chip Technology; Scalable High-Speed Switches/Routers with QoS Support; IBM Research, Zurich Research Laboratory; IEEE Communications Magazine; Dec. 2000; pp. 70-84.
Werner Bux et al.; Technologies an d Building Blocks for Fast Packet Forwarding; Telecommunications Networking at the Start of the 21st Century; IEEE Communications Magazine; Jan. 2001; pp. 70-77.
Child, J.; Bus-switching chip busts bandwidth barrier [on line] ; Internet URL http://www.computer-design.com/editorial/1995/06/directions/bus.html; retrieved on Mar. 15, 2001.
PSID—Based Communications Switching [on line] ; Dec. 1997; Internet URL http://www.icube.com/commsw.pdf; retrieved on Mar. 15, 2001; pp. 1-14.
Nick McKeown et al. "The Tiny Tera: a Packet Switch Core"; Departments of Electri cal Engineering and Computer Science, Stanford University; Aug. 1996; http://tiny-tera.stanford.edu/tiny-tera/index.htwl.
US 5,361,257, 11/1994, Petersen (withdrawn)

* cited by examiner

CELL-BASED SWITCH FABRIC WITH DISTRIBUTED SCHEDULING

FIELD OF THE INVENTION

The present invention relates generally to the switching of packets and, more particularly, to a high capacity switch fabric that can be implemented on a single semiconductor substrate.

BACKGROUND OF THE INVENTION

In a networking environment, it is necessary to route information groups (usually referred to as "packets") between hosts along determined paths through the network. A routing algorithm is performed by the hosts in the network in order to determine the path to be followed by packets having various combinations of source and destination host. A path typically consists of a number of "hops" through the network, each such hop designating a host with a capacity to continue forwarding the packet along the determined path. The outcome of the routing algorithm thus depends on the state and topology of the network.

Often, each packet has a protocol address and a label switch address. The protocol address identifies the destination host, while the label switch address identifies the host to which the packet is to be transmitted via the next "hop". As a packet travels from the source and is redirected by hosts located at different hops along the determined path, its label switch address is modified but its protocol address remains unchanged.

To achieve the required functionality, each host typically comprises a device known as a router, which has a routing layer for performing several basic functions for each received packet, including determining a routing path through the network and modifying the label switch address of the packet according to the determined routing path. The router also has a switching layer for switching the packet according to its new label switch address.

The switching layer may be implemented by a packet switch forming part of the router. The packet switch commonly includes a plurality of input ports for receiving streams of packets, a switch fabric for switching each packet according to a local switch address and a plurality of output ports connected to the switch fabric and also connected to adjacent hosts in the network.

Thus, upon receipt of a packet, the router analyzes the packet's protocol address or label switch address, calculates a local switch address and sends the packet to an input port of the packet switch. The packet switch then examines the label switch address of the packet and forwards the packet to the corresponding output port which leads to the next hop, and so on. Often, a new label switch address is applied at each hop.

It is common to provide a buffer at each input port of the packet switch for temporarily storing packets during the time it takes the router to determine the identity of the next hop and during the time it takes the packet switch to send the packet to the appropriate output port.

However, packet switches face problems inherent to the random nature of packet traffic. A first problematic situation may arise when two packets with different destination output ports arrive at the same input port of the switch. For example, let the destination output port of the first-arriving packet be blocked but let the destination output port of the second-arriving packet be available. If the packets are restricted to being transmitted in order of their arrival, then neither packet will be transmitted, at least until the destination output port associated with the first-arriving packet becomes free.

This problem can be solved by providing a mechanism for transmitting packets in a different order from the one in which they arrive. This is commonly referred to in the art as "scheduling" and is performed by a scheduling processor in a central location, since decisions taken with regard to the transmission of packets to a given output port will affect the availability of that output port and will therefore affect the decisions taken with regard to the transmission of packets to that output port from other input ports.

Unfortunately, the centralized nature of the scheduling operation disadvantageously limits the throughput of the switch as the data rate increases, since the scheduler in the packet switch will usually be unable to keep up with the task of timely scheduling multiple packet streams at high data rates.

A second problematic situation, known as "contention", arises when two or more packets from different input ports are destined for the same output port at the same time. If an attempt is made to transmit both packets at the same time or within the duration of a packet interval, then either one or both packets will be lost or corrupted. Clearly, if lossless transmission is to be achieved, it is necessary to provide some form of contention resolution.

Accordingly, a packet switch can be designed so as to select which input port will be allowed to transmit its packet to the common destination output port. The selected input port will be given permission to transmit its packet to the destination output port while the other packets remain temporarily "stalled" in their respective buffers. This is commonly referred to in the art as "arbitration" and is performed by a processor in a central location, since decisions taken with regard to the transmission of packets from input port A affect the throughput at the output ports, which affects the decisions taken with regard to the transmission of packets from input port B.

However, the centralized nature of arbitration again disadvantageously limits the throughput of the switch as the data rate increases, since the arbiter in the packet switch will not be able to keep up with a large number of packet streams at high data rates.

As the size and capacity of a switch increases, so does the complexity of the scheduling and arbitration. This increase in complexity of the scheduling and arbitration entails an increase in latency, which consequently increases the memory requirement. As a result, traditional approaches to scheduling and contention resolution have yielded packet switch designs that require large buffer sizes and complex, centralized scheduling and arbitration circuitry.

These properties make it impractical to lithograph a traditionally designed high-performance packet switch with a reasonable number of input and output ports onto a single semiconductor chip using available technology. For this reason, traditional solutions have been implemented on multiple chips and therefore suffer from other problems such as high power consumption, high packaging costs, exposure to electromagnetic interference and significant inefficiencies and cost penalties related to mass production.

As the required switching capacity of packet switches increases to $10^{12}$ bits per second and beyond, traditional packet switches will be forced to further increase their memory size and complexity, with an associated exacerbation of the problems inherent to a multichip design.

SUMMARY OF THE INVENTION

The present invention provides a compact and efficient switch fabric with distributed scheduling, arbitration and buffering, as well as a relatively low requirement for memory, allowing the switch fabric to be implemented on a single mass-producible semiconductor chip.

Therefore, according to a first broad aspect, the invention may be summarized as a switch fabric implemented on a chip, including an array of cells and an I/O interface in communication with the array of cells for permitting exchange of data packets between said array of cells and components external to said array of cells. Each cell communicates with at least one other cell of the array, thereby permitting an exchange of data packets to take place between the cells of the array. Each cell includes a memory for receiving a data packet from another cell of the array as well as a control entity to control release of a data packet toward a selected destination cell of the array at least in part on a basis of a degree of occupancy of the memory in the destination cell. In this way, scheduling is distributed amongst the cells of the switch fabric.

These and other aspects and features of the present invention will now become apparent to those of ordinary skill in the art upon review of the following description of specific embodiments of the invention in conjunction with the accompanying drawings.

DETAILED DESCRIPTION OF THE PREFERRED EMBODIMENTS

Figure 13:
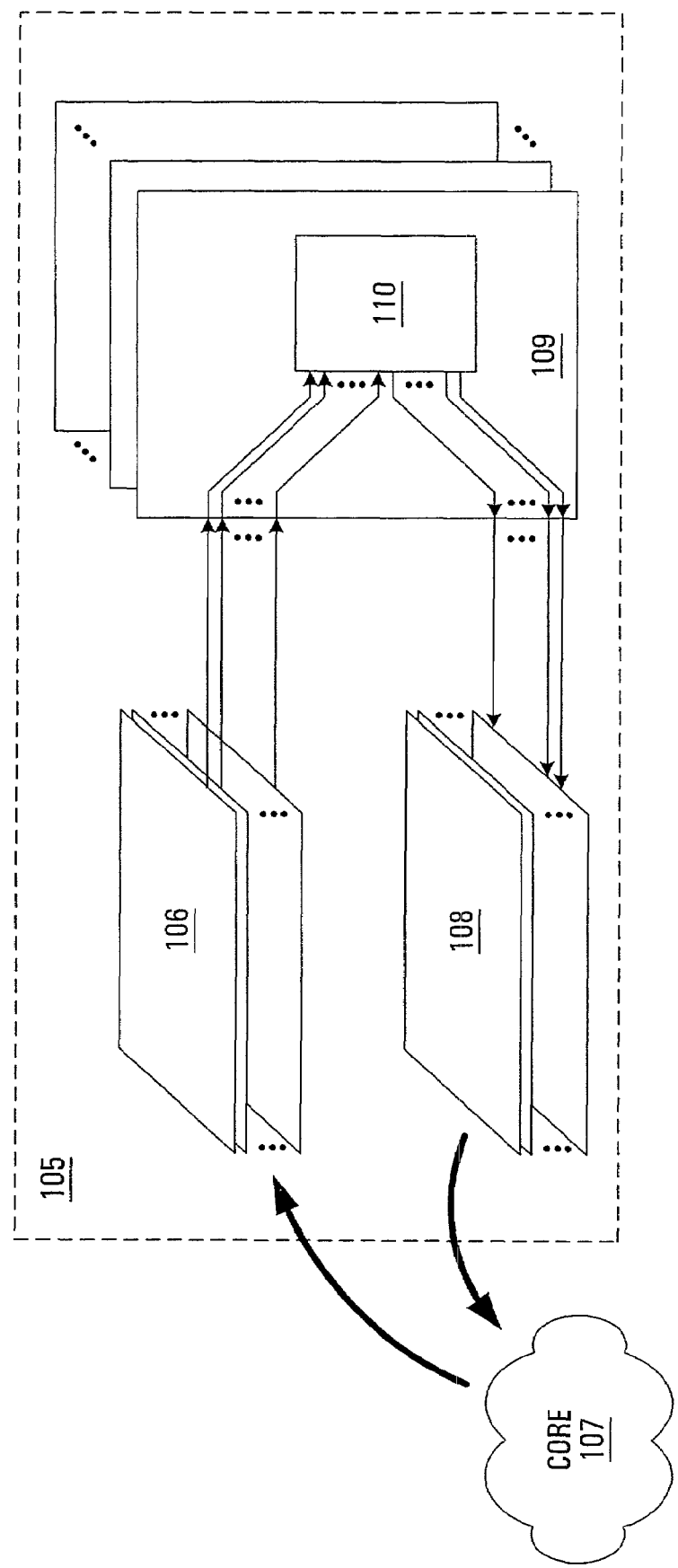
FIG. 13 shows a packet switch that utilizes multiple switch cards, each containing a switch fabric in accordance with the present invention.

With reference to FIG. 13, there is shown a packet switch 105, comprising one or more line cards 106, 108, also referred to in the art as tributary cards. The line cards 106, 108 are connected at one end to a core network 107 or to other packet switches or routers. The line cards 106, 108 are connected at another end to one or more switch cards 109. Line cards 106 receive packets from the core network 107 and transmit them to the switch cards 109, while line cards 108 receive switched packets from the switch cards 109 and transmit them to the core network 107. In many embodiments, the line cards 106 are bi-directional. A mid-plane (not shown) may be provided to facilitate interconnection between the line cards 106, 108 and the switch card(s) 109.

Each switch card 109 has a plurality of input ports and a plurality of output ports. From the point of view of an individual switch card 109, the line cards 106 are input line cards as they supply packets to the input ports of the switch card 109, while the line cards 108 are output line cards as they receive packets from the output ports of the switch card 109. The function of a switch card 109 is to send each packet received at one of its input ports to an output port specified by or within the packet itself. In this sense, a switch card 109 exhibits self-routing functionality. To provide this functionality, in a preferred embodiment, the switch card 109 comprises a semiconductor substrate (or "wafer" or "chip") 110 on which resides a self-routing switch fabric. In some embodiments, the chip 110 may be a CMOS silicon chip to balance memory density, logic speed and development cost, but other embodiments need not be limited to CMOS, to silicon, to semiconductors or even to electronics.

It should be understood that the term "switch fabric" has a meaning not restricted to traditional routing and/or packet switching applications but extends to cover other applications where a signal path is required to be established, either temporarily or permanently, between a sender and a receiver.

Figure 1:
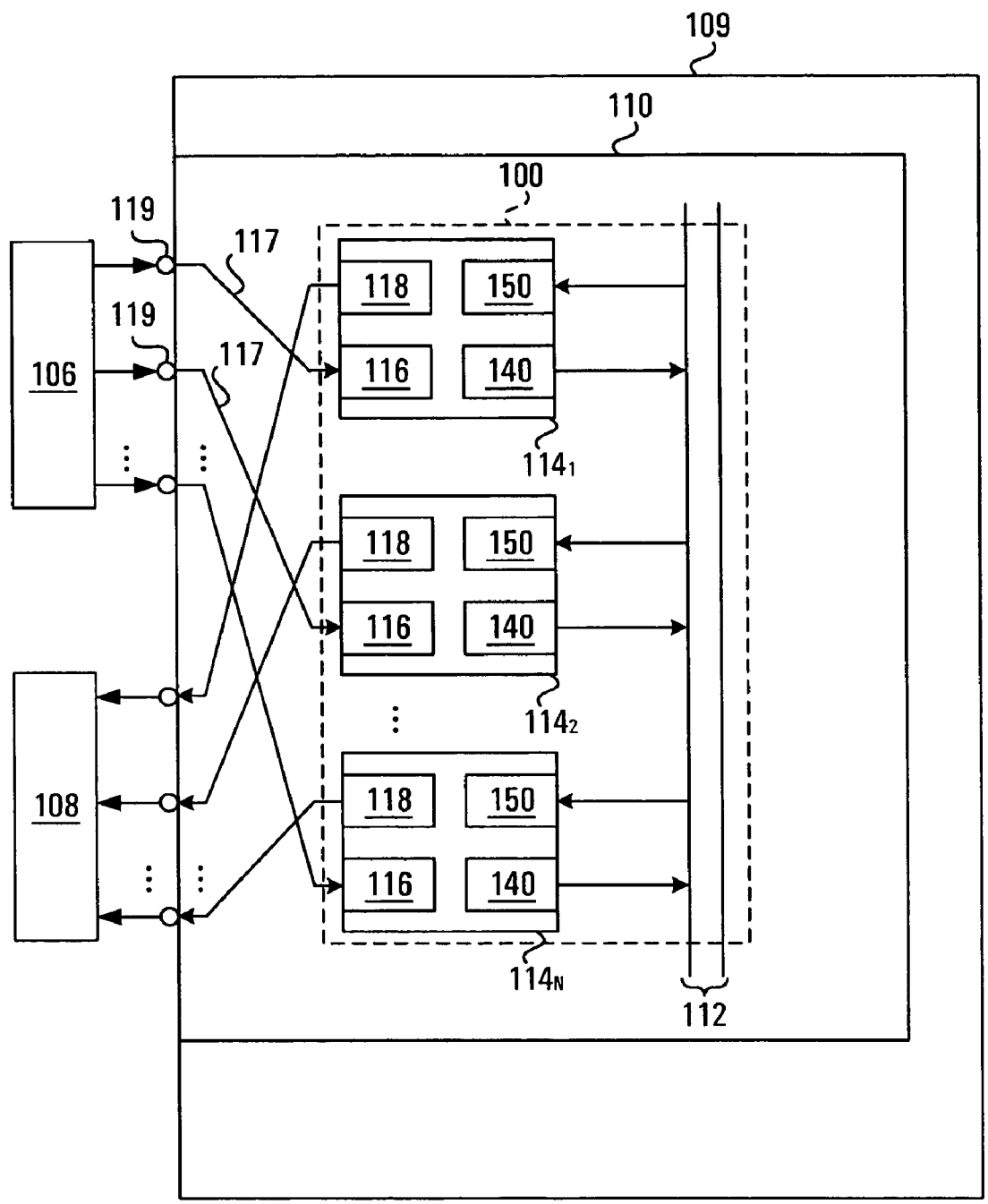
FIG. 1 shows, in schematic form, a switch fabric formed by an interconnection of cells, in accordance with an embodiment of the present invention.

FIG. 1 shows a switch fabric 100 in accordance with an embodiment of the present invention, comprising N "cells" 114$_j$, $1 \leq j \leq N$, implemented on a single chip 110 within a switch card 109. As will be appreciated from the remainder of the specification, a "cell" is an entity that performs processing on a data packet. The processing may be switching of the data packet or another type of processing.

The cells 114 are equipped with an input/output (I/O) interface for interfacing with an off-chip environment. The I/O interface refers globally to the functional element of the cell that allows it to communicate with the external world, in one example this world being the off-chip line cards 106. In the illustrated embodiment, each cell 114 includes an input interface 116 for receiving packets from one or more of the input line cards 106 and an output interface 118 for providing switched packets to one or more of the output line cards 108. In other examples, the I/O interface may be the collection of individual I/O ports on the cell.

In the illustrated non-limiting embodiment, the input interface 116 is connected to pins on the chip 110, which pins are connected to traces 117 on the line card 109, which traces 117 connect to line cards 106 through a releasable connector 119. But the traces 117 need not be contained or embedded within the switch card 109 and need not be electronic; for example, in embodiments where indium phosphide based switch fabrics are contemplated, guided or free-space optical inputs and outputs may be preferred.

In addition, the cells 114 are each equipped with one or more transmitters 140 and one or more receivers 150. Communication between the transmitters and receivers in different cells is achieved by way of a predetermined interconnect pattern 112 which includes "forward" channels and "reverse" (or "back") channels. The forward channels are arranged in such a way as to allow the transmitter 140 in a given cell to send packets to dedicated receivers 150 in its own cell and/or in one or more other cells. Conversely, each receiver 150 in a given cell is dedicated to receiving packets from the transmitter 140, either in its own cell or in one of the other cells, via the appropriate forward channel. Thus, it can be said that a transmitter functionally extends into those cells where its dedicated receivers are located, the end result being that a transmitter on a given cell need not compete with other transmitters on other cells when sending a packet. The back channels include dedicated connections which transport control information from a particular receiver to the associated transmitter from which it receives packets along the forward channel. The individual transmitters in different cells are functionally independent.

The interconnect pattern 112 defines one or more arrays of cells. As used herein, the word "array" is meant to designate the set of cells that are connected to one another. Therefore, a chip may have a plurality of arrays, in the instance where interconnections are such that each cell does not communicate directly with every other cell. The most basic form of array is two cells connected to one another.

Figure 10:
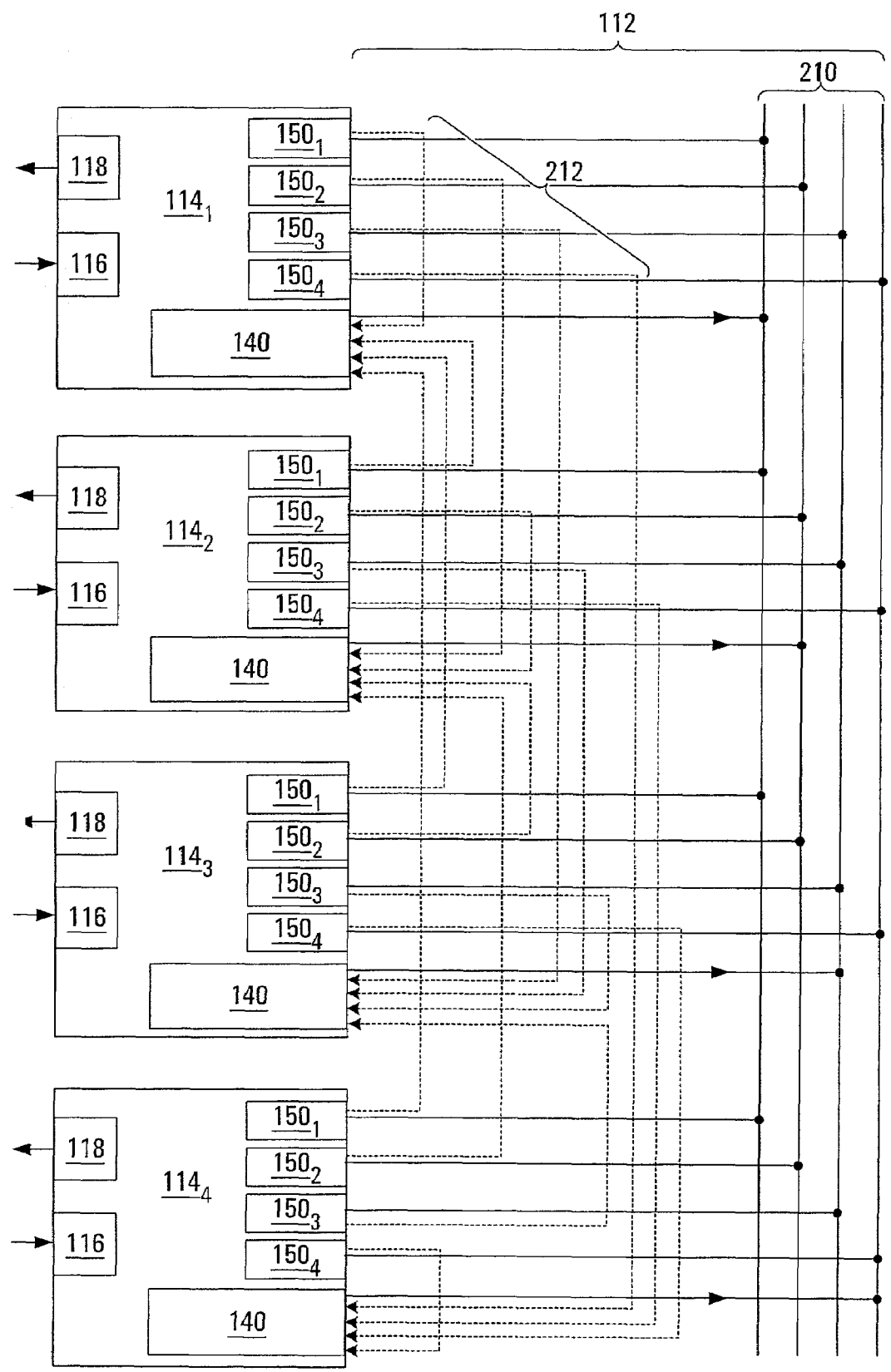
FIGS. 10-12 show, in schematic form, other embodiments of the switch fabric formed by an interconnection of cells.
Figure 19:
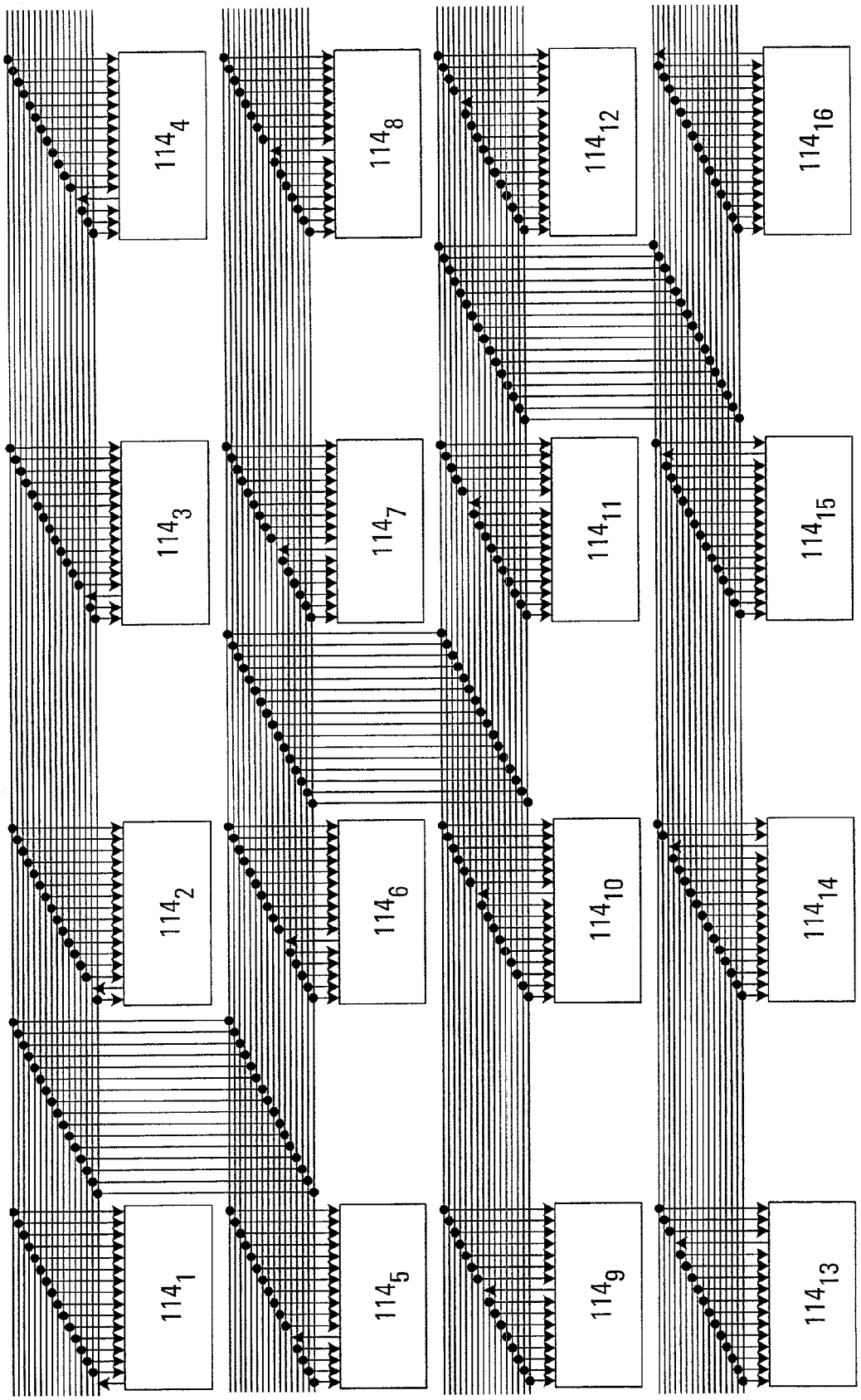
FIG. 19 shows, in schematic form, yet another embodiment of the switch fabric formed by an interconnection of cells.

In one embodiment of the present invention, the interconnect pattern 112 allows each cell to transmit data to, receive data from, and access control information from, itself and every other cell of the switch fabric 100. FIG. 10 illustrates this feature in the case where N=4, and where each cell has a single transmitter 140 and N=4 receivers 150. It can be observed that receiver $150_j$ in cell $114_j$ is a loopback receiver which receives packets sent by the transmitter 140 in cell $114_j$. FIG. 19 shows the same logical interconnect pattern 112 as in FIG. 10, i.e., each cell transmits data to, receives data from, and accesses control information from, itself and every other cell of the switch fabric 100; however, N=16 and the cells are arranged physically in a 4×4 matrix. For simplicity, only the forward channels are shown.

Figure 11:
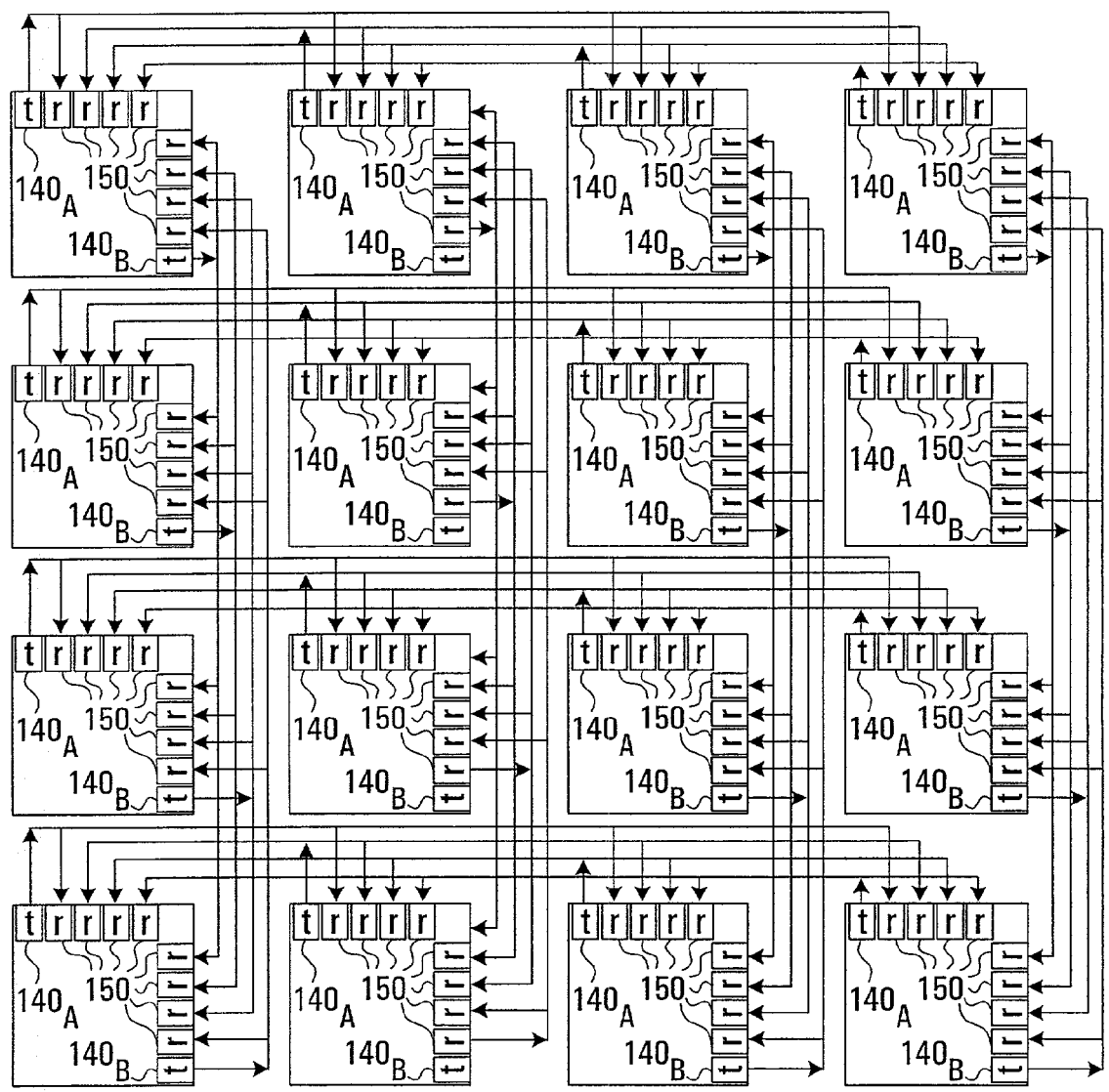

With reference to FIG. 11, there is shown an alternative interconnect pattern 112 in which there are provided sixteen cells, each having two transmitters $140_A$, $140_B$ and eight receivers 150. The sixteen cells 114 are arranged in a square matrix formation, whereby the transmitter $140_A$ belonging to each cell located in a given row is connected to a receiver in each other cell located in the same row and the transmitter $140_B$ belonging to each cell located in a given column is connected to a receiver in each other cell located in the same column. The fact that there is one transmitter for eight receivers facilitates scaling to larger numbers of cells. In this case, there are two loopback receivers per cell, although embodiments in which there is only one loopback receiver or no loopback receiver are also within the scope of the present invention.

Although the cells 114 on the chip 110 can be made structurally and functionally identical to one another in order to simplify the overall chip design, this is not a requirement.

Figure 12:
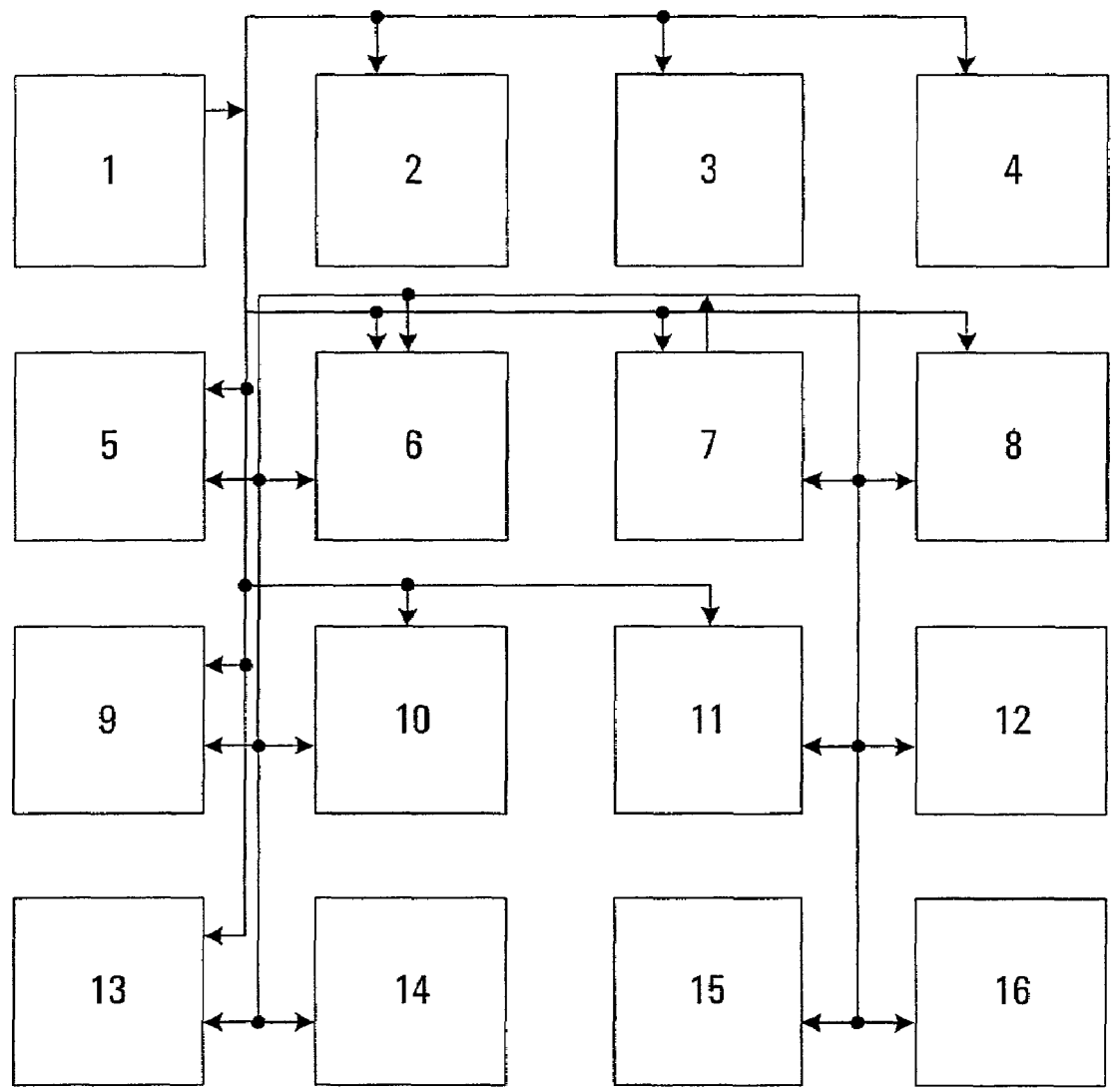

For example, FIG. 12 partially shows yet another possible interconnect pattern within the scope of the present invention, wherein asymmetry among cells or among groups of cells is incorporated into the design. As illustrated, there are provided sixteen cells 114, again arranged in a matrix formation, each with a single transmitter 140 and one or more receivers 150. The structure of the interconnect of FIG. 12 is "tree"-like in nature, which may be advantageous under certain circumstances. Specifically, the tree-like structure consists of several interlinked arrays of cells. In one array, cell #1 is adapted to transmit packets to cells #2, #3, #4, #5, #6, #7, #8, #9, #10, #11 and #13, while in the other array, cell #7 is adapted to transmit packets to cells #5, #6, #8, #9, #10, #11, #12, #13, #14, #15 and #16. For simplicity, FIG. 12 shows only the connections enabling the transmission from cell #1 and cell #7.

Still other interconnect patterns may be designed without departing from the spirit of the invention. For example, in one embodiment of an N×1 switch fabric, the cells may be physically implemented as an N/2 by 2 array as this provides an advantageous balance between the simpler wiring of an N×1 physical implementation and the shorter wiring of a $\sqrt{N} \times \sqrt{N}$ physical implementation. In another embodiment, it is possible to create a three-dimensional array (or "cube") of cells and also to provide one or more of the cells with multiple transmitters.

A wide variety of interconnect patterns would then be possible within such a structure. For instance, in a design employing 8×8×8 cells, each cell would be designed so as to contain three transmitters (one for the "column", one for the "row" and one for the "line"), as well as 24 receivers, one for each of the cells in the same column, row or line as the cell in question. If the cells are also connected in a diagonal fashion, the number of transmitters and receivers will differ amongst the cells. For example, the cell at the center of the cube will contain an additional four transmitters and 32 receivers, while the eight cells located at the apexes of the cube will each contain an additional eight receivers and one transmitter.

Other patterns such as a hypercube or a three- (or higher-) dimensional toroidal mesh can similarly be created using the cells as described herein in order to capitalize on the tremendous interconnectivity available today within a single semiconductor substrate. Note that the expression "dimension" here does not necessarily refer to the spatial extent of the cells' physical layout, rather it describes the functional relationship between groups of cells. Thus it is possible to realize an array of cells where the cells are arranged functionally in three or more dimensions while physically the cells occupy more or less the same plane or occupy a three-dimensional stack of planes or other region of a semiconductor substrate. Thus, it is within the scope of the invention to take advantage of advances in lithography which would increase the allowable circuit density on a chip so as to allow the switch fabric to be implemented logically as four-dimensional yet on a physically two- or three-dimensional substrate.

Moreover, it is envisaged that although it may be desired to interconnect N cells according to a particular interconnect pattern, a larger number of cells could be initially designed onto the semiconductor substrate, with an interconnect pattern of which the desired interconnect pattern is a subset. Upon lithography and fabrication, faulty cells would be detected and these (along with, possibly, some fault-free cells if they are in excess of N) could be electronically or otherwise disabled so as to leave N fully operational cells with the desired interconnect pattern on the chip.

Figure 2:
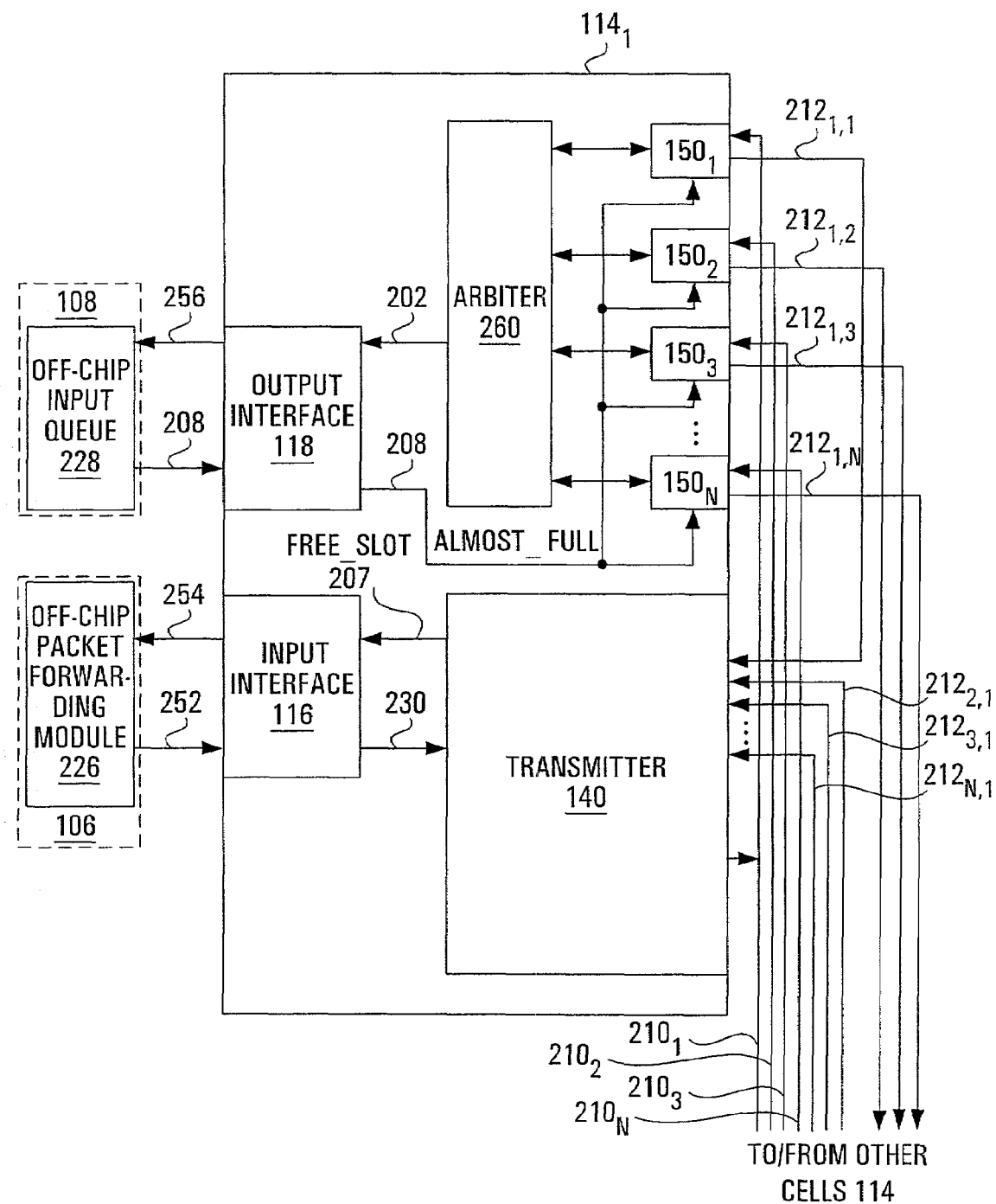
FIG. 2 shows, in schematic form, functional modules of a cell of the switch fabric in FIG. 1, including a transmitter, a plurality of receivers and an arbiter.

An example arrangement of the functional modules that make up an example cell (say, cell $114_1$) is shown in greater detail in FIG. 2 for the case where each cell transmits packets to, and receives packets from, itself and every other cell. Cell $114_1$ is seen to comprise a transmitter 140, N receivers $150_1 \ldots 150_N$, an input interface 116, an output interface 118 and an arbiter 260. Other embodiments of the invention, to be described in greater detail later on, may include a central processing unit (CPU, not shown in FIG. 2) in each cell for generating and processing specialized control information.

It may be advantageous to use electrical communication for currently available CMOS semiconductors or guided or free-space optics for compound semiconductors such as gallium arsenide or indium phosphide. In other embodiments, the input interface 116 and output interface 118 may communicate with the off-chip environment using a variety of media and techniques, including but not limited to sonic, radio frequency and mechanical communication.

The input interface 116 receives packets from an off-chip packet-forwarding module 226 via a data path 252 and forwards them to the transmitter 140 via a data path 230. Occupancy information regarding the transmitter 140 is provided to the input interface 116 via a set of free_slot lines 207; the input interface 116 provides this information to the off-chip packet-forwarding module 226 along a control path 254.

The receivers 150 are connected to the arbiter 260, which is connected to the output interface 118 via a data path 202. The output interface 118 supplies packets to an off-chip input queue 228 via a data path 256. Occupancy information regarding the off-chip input queue 228 is provided to the receivers 150 in the form of an almost_full flag 208 that runs through the output interface 118 in the opposite direction of traffic flow. This functionality may also be provided by an external back channel.

The interconnect pattern 112 includes "forward" channels $210_j$, $1 \leq j \leq N$, and "reverse" (or "back") channels $212_{j,k}$, $1 \leq j \leq N$, $1 \leq k \leq N$. Forward channel $210_j$ is employed by the transmitter 140 in cell $114_j$ to send packets to a corresponding receiver $150_j$ located on each of the cells $114_k$, $1 \leq k \leq N$. Back channel $212_{j,k}$ is used by the transmitter 140 in cell $114_k$ to access control information from receiver $150_k$ in cell $114_j$. Thus, in this embodiment, in total, there are N forward channels, one for each cell, and there are $N^2$ back channels, one for each combination cell pairs.

The switch fabric 100 processes data organized into packets. Each such packet has one or more words, where the size of a word is generally fixed. In one embodiment, the forward channels 210 are selected to be one bit wide so as to allow data to be transferred serially. In another embodiment, the forward channels 210 are selected to be at least as wide as to allow a parallel data transfer involving two or more bits in an individual word. In yet another embodiment, the forward channels 210 are selected to be sufficiently wide so as to allow a parallel data transfer involving all the bits in an individual word.

On the other hand, the back channels 212 convey control information of relatively low bandwidth compared to the required capacity of the forward channels 210, and therefore an individual back channel may be designed as a serial link or one with a low degree of parallelism compared to that of a forward channel. Note that because the $N^2$ back channels 212 carry much less information than the main data paths, they can be much narrower (i.e., one to a few bits wide) or slower than the forward channels 210; alternatively, data from multiple back channels can be multiplexed onto a single physical channel, etc. It will be noted that arrangements where the back channel is designed to convey information in a parallel fashion are within the scope of the present invention.

It should be understood that the term "packet" is intended to designate, in a general sense, a unit of information. The scope of this definition includes, without being limited to, fixed-length datagrams, variable-length datagrams, information streams and other information formats. The various characteristics of a packet, such as its length, priority level, destination, etc. can be supplied within the packet itself or can be provided separately.

Figure 3:
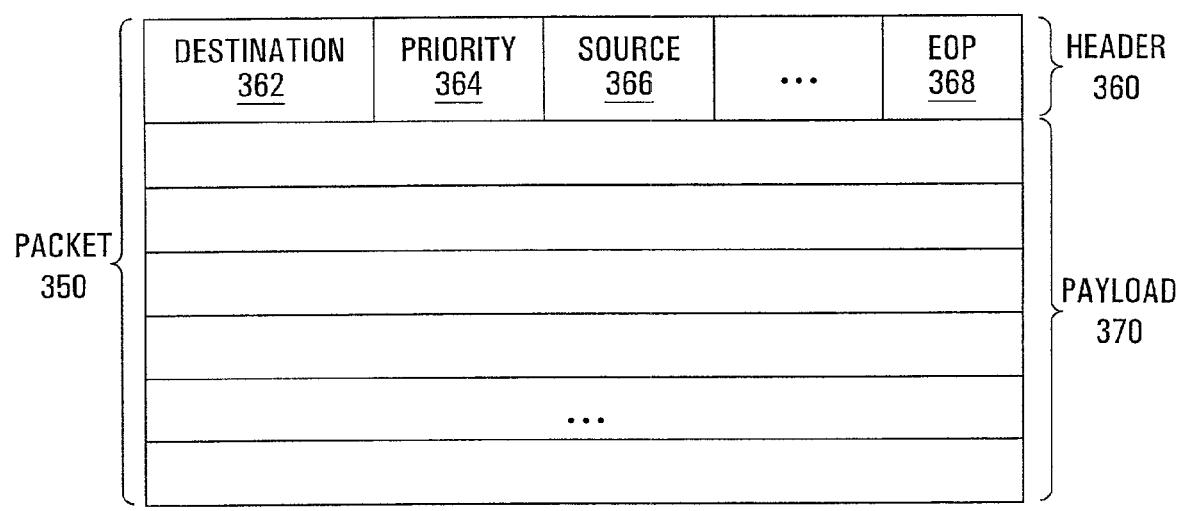
FIG. 3 shows the format of a packet used in the switch fabric of FIG. 1.

FIG. 3 shows in more detail the structure of a packet 350 suitable for use with the present invention. Specifically, a first word (or group of words) of the packet 350 makes up the so-called "header" 360 and the remaining words of the packet 350 make up the so-called "payload" 370. In a non-limiting example embodiment, the size of the header 360 is a single word and the size of the payload 370 ranges from 7 to 23 words. In different embodiments within the scope of the present invention, the number of words in each packet may be fixed or it may vary from one packet to another.

The header 360 has various fields that contain control information. For example, the header 360 may include a destination field 362, a priority field 364 and a source field 366. The destination field 362 specifies the cell from which it is desired that the packet eventually exit the switch fabric 100. This cell may be referred to as the "destination cell". The destination field 362 may encode the destination cell in any suitable way, for example using a binary code to represent the destination cell or using a binary mask with a logic "1" in the position of the destination cell.

In some embodiments of the invention capable of providing multicast functionality, there may be more than one destination cell specified in the destination field 362 of a given packet 350. For the time being, however, it will be assumed that only each packet is associated with only one destination cell, the consideration of a multicast scenario being left to a later part of this specification.

The priority field 364 encodes a priority level associated with the packet 350. The priority level associated with a packet 350 basically indicates to the switch fabric 100 the relative urgency with which the packet in question is to be forwarded to its destination cell. The set of possible priority levels may include a finely graduated range encoded by, say, 8 bits (representing values between 0 and 255, inclusively). In other embodiments, the set of possible priority levels may consist simply of "high", "medium" and "low" priority levels.

The source field 366 is optional in the case where a single switch fabric is considered in isolation. However, when multiple switch fabrics 100 of the type shown in FIG. 1 are interconnected, it may be useful for a downstream switch fabric that processes a packet received from an upstream switch fabric to know which cell on the upstream switch fabric actually sent the packet. Such information may suitably be contained in the source field 366 of the header 360 of the packet 350.

Of course, it is to be understood that still other header fields not shown in FIG. 3 may be used to store additional control information related to the packet 350. For instance, a packet destined for the CPU in the destination cell may be so identified in the header, as will a packet that has been generated by the CPU in a given cell. This functionality will be described in further detail later on. In other example embodiments, the header 360 may also contain a series of one or more "switch fabric chip" exit ports defining a predetermined path through a multi-stage fabric. Additionally, for each port on a line card, there may be one or more sub-ports. The sub-port for which a particular packet is destined may be identified in a field of the packet's header 360.

While a packet may have a fixed or variable number of words, each word generally has a fixed number of bits (i.e., each word is of a fixed "width"). For example, a word may include, say, 33 bits, among which 32 bits may carry actual information (which is of a different type for the header 360 and for the payload 370), and the $33^{rd}$ bit may be an "end-of-packet" bit 368 that is set for a particular word when that word is a predetermined number of words from the end of the packet to which it belongs. Thus, detection of variations in the end-of-packet (EOP) bit 368 of successive words allows an entity processing a stream of words to locate the beginning of a new packet. Specifically, when such an entity detects a falling edge in the EOP bit, it will expect the next packet to begin following receipt of a predetermined number of additional words belonging to the current packet.

Alternative ways of indicating the length and/or the start of a packet will be known to those of ordinary skill in the art, such as, for example, including an additional field in the header 360 which specifies the length of the packet, in terms of the number of words. Of course, such measures are unnecessary when each packet is of a known and fixed length, since a word counter could be used as a reference in order to establish the expiry of one packet and the beginning of the next. As will be understood by those of ordinary skill in the art, additional bits may be used for parity checking and other functions, for example.

A packet travelling through the switch fabric 100 of FIG. 2 undergoes three main stages of transmission. The first stage involves the packet being transmitted from the off-chip environment to a given cell, say cell $114_J$, via that cell's input interface 116; upon receipt, the transmitter 140 begins the process of writing the packet into a memory location in that cell. The second stage involves the packet being sent from the transmitter 140 in cell $114_J$ along the corresponding forward channel $210_J$ to receiver $150_J$ residing in the destination cell; upon receipt, the packet is written into a memory location by receiver $150_J$ in the destination cell. Finally, the third stage involves the packet being sent from receiver $150_J$ in the destination cell via the arbiter 260 and through output interface 118 of that cell. In the illustrated embodiment, the output interface 118 is connected to the off-chip input queue 228 which provides additional buffering and feedback on the state of this buffering, thus allowing an over-provisioned switch fabric to deliver bursts that temporarily exceed the capacity of the next link.

In accordance with an embodiment of the present invention, a packet having a given priority level is transmitted at a particular stage only if there is sufficient room downstream to accommodate the packet, taking into consideration its priority level. This functionality is achieved by providing a packet transmission control mechanism at each stage of transmission in order to regulate packet flow and achieve the most desired overall functionality. However, it is within the scope of the invention to omit one or more of the control mechanisms.

With regard to the first stage, the off-chip packet-forwarding module 226 controls the flow of packets to cell $114_J$ from the off-chip environment by consulting occupancy information provided by the transmitter 140 via control path 254. An example off-chip packet-forwarding module 226 will be described in greater detail later on; for now, it is sufficient to mention that it is advantageous to use the occupancy information in order to ensure that transmission of a packet to cell $114_J$ only occurs if the transmitter 140 can accommodate that packet.

With regard to the second stage, if lossless transmission is to be supported, it is advantageous for the control mechanism to ensure that the transmitter 140 in cell $114_J$ does not send the packet to receiver $150_J$ in the destination cell unless the receiver in question can accommodate that packet. (The destination cell may be cell $114_J$ itself but is more generally denoted $114_j$, $1 \leq j \leq N$). An example embodiment of such a control system is described herein below; for now, it is sufficient to mention that the transmitter 140 in cell $114_J$ uses back channel $212_{j,J}$ to monitor the status (occupancy) of individual memory locations in receiver $150_J$ in cell $114_j$, thereby to determine whether a packet can be accommodated by that receiver.

With regard to the third stage, in this embodiment, receiver $150_J$ in the destination cell relies on the almost_full flag 208 that provides occupancy information regarding the off-chip input queue 228. This control mechanism is described herein below in greater detail; for now, it is sufficient to mention that receiver $150_J$ in the destination cell is prevented from requesting transmission of a packet unless it can be accommodated by the off-chip input queue 228.

Figure 4:
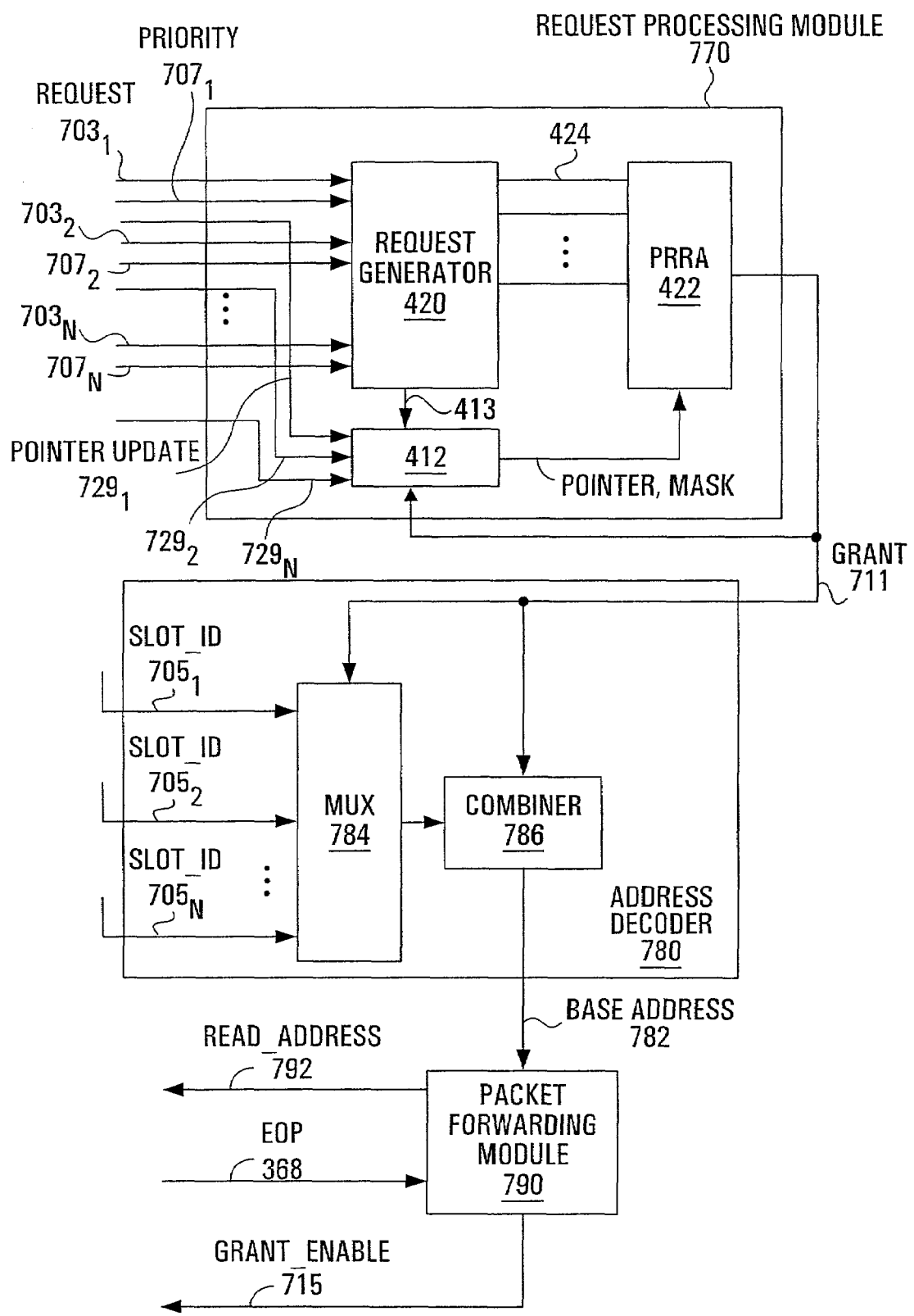
FIG. 4 shows, in schematic form, the arbiter of FIG. 2.
Figure 5:
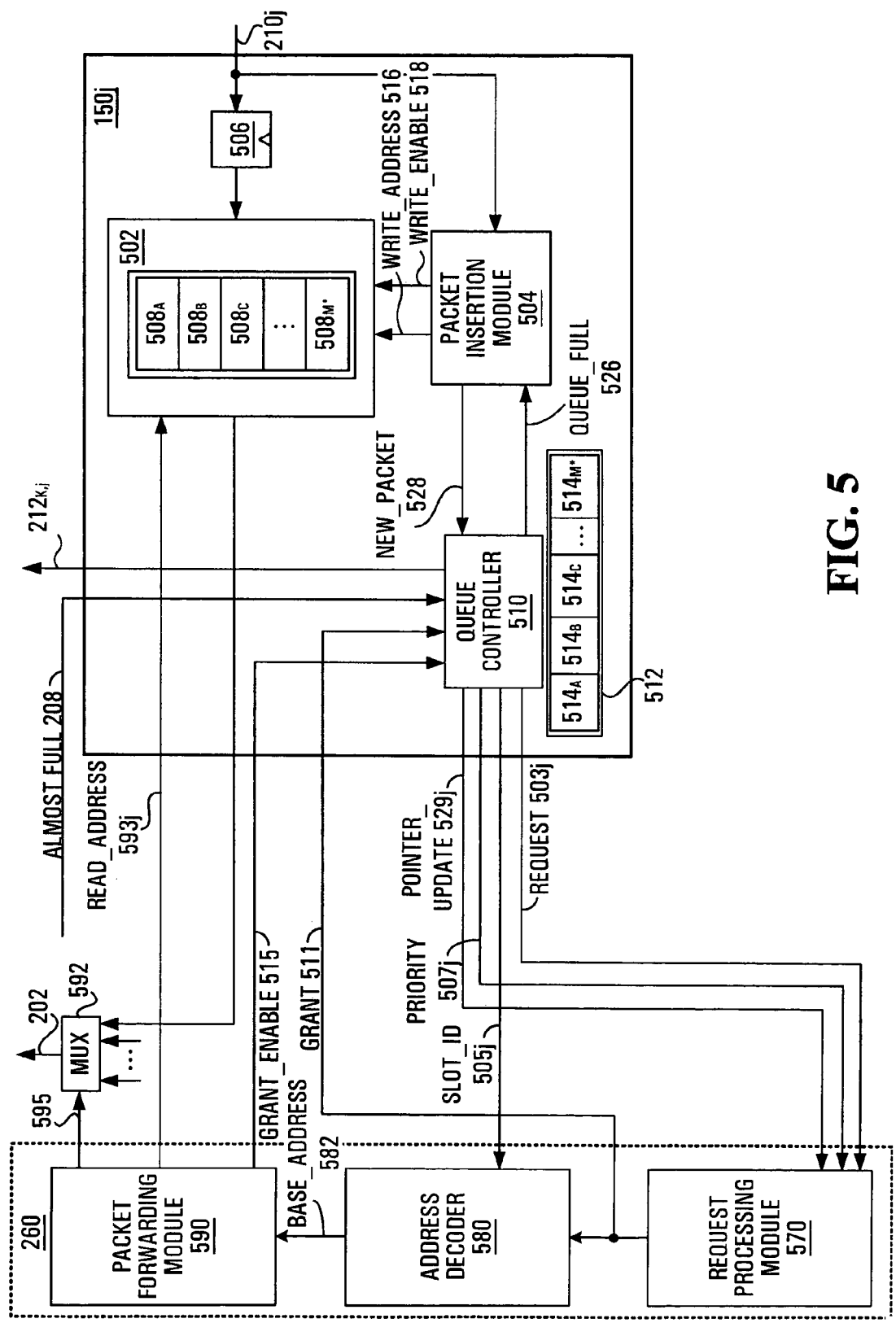
FIG. 5 shows, in schematic form, a receiver of FIG. 2.
Figure 7:
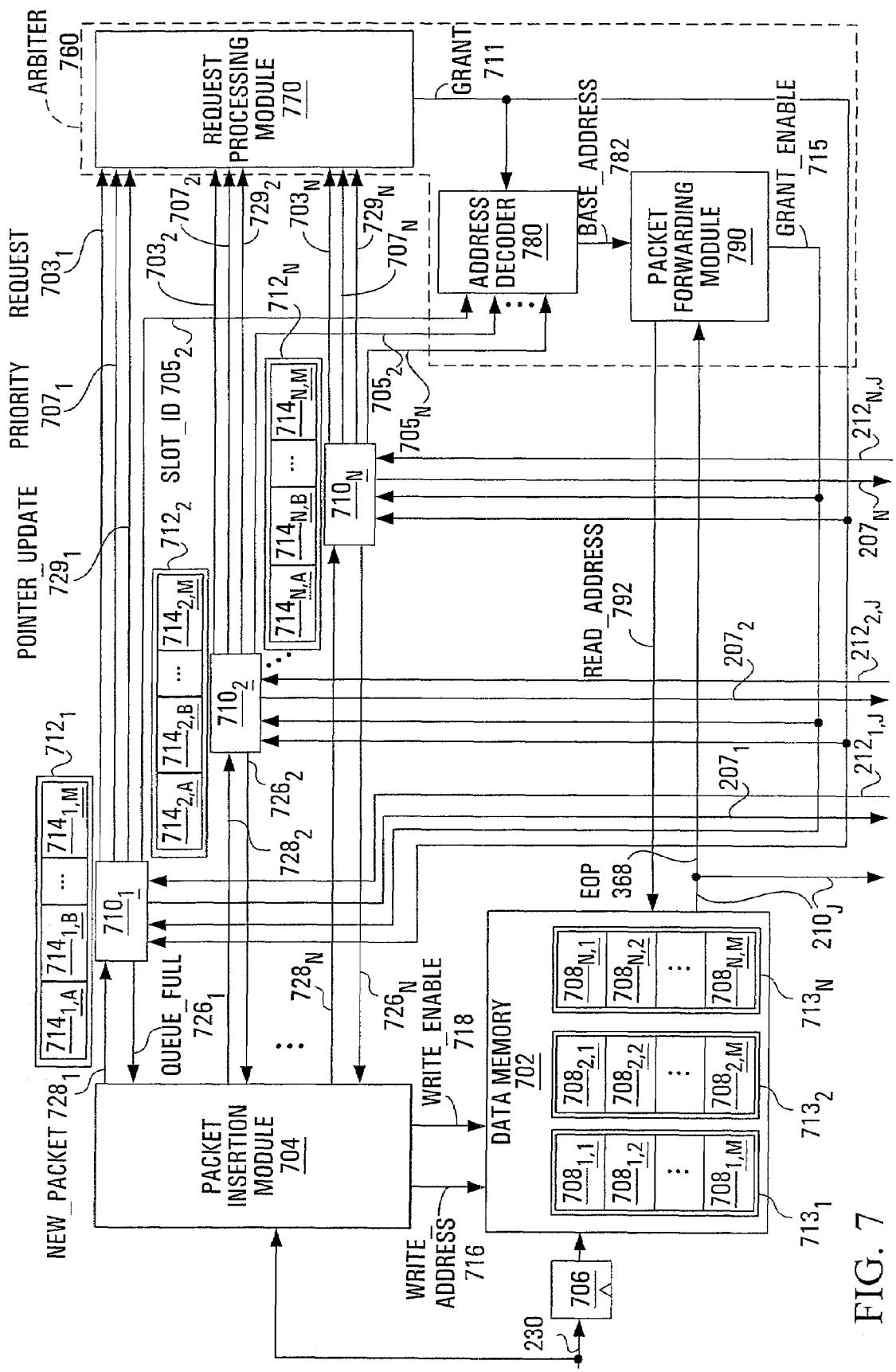
FIG. 7 shows, in schematic form, the transmitter of FIG. 2.

Those skilled in the art will more fully understand the various stages of packet transmission and their associated control mechanisms in the context of the following detailed description of the individual functional modules of a generic cell of FIG. 2 with additional reference to FIGS. 4, 5 and 7.

An example non-limiting implementation of the transmitter 140 in cell $114_J$ is now described with reference to FIG. 7. The transmitter 140 has a memory which includes various storage areas, including a data memory 702, a plurality of control memories 712, any memory used by a plurality of queue controllers 710 and any other memory used by the transmitter 140.

The transmitter 140 receives words from the input interface 116 along the data path 230. The words are fed to the data memory 702 via a set of data input ports. The data memory 702 is writable in response to receipt of a write address and a write enable signal from a packet insertion module 704 via a write_address line 716 and a write_enable line 718, respectively. The write_address line 716 carries the address in the data memory 702 to which the word presently on the data path 230 is to be written, while asserting a signal on the write_enable line 718 triggers the actual operation of writing this word into the specified address. In order to coordinate the arrival of packets at the data memory 702 with the generation of signals on the write_address line 716 and the write_enable line 718, the data path 230 may pass through an optional delay element 706 before entering the data input ports of the data memory 702.

In this example, the data memory 702 comprises N segments 713, one for each of the N cells on the chip 110. The $j^{th}$ segment $713_j$ has the capacity to store a total of M packets destined for cell $114_j$. More specifically, the $j^{th}$ segment $713_j$ includes M slots $708_{j,A}$, $708_{j,B}$, ..., $708_{j,M}$, each slot being of such size as to accommodate a packet. It should be understood that the invention is applicable to any suitable combination of N and M, depending on the operational requirements of the invention. In other embodiments, the data memory 702 may include a pool of memory that is capable of storing portions of incoming data streams.

Associated with each segment $713_j$ of the data memory 702 is a dedicated one of the queue controllers 710, specifically queue controller $710_j$. Queue controller $710_j$ has access to an associated control memory $712_j$. The control memory $712_j$ holds data representative of a degree of occupancy of the corresponding segment $713_j$ of the data memory 702. The term "degree of occupancy" should be understood to include information indicative of the amount of space in the data memory 702 and includes any data that can directly or indirectly provide such information. In some embodiments, this information may be expressed as a degree of vacancy or occupancy. In other embodiments, control memory 712 includes a plurality of entries $714_{j,A}$, $714_{j,B}$, ..., $714_{j,M}$ which store the occupancy status (i.e., occupied or unoccupied) of the respective slots $708_{j,A}$, $708_{j,B}$, ..., $708_{j,M}$ in the $j^{th}$ segment $713_j$ of the data memory 702. In addition, for each slot that is occupied, the corresponding entry stores the priority level of the packet occupying that slot. In one embodiment, the control memory $712_j$ and/or the entries $714_{j,A}$, $714_{j,B}$, ..., $714_{j,M}$ may take the form of registers, for example.

Different slots can be associated with different priority levels or, if there is a large number of possible priority levels, different slots can be associated with different priority "classes", such as "low", "medium" and "high". For example, given 256 possible priority levels (0 to 255), the low and medium priority classes could be separated by a "low-medium" priority threshold corresponding to a priority level of fabric 100, while the medium and high priority classes could be separated by a "medium-high" priority threshold corresponding to a priority level of 200.

In one embodiment of the invention, each segment includes at least one slot per priority class. By way of example, the $j^{th}$ segment $713_j$ of the data memory 702 may contain five slots $708_{j,A}$, $708_{j,B}$, $708_{j,C}$, $708_{j,D}$, $708_{j,E}$, where slots $708_{j,A}$ and $708_{j,B}$ are associated with a high priority class, slots $708_{j,C}$ and $708_{j,D}$ are associated with a medium priority class and slot $708_{j,E}$ is associated with a low priority class. It is to be understood, of course, that the present invention includes other numbers of slots per segment and other associations of slots and priority classes. For example, an embodiment could allow high-priority packets into any slot while reserving some slots exclusively for high-priority packets.

The packet insertion module 704 is operable to monitor the EOP bit 368 on each word received via the data path 230 in order to locate the header of newly received packets. It is recalled that the EOP bit 368 undergoes a transition (e.g., falling edge) for the word that occurs in a specific position within the packet to which it belongs. In this way, detection and monitoring of the EOP bit 368 provides the packet insertion module 704 with an indication as to when a new packet will be received and, since the header 360 is located at the beginning of the packet, the packet insertion module 704 will know when the header 360 of a new packet has arrived.

The packet insertion module 704 is further operable to extract control information from the header 360 of each newly received packet. Such information includes the destination of a newly received packet and its priority level for the purposes of determining into which slot it should be placed in the data memory 702. The packet insertion module 704 first determines into which segment a newly received packet is to be loaded. This is achieved by determining the cell for which the packet is destined by extracting the destination field from the header of the newly received packet. The destination field identifies one of the N cells 114 as the destination cell. The destination cell may be cell $114_J$ itself but is more generally denoted $114_j$. Having determined the set of slots associated with the destination cell $114_j$, the packet insertion module 704 determines the slot into which the received packet should be inserted. This is achieved by determining the priority class of the received packet and verifying the availability of the slot(s) associated with that priority class.

To this end, the packet insertion module 704 determines the priority class of a packet by comparing the priority level of the packet to the previously defined priority thresholds. For example, let slots $708_{j,A}$, $708_{j,B}$, $708_{j,C}$, $708_{j,D}$, $708_{j,E}$ be associated with high, high, medium, medium and low priority levels, respectively. Also, let the low-medium priority threshold and the medium-high priority threshold be as defined previously, namely, at 100 and 200, respectively. If the priority level of the received packet is 167, for example, then the appropriate slots into which the packet could be written include slots $708_{j,C}$ and $708_{j,D}$.

Next, the packet insertion module 704 determines which of the appropriate slots is available by communicating with queue controller $710_j$, to which it is connected via a respective queue_full line $726_j$ and a respective new_packet line $728_j$. Alternatively, a bus structure could be used to connect the packet insertion module 704 and the queue controllers 710. In either case, the packet insertion module 704 obtains the status (i.e., occupied or unoccupied) of the slots associated with the priority class of the received packet via the queue_full line $726_j$.

The status information may take the form of a bit pattern which includes a set of positioned bits equal in number to the number of slots, where a logic value of 0 in a particular position signifies that the corresponding slot is unoccupied and where a logic value of 1 in that position signifies that the corresponding slot is indeed occupied. In this way, it will be apparent to the packet insertion module 704 which of the slots associated with the priority class of the received packet are available.

In the above example, where the priority class of the received packet was "medium" and slots $708_{j,C}$ and $708_{j,D}$ were associated with the medium priority class, queue controller $710_j$ would supply the occupancy of slots $708_{j,C}$ and $708_{j,D}$ via the queue_full line $726_j$. This information is obtained by consulting entries $714_{j,C}$ and $714_{j,D}$ in control memory $712_j$. Of course, it is within the scope of the invention for queue controller $710_j$ to provide, each time, the occupancy of all the slots in memory segment $713_j$.

If only one slot for the packet's priority class is available, then that slot is chosen as the one to which the received packet will be written. If there is more than one available slot for the packet's priority class, then the packet insertion module 704 is free to choose any of these slots as the one to which the received packet will be written. It is advantageous to provide a mechanism ensuring that slots are always available for the packet's priority class, as this prevents having to discard or reject packets. One possible form of implementation of this mechanism is the regulation circuitry on off-chip packet-forwarding module 226, which would only have transmitted to cell $114_J$ if it knew that there was room in the transmitter 140 for a packet having the priority class in question. This feature will be described in greater detail later in this specification.

Having determined the segment and the slot into which the received packet shall be written to, the packet insertion module 704 determines a corresponding base address in the data memory 702. This may be done either by computing an offset that corresponds to the relative position of the segment and the relative position of the slot or by consulting a lookup table that maps segment and slot combinations to addresses in the data memory 702.

The packet insertion module 704 is adapted to provide the base address to the data memory 702 via the write_address line 716 and is further adapted to assert the write_enable line 718. At approximately the same time, the packet insertion module 704 sends a signal to queue controller 710$_j$ along the appropriate new_packet line 728$_j$, such signal being indicative of the identity of the slot that is being written to and the priority level of the packet which is to occupy that slot. Queue controller 710$_j$ is adapted to process this signal by updating the status and priority information associated with the identified slot (which was previously unoccupied).

After the first word of the received packet is written to the above-determined base address of the data memory 702, the address on the write_address line 716 is then incremented at each clock cycle (or at each multiple of a clock cycle) as new words are received along the data path 230. This will cause the words of the packet to fill the chosen slot in the data memory 702. Meanwhile, the packet insertion module 704 monitors the EOP bit 368 in each received word. When a new packet is detected, the above process re-starts with extraction of control information from the header 360 of the newly received packet.

In addition to being writable, the data memory 702 is also readable in response to a read address supplied by an arbiter 760 along a read_address line 792. In one embodiment, this may be implemented as a dual-port random access memory (RAM). In another embodiment, multiple data memories 702 may share a read port while each having an independent write port. As will be described in greater detail later on, the arbiter 760 initiates reads from the data memory 702 as a function of requests received from the plurality of queue controllers 710 via a corresponding plurality of request lines 703. A particular request line 703$_j$ will be asserted if the corresponding queue controller 710$_j$ is desirous of forwarding a packet to receiver 150$_J$ in cell 114$_J$.

One possible implementation of a queue controller, say, queue controller 710$_j$, adapted to generate a request for transmission of a received packet will now be described. Specifically, queue controller 710$_j$ is operable to generate a request for transmitting one of the possible multiplicity of packets occupying the slots 708$_{j,A}$, 708$_{j,B}$, . . . , 708$_{j,M}$ in the data memory 702. The identity of the slot chosen to be transmitted is provided along a corresponding one of a plurality of slot_id lines 705$_j$ while the priority associated with the chosen slot is provided on a corresponding one of a plurality of priority lines 707$_j$.

Each queue controller 710$_j$ implements a function which determines the identity of the occupied slot which holds the highest-priority packet that can be accommodated by the receiver in the destination cell. This function can be suitably implemented by a logic circuit, for example. By way of example, each of the queue controllers 710$_j$ in the transmitter 140 in cell 114$_I$ can be designed to verify the entries in the associated control memory 712$_j$ in order to determine, amongst all occupied slots associated with segment 713$_j$ in the data memory 702, the identity of the slot holding the highest-priority packet. Queue controller 710$_j$ then assesses the ability of the receiver in the destination cell (i.e., receiver 150$_j$ in cell 114$_j$) to accommodate the packet in the chosen slot by processing information received via the corresponding back channel 212$_{j,J}$.

In one embodiment of the present invention, receiver 150$_j$ in cell 114$_j$ will comprise a set of M* slots similar to the M slots in the j$^{th}$ segment 713$_j$ of the data memory 702, although M* may be different from M. The information carried by back channel 212$_{j,J}$ in such a case will be indicative of the status (occupied or unoccupied) of each of these M* slots. (Reference may be had to FIG. 5, where the receiver slots are denoted 508. This Figure will be described in greater detail later on when describing the receiver.) Thus, by consulting back channel 212$_{j,J}$, queue controller 710$_j$ in cell 114$_J$ has knowledge of whether or not its highest-priority packet can be accommodated by the associated receiver 150$_J$ in cell 114$_j$.

If the highest-priority packet can indeed be accommodated, then queue controller 710$_j$ places the identity of the associated slot on the corresponding slot_id line 705$_j$, places the priority level of the packet on the corresponding priority line 707$_j$ and submits a request to the arbiter 760 by asserting the corresponding request line 703$_j$. However, if the highest-priority packet cannot indeed be accommodated, then queue controller 710$_j$ determines, among all occupied slots associated with the segment 713$_j$ in the data memory 702, the identity of the slot holding the next-highest-priority packet. As before, this can be achieved by processing information received via the corresponding back channel 212$_{j,J}$.

If the next-highest-priority packet can indeed be accommodated, then queue controller 710$_j$ places the identity of the associated slot on the corresponding slot_id line 705$_j$, places the priority level of the packet on the corresponding priority line 707$_j$ and submits a request to the arbiter 760 by asserting the corresponding request line 703$_j$. However, if the next-highest-priority packet cannot indeed be accommodated, then queue controller 710$_j$ determines, among all occupied slots associated with the segment 713$_j$ in the data memory 702, the identity of the slot holding the next-next-highest-priority packet, and so on. If none of the packets can be accommodated or, alternatively, if none of the slots are occupied, then no request is generated by queue controller 710$_j$ and the corresponding request line 703$_j$ remains unasserted.

Assuming that queue controller 710$_j$ has submitted a request and has had its request granted, it will be made aware of this latter fact by the arbiter 760. This exchange of information can be achieved in many ways. For example, the arbiter 760 may identify the queue controller whose request has been granted by sending a unique code on a grant line 711 and, when ready, the arbiter 760 may assert a grant_enable line 715 shared by the queue controllers 710. Queue controller 710$_j$ may thus establish that its request has been granted by (i) detecting a unique code in the signal received from the arbiter via the grant line 711; and (ii) detecting the asserted grant_enable line 715.

It should be understood that other ways of signaling and detecting a granted request are within the scope of the present invention. For example, it is feasible to provide a separate grant line to each queue controller; when a particular queue controller's request has been granted, the grant line connected to the particular queue controller would be the only one to be asserted.

Upon receipt of an indication that its request has been granted, queue controller 710$_j$ accesses the entry in the control memory 712$_j$ corresponding to the slot whose packet now faces an imminent exit from the data memory 702 under the control of the arbiter 760. Specifically, queue controller 710$_j$ changes the status of that particular slot to "unoccupied", which will alter the result of the request computation logic, resulting in the generation of a new request that may specify a different slot. The changed status of a slot will also be reflected in the information subsequently provided upon request to the packet insertion module 704 via the corresponding queue_full line 726$_j$.

Also upon receipt of an indication that its request has been granted, queue controller 710$_j$ asserts a corresponding pointer_update line $729_j$ which returns back to the arbiter 760. As will be described later on in connection with the arbiter 760, assertion of one of the pointer_update lines $729_j$ indicates to the arbiter 760 that the grant it has issued has been acknowledged, allowing the arbiter 760 to proceed with preparing the next grant, based on a possibly new request from queue controller $710_j$ and on pending requests from the other queue controllers 710.

The function of the arbiter 760 is to grant one of the requests received from the various queue controllers 710 and to consequently control read operations from the data memory 702. To this end, the arbiter 760 comprises a request-processing module 770, an address decoder 780 and a packet-forwarding module 790.

The request-processing module 770 receives the request lines 703, the priority lines 707 and the pointer_update lines 729 from the queue controllers 710. The request-processing module 770 functions to grant only one of the possibly many requests received from the queue controllers 710. The request-processing module 770 has an output which is the grant line 711. The grant line 711 is connected to each of the queue controllers 710, as well as to the address decoder 780. In one embodiment of the present invention, the grant line 711 utilizes a unique binary code to identify the queue controller whose request has been granted.

The address decoder 780 receives the grant line 711 from the request-processing module 770 and the slot_id lines 705 from the queue controllers 710. The address decoder 780 computes a base address in the data memory 702 that stores the first word of the packet for which transmission has been granted. The base address is provided to the packet-forwarding module 790 via a base_address line 782.

The packet-forwarding module 790 receives, via the base_address line 782, the location of the first word of the next packet that it is required to extract from the data memory 702. The packet-forwarding module 790 stores the initial address on the base_address line 782. Once it has finished reading the current packet from the data memory 702, the packet-forwarding module 790, asserts the grant_enable line 715 and proceeds to cause words to be read from the data memory 702, starting at the initial address.

One possible implementation of the request-processing module 770, the address decoder 780 and the packet-forwarding logic 790 is now described with additional reference to FIG. 4. The request processing section 770 comprises a request generator 420, which is connected to the queue controllers 710 (not shown in FIG. 4) via the request lines 703 and the priority lines 707. The request generator 420 is also connected to a programmable round-robin arbiter (PRRA) 422 via a plurality of request lines 424 and may further be connected to a pointer control entity 412 via a control line 413.

The request generator 420 is adapted to admit only those requests associated with the maximum priority level amongst all the priority levels specified on the priority lines 707. To this end, the request generator 420 may be implemented as a maximum comparator that outputs the maximum value of the (up to N) received priority levels; this maximum value is then compared to all of the received priority levels on the priority lines 707, which would result in an individual one of the request lines 424 being asserted when the corresponding one of the request lines 703 is associated with the maximum priority level; the other request lines 424 would remain unasserted. As these highest-priority requests are eventually granted, the queue controllers 710 will generate new requests on the request lines 703, causing the output of the request generator 420 to change over time.

The requests on the request lines 424 are processed by the PRRA 422. The PRRA 422 has an output that is the shared grant line 711 that is provided to the queue controllers 710, to the pointer control entity 412 and to an address decoder 780. Among the possibly one or more request lines 424 being asserted, only one of these will be granted by the PRRA 422 as a function of a "pointer" and a "mask" produced by the pointer control entity 412. As already described, the grant line 711 identifies the queue controller whose request has been granted, suitably in the form of a binary code which can uniquely identify each of the queue controllers 710.

In one embodiment, a pointer and a mask are defined for each of one or more possible priority levels. The mask associated with a given priority level indicates which queue controllers associated with that priority level remain as yet ungranted, while the pointer associated with a given priority level indicates which of the queue controllers 710 was the most recent one to have its request granted. Among the multiple sets of pointer and mask pairs, the pointer control entity 412 submits only one pointer and one mask to the PRRA 422 at any given time.

To compute the pointer and the mask, the pointer control entity 412 requires knowledge of the information on the request lines 703 and the priority lines 707. This knowledge may be obtained either directly or from the request generator 420 via the control line 413. In addition, the pointer control entity 412 requires knowledge of the information circulating on the pointer_update lines 729 received from the queue controllers 710. As may be appreciated from the following, the pointer and mask submitted to the PRRA 422 allow it to be "fair" in deciding which should be the next queue controller to see its request granted.

To simplify the description, but without limiting the scope of the invention, it can be assumed that a pointer and a mask are not defined for each possible priority level, but rather for each of a set of priority classes, namely high, medium and low. As shown in FIG. 7, transmitter 140 comorises N queue controllers $710_j$, $1 \leq j \leq N$. While it is expressly understood that N can be any positive integer, by way of example let it be assumed for the moment that N=4, i.e., there are four queue controllers $710_1$, $710_2$, $710_3$, $710_4$ that submit requests to the request generator 420.

By way of this example, let the requests from queue controllers $710_1$, $710_2$, $710_3$, $710_4$ be associated with medium, NONE, low and medium priority classes, respectively. That is to say, queue controller $710_2$ has not submitted a request. Accordingly, the initial "high" mask would be 0000 (as no request has a high priority class), the initial "medium" mask would be 1001 (as queue controllers $710_1$ and $710_4$ have submitted requests associated with a medium priority class) and the initial "low" mask would be 0010 (as queue controller $710_3$, has submitted a request associated with a low priority class). The initial value of each pointer would be set to zero, as no request has yet been granted.

In this example, the maximum priority class is medium. Hence, the request generator 420 submits only queue controller $710_1$'s request and queue controller $710_4$'s request to the inputs of the PRRA 422. Furthermore, the pointer control entity 412 provides the medium pointer and the medium mask to the PRRA 422. As a result, the first request to be granted would thus be the either one submitted by either queue controller $710_1$ or the one submitted by queue controller $710_4$. Since the medium pointer is zero, the PRRA 422 has the choice of which request to grant; this can be resolved by providing simple, passive logic to make the selection. Without loss of generality, let the very first granted request be that submitted by queue controller $710_1$. The signal on the grant line 711 could accordingly be set to encode the value "1", indicative of the subscript 1 in $710_1$.

As already described, queue controller $710_1$ is adapted to acknowledge the grant of its request by way of the pointer_update line $729_1$. Receipt of any acknowledgement by the pointer control entity 412 causes it to update its "active" pointer (namely, the one being provided to the PRRA 422). In this case, the acknowledgement received from queue controller $710_1$ causes the pointer control entity 412 to update the medium pointer to 1000.

Note that because its request has been granted, queue controller $710_1$ will update the occupancy information in the appropriate entry in control memory $712_1$, which may result in the submission of a new request to the request generator 420. Assume for the moment that queue controller $710_1$'s request has the same priority class as before, namely, medium. This causes the medium mask to become 0001, indicating that queue controller $710_4$'s request still has not been granted in this round.

Now, assume that queue controller $710_3$ at this point submits a high-priority request. This causes only queue controller $710_3$'s request to make it past the request generator 420. The PRRA 422 therefore has no choice but to grant queue controller $710_3$'s request. The signal on the grant line 711 could accordingly be set to encode the value "3", indicative of the subscript 1 in $710_3$.

Queue controller $710_3$ subsequently acknowledges the grant of its request by asserting the corresponding pointer_update line $729_3$. Receipt of this acknowledgement by the pointer control entity 412 causes it to update its active pointer, in this case the high pointer, which will become 0010. Note that since its request has been granted, queue controller $710_3$ may now submit a new request but assume for the purposes of this example that it does not. The situation reverts to the previous one where the requests having the maximum priority class are again those coming from queue controllers $710_1$ and $710_4$.

Thus, the request generator 420 submits only queue controller $710_1$'s request and queue controller $710_4$'s request to the inputs of the PRRA 422, while the pointer control entity 412 provides the medium pointer (1000) and the medium mask (0001) to the PRRA 422. This indicates to the PRRA 422 that queue controller $710_4$ has yet to be granted in this round and that the most recent queue controller to be granted was queue controller $710_1$. Hence, the PRRA 422 has no choice but to grant queue controller $710_4$, even though queue controller $710_1$ also submitted a request having the same priority class. Still, this outcome is fair because queue controller $710_1$'s request was granted last time.

It should therefore be appreciated that use of a pointer and a mask results in a fair arbitration process. In the absence of the pointer and mask being provided to the PRRA 422, the PRRA's simple logic would continue to grant queue controller $710_1$ each time the situation would revert to one in which queue controller $710_1$ would be among the set of queue controllers having the maximum priority class. Thus, it should be apparent that the pointer control entity 412 allows the PRRA 422 to grant requests in a truly fair manner; in the above example, queue controller $710_1$ was prevented from unjustly monopolizing the data path 202.

Those skilled in the art should appreciate that other techniques for arbitrating amongst a plurality of requests are within the scope of the present invention. For example, although the pointer control entity 412 is useful in transforming the PRRA 422 into a fair round robin arbitrator, it is not an essential requirement of the invention. In fact, even a simple priority comparator would achieve the task of admitting only one of the requests and blocking the rest.

It should further be appreciated that if no requests are submitted to the request generator 420, then no request would end up being granted by the PRRA 422. In this case, the output of the grant line 711 at the output of the PRRA could be set to encode a value that does not identify any of the queue controllers, for example "FFFFFFFF" or "deadcode" in hexadecimal.

In addition to being provided to the queue controllers 710, the code specified in the signal on the grant line 711 is also provided to the address decoder 780. The address decoder 780 is adapted to compute a base address as a function of the code specified on the grant line 711 and on the contents of the particular slot_id line indexed by the code specified on the grant line 711. That is to say, the address decoder 780 uses the grant line to identify a segment in the data memory 702 and to index the slot_id lines 705 in order to identify a slot within the identified segment.

To this end, the address decoder 780 may comprise a multiplexer 784 and a combiner 786. The multiplexer 784 receives the slot_id lines 705 and is selectable by the grant line 711. The grant line 711 and the output of the multiplexer 784 feed into the combiner 786. If the code on the grant line 711 specifies an existing one of the queue controllers 710 (rather than the above-mentioned hexadecimal "FFFFFFFF" or "deadcode"), the combiner 786 is operable to output a base address which is equal to the sum of the segment size (i.e., M×the packet size) times the code specified on the grant line and the packet size times the output of the multiplexer 784. The base address is provided to the packet-forwarding module 790 along the base_address line 782.

It should be understood that if the code on the grant line 711 indicates that no request has been granted, then the signal provided on the base_address line 782 can also be set to encode a predetermined code that does not refer to any address in the data memory 702, for example "FFFFFFFE" or "deadcode" in hexadecimal.

The packet-forwarding module 790 receives the base address from the address decoder 780 along the base_address line 782. The base address indicates the starting address of the next packet to be read out of the data memory 702 by the packet-forwarding module 790. However, the packet-forwarding module 790 in the arbiter 760 in cell $114_J$ may be in the process of placing a current packet onto the forward channel $210_J$ and thus the packet-forwarding module 790 is operable to wait until it has finished reading out the current packet before beginning to cause the next packet to be read from the data memory.

In order to determine the end of the current packet, the packet-forwarding module 790 monitors the EOP bit 368 of each word being forwarded along forward channel $210_J$ by the data memory 702. The EOP bit 368 from successive words forms a EOP bit stream which will undergo a transition (e.g., falling edge) at a predetermine number of words prior to the end of the packet. In this way, the packet-forwarding module 790 knows when it is near the end of a packet.

Upon detecting a falling edge in the EOP bit stream, the packet-forwarding module 790 records the base address provided on the base_address line 782 and triggers the next grant via the grant_enable line 715. The packet-forwarding module 790 then proceeds to cause the words of the next packet to be read from the data memory 702. This is achieved by providing a read address along a read_address line 792. The first address placed on the read_address line 792 is the base address and the address is incremented until the end of this next packet is detected, and so on.

Assertion of the grant_enable line 715 causes the following chain reaction. Specifically, assertion of the grant_enable line 715 will affect only the queue controller whose request has been granted. Assume, for the sake of this example, that this queue controller is queue controller 710$_j$, and that it had requested transmission of the packet in slot 708$_{j,B}$. Upon detection of the grant_enable line 715 being asserted, queue controller 710$_j$ will send an acknowledgement via the corresponding pointer_update line 729$_j$, which will trigger an update in the active pointer stored by the pointer control entity 412 and used by the PRRA 422. In addition, queue controller 710$_j$ will access entry 714$_{j,B}$, which is associated with slot 708$_{j,B}$. More specifically, it will modify the occupancy status of slot 708$_{j,B}$ to indicate that this slot is no longer occupied.

Modification of the occupancy status of slot 708$_{j,B}$ may cause one or more of the following:
  (i) Firstly, the change in occupancy status may cause the logic in the queue controller 710$_j$ to update the signals on the corresponding request line 703$_j$, slot_id line 705$_j$ and priority line 707$_j$;
  (ii) Secondly, the change in occupancy status will be signaled to the packet insertion module 704 via the queue_full line 726$_j$, which may change the outcome of the decision regarding where a received packet may be inserted;
  (iii) Thirdly, the change in occupancy status will be sent to the input interface 116 via the free_slot line 207$_j$; the input interface 116 subsequently alerts the off-chip packet-forwarding module 226 that there is room in slot 708$_{j,B}$, which may trigger the transmittal of a new packet to the transmitter 140 via the input interface 116.

Depending on the interconnect pattern, a packet transmitted from one cell 114$_j$ arrives at the corresponding receiver 150$_j$ in one or more cells (possibly including cell 114$_j$ itself) by virtue of the corresponding shared forward channel 210$_j$. Of course, some of the cells receiving the packet will be destination cells for that packet while others will not. The structure and operation of a receiver, say, receiver 150$_j$ in cell 114$_K$, is now described with reference to FIG. 5.

The receiver 150$_j$ has a memory which includes various storage areas, including a data memory 502, a control memory 512, any memory used by a queue controller 510 and any other memory used by the receiver 150$_j$. Words received via forward channel 210$_j$ and destined for receiver 150$_j$ in cell 114$_K$ are fed to the data memory 502 via a plurality of data input ports.

The data memory 502 is writable in response to a write address and a write enable signal received from a packet insertion module 504 via a write_address line 516 and a write_enable line 518, respectively. The write_address line 516 carries the address in the data memory 502 to which the word presently on the forward channel 210$_j$ is to be written, while the actual operation of writing this word into the specified address is triggered by asserting a signal on the write_enable line 518. In order to coordinate the arrival of packets at the data memory 502 with the generation of signals on the write_address line 516 and the write_enable line 518, the forward channel 210$_j$ may pass through an optional delay element 506 before entering the data input ports of the data memory 502.

The data memory 502 contains M* slots 508$_A$, 508$_B$, . . . , 508$_{M*}$, where each slot is large enough to accommodate a packet as described herein above. Thus, the data memory requirement for a receiver 150 is M* packets. The data memory 502 may be referred to as a sector of memory and slots 508 may be referred to as subdivisions. Recalling that the transmitter 140 on a given cell needs to fit N×M packets, and given that there are N receivers per cell and N cells per chip 110, the total data memory requirement for the chip 110 is on the order of N×((N×M)+(N×M*)) packets, which is equal to $N^2 \times (M+M^*)$ packets, not counting the memory requirement of the other components such as the queue controllers, PRRA, etc.

Clearly, the total memory requirement for the chip 110 is a quadratic function of the number of cells and a linear function of both M and M*. Given a fixed number of cells, the memory requirement can be tamed only by varying M and M*. It is therefore of importance to pay attention to the values of M and M* when aiming for a design that requires all the cells to fit on a chip.

The relationship between M* and M is also important. For instance, to make M* greater than M would mean that more packets can be stored in the receiver than in the segment of the transmitter dedicated to that receiver. Although this option is within the scope of the present invention, it is does not allow all M* slots of the receiver to be kept busy, thereby missing out on an otherwise available degree of parallelism. A borderline case, also within the scope of the invention, arises where M* is equal to M, although even a single-cycle latency will put a high degree of parallelism out of reach.

Thus, the preferred approach is to make M* (the receiver data memory size) less than M (the transmitter per-segment data memory size). An even more preferred approach makes M* just slightly less than M in order to minimize overall memory. An even more highly preferred approach makes M* just large enough to accommodate a small number of packets associated with each priority "rank" (e.g., high, medium low) to allow additional packets of a given priority to be received while status information is returned via the appropriate back channel, while making M equal to or slightly less than the double of M*. For instance, suitable values of M and M* include, but are not limited to 3 and 5, respectively or 4 and 7, respectively. In one specific embodiment of the invention, the data memory 502 includes three slots 508$_A$, 508$_B$, 508$_C$, where slot 508$_A$ is associated with a high priority class, slot 508$_B$ is associated with a medium priority class and slot 508$_C$ is associated with a low priority class.

The receiver 150$_j$ also comprises queue controller 510. Queue controller 510 has access to control memory 512 which is subdivided into a plurality of entries 514$_A$, 514$_B$, . . . , 514$_{M*}$ for storing the occupancy status (i.e., occupied or unoccupied) of the respective slots 508$_A$, 508$_B$, . . . , 508$_{M*}$ in the data memory 502. Additionally, for each slot that is occupied, the corresponding entry stores the priority level of the packet occupying that slot. In one embodiment, the entries 514$_A$, 514$_B$, . . . , 514$_{M*}$ may take the form of registers, for example. In other embodiments, the control memory 512 may store a degree of occupancy or vacancy of the data memory 502.

The packet insertion module 504 is operable to monitor the EOP bit 368 on each word received via the forward channel 210$_j$ in order to locate the header of newly received packets. It is recalled that the EOP bit 368 undergoes a transition (e.g., falling edge) for the word that occurs in a specific position within the packet to which it belongs. In this way, detection and monitoring of the EOP bit 368 provides the packet insertion module 504 with an indication as to when a new packet will be received and, since the header 360 is located at the beginning of the packet, the packet insertion module 504 will know where to find the header 360 of a newly received packet.

The packet insertion module 504 extracts control information from the header 360 of each newly received packet. Such information includes the destination of a newly received packet and its priority level for the purposes of determining into which slot it should be placed in the data memory 502. The packet insertion module 504 accepts packets destined for cell $114_K$ and ignores packets destined for other cells. The packet insertion module 504 also determines the slot into which an accepted and received packet should be inserted. This is achieved by determining the priority class of the received packet and verifying the availability of the slot(s) associated with that priority class.

To this end, the packet insertion module 504 in cell $114_K$ is operable to verify whether the destination specified in the destination field 360 of the received packet corresponds to cell $114_K$. In the case where all packets are non-multicast packets, each packet specifies but a single destination cell and hence this portion of the packet insertion module 504 functionality may be achieved by a simple binary comparison. Packets found to be destined for cell $114_K$ are accepted for further processing while others are ignored.

Assuming that a received packet is accepted, the packet insertion module 504 is operable to determine the priority class of the packet by comparing the priority level of the packet to the previously defined priority thresholds. By way of example, as suggested herein above, let slots $508_A$, $508_B$, $508_C$ be associated with high, medium, and low priority levels, respectively. Also, let the low-medium priority threshold and the medium-high priority threshold be established as previously defined, namely, at 100 and 200, respectively. If the priority level of the received packet is 83, for example, then the slot into which it should be written would be slot $508_C$.

In this embodiment, the packet insertion module 504 knows that it can write the received packet into slot $508_C$ because, it will be recalled, the packet could only be transmitted on the forward channel $210_j$ if the corresponding slot were available in the first place. Nonetheless, it is within the scope of the present invention to include larger numbers of slots where more than one slot would be associated with a given priority class, which may require the packet insertion module 504 to verify the occupancy of the individual slots 508 by consulting a queue_full line 526 received from the queue controller 510.

Next, the packet insertion module 504 determines a corresponding base address in the data memory 502 into which the first word of the packet is to be written. This may be done either by computing an offset which corresponds to the relative position of the chosen slot (in this case slot $508_C$) or by consulting a short lookup table that maps slots to addresses in the data memory 502.

The packet insertion module 504 is operable to provide the base address to the data memory 502 via the write_address line 516 and is further operable to assert the write_enable line 518. At approximately the same time, the packet insertion module 504 sends a signal to the queue controller 510 along a new_packet line 528, such signal being indicative of the identity of the slot which is being written to and the priority level of the packet which shall occupy that slot. The queue controller 510 is adapted to process this signal by updating the status and priority information associated with the identified slot (which was previously unoccupied).

After the first word of the received packet is written to the above-determined base address of the data memory 502, the address on the write_address line 516 is then incremented at each clock cycle (or at each multiple of a clock cycle) as new words are received along the forward channel $210_j$. This will cause the words of the packet to fill the chosen slot in the data memory 502. Meanwhile, the EOP bit 368 in each received word is monitored by the packet insertion module 504. When a new packet is detected, the above process re-starts with extraction of control information from the header 360 of the newly received packet.

In addition to being writable, the data memory 502 is also readable in response to receipt of a read address supplied along a corresponding read_address line $593_j$ by an arbiter 260 common to all receivers 150 in the cell $114_K$. As will be described in greater detail later on, the arbiter 260 initiates reads from the data memory 502 as a function of requests received from the queue controller 510 on each of the receivers 150 via a corresponding plurality of request lines 503. A particular request line $503_j$ will be asserted if the queue controller 510 in the corresponding receiver $150_j$ is desirous of forwarding a packet to the off-chip input queue 228. Embodiments of the invention may include, without being limited to the use of, dual ported RAM or single ported RAM.

The following describes one possible implementation of the queue controller 510 in receiver $150_j$, which is adapted to generate a request for transmission of a received packet. Specifically, the queue controller 510 is operable to generate a request for transmitting one of the possible multiplicity of packets occupying the slots $508_A$, $508_B$, ..., $508_{M^*}$ in the data memory 502. The identity of the slot chosen to be transmitted is provided along a corresponding slot_id line $505_j$, while the priority associated with the chosen slot is provided on a corresponding priority line $507_j$.

The queue controller 510 implements a function which verifies the entries in the control memory 512 in order to determine the identity of the occupied slot which holds the highest-priority packet that can be accommodated by the off-chip input queue 228. This function can be suitably implemented by a logic circuit, for example. By way of example, the queue controller 510 is designed to determine, amongst all occupied slots in the data memory 502, the identity of the slot holding the highest-priority packet. The queue controller 510 then assesses the ability of the off-chip input queue 228 to accommodate that packet by processing information received via the almost_full flag 208.

If the almost_full flag 208 is asserted, then it may be desirable to refrain from requesting the transmittal of further packets to the off-chip input queue 228. In some embodiments of the invention, the almost_full flag 208 may consist of a plurality of almost_full flags, one for each priority class (high, medium, low). This allows preferential treatment for high-priority packets by setting the occupancy threshold for asserting the high-priority almost_full flag higher than the threshold for asserting the low-priority almost_full flag.

If the highest-priority packet can indeed be accommodated, then the queue controller 510 places the identity of the associated slot on the corresponding slot_id line $505_j$, places the priority level of the packet on the corresponding priority line $507_j$ and submits a request to the arbiter 260 by asserting the corresponding request line $503_j$. However, if the highest-priority packet cannot indeed be accommodated, then the queue controller 510 determines, among all occupied slots in the data memory 502, the identity of the slot holding the next-highest-priority packet. As before, this can be achieved by processing information received via the almost_full flag 208.

If the next-highest-priority packet can indeed be accommodated, then queue controller 510 places the identity of the associated slot on the corresponding slot_id line $505_j$, places the priority level of the packet on the corresponding priority line $507_j$ and submits a request to the arbiter 260 by asserting the corresponding request line $503_j$. However, if the next-highest-priority packet cannot indeed be accommodated, then the queue controller 510 determines, among all occupied slots in the data memory 502, the identity of the slot holding the next-next-highest-priority packet, and so on. If none of the packets can be accommodated or, alternatively, if none of the slots are occupied, then no request is generated by the queue controller 510 and the corresponding request line $503_j$ remains unasserted.

Assuming that the queue controller 510 has submitted a request and has had its request granted, it will be made aware of this latter fact by the arbiter 260. This exchange of information can be achieved in many ways. For example, the arbiter 260 may identify the receiver containing the queue controller whose request has been granted by sending a unique code on a common grant line 511 and, when ready, the arbiter 260 may assert a grant_enable line 515 shared by the queue controller 510 in each of the receivers 150. The queue controller 510 may thus establish that its request has been granted by (i) detecting a unique code in the signal received from the arbiter 260 via the grant line 511; and (ii) detecting the asserted grant_enable line 515.

It should be understood that other ways of signaling and detecting a granted request are within the scope of the present invention. For example, it is feasible to provide a separate grant line to the queue controller in each of the receivers 150. In this case, when the request of a queue controller in a particular one of the receivers has been granted, the grant line connected to the particular receiver would be the only one to be asserted.

Upon receipt of an indication that its request has been granted, the queue controller 510 accesses the entry in the control memory 512 corresponding to the slot whose packet now faces an imminent exit from the data memory 502 under the control of the arbiter 260. Specifically, the queue controller 510 changes the status of that particular slot to "unoccupied", which will alter the result of the request computation logic, resulting in the generation of a new request which may specify a different slot. In the case where the packet insertion module 504 needs to know the status of a slot, the changed status of a slot will be reflected in the information provided via the queue_full line 526.

Also upon receipt of an indication that its request has been granted, the queue controller 510 asserts a corresponding pointer_update line $529_j$ which runs back to the arbiter 260. As will be described later on in connection with the arbiter 260, assertion of one of the pointer_update lines $529_j$ indicates to the arbiter 260 that the grant it has issued has been acknowledged, allowing the arbiter 260 to proceed with preparing the next grant, based on a possibly new request from the queue controller 510 in receiver $150_j$ and on pending requests from queue controllers in other ones of the receivers 150.

The function of the arbiter 260 is to receive a request from the queue controller 510 in each of the receivers 150, to grant only one of the requests and to control read operations from the data memory 502. To this end, the arbiter 260 comprises a request-processing module 570, an address decoder 580 and a packet-forwarding module 590. The arbiter 260 is very similar to the arbiter 760 previously described with reference to FIG. 4, with some differences in the implementation of the address decoder 580 and the packet-forwarding module 590.

The request-processing module 570 receives, from the queue controller 510 in receiver $150_j$, the corresponding request line $503_j$, the corresponding priority lines $505_j$ and the corresponding pointer_update line $529_j$. The request-processing module 570 functions to grant only one of the possibly many requests received in this fashion. The request-processing module 570 has an output which is the grant line 511. The grant line 511 is connected to each of the queue controller 510 in each receiver, as well as to the address decoder 580. In one embodiment of the present invention, the grant line 511 utilizes a unique binary code to identify the queue controller whose request has been granted.

The address decoder 580 receives the grant line 511 from the request-processing module 570 and the slot_id lines 505 from the queue controller 510 in each of the receivers 150. The address decoder 580 computes a base address in the data memory 502 that stores the first word of the packet for which transmission has been granted. The base address is computed as a function of the code specified on the grant line 511 and on the contents of the particular slot_id line indexed by the code specified on the grant line 511. That is to say, the address decoder 580 uses the grant line to identify the receiver and to index the slot_id lines 505 in order to identify a slot within the data memory 502 of the identified receiver. The base address is provided to the packet-forwarding module 590 via a base_address line 582.

The packet-forwarding module 590 receives a base address via the base_address line 582. In addition, the packet-forwarding module 590 receives the grant line 511 from the request-processing module 570. The base address indicates the location of the first word of the next packet that is required to be extracted from the data memory 502 of the receiver identified on the grant line 511.

Since the packet-forwarding module 590 may be in the process of reading a current packet from the data memory of another one of the receivers, the packet-forwarding module 590 is programmed to wait until it has finished reading out the current packet before beginning to read the next packet. After it has finished reading the current packet from whichever data memory it is currently reading, the packet-forwarding module 590 stores the initial address on the base_address line 582, asserts the grant_enable line 515 and proceeds to read from the data memory 502 identified by the grant line 511, starting from the base address.

The output of the data memory 502 in the various receivers 150 arrives at a respective input port of a multiplexer 592. The multiplexer has an output which is placed onto the data path 202. Selection of which input port appears on the output port is controlled by a select line 595 received from the packet forwarding module 590. The select line 595 is a latched version of the grant line 511. Latching of the select line 595 occurs upon receipt of the grant_enable line 515.

In order to determine the end of the current packet, the packet-forwarding module 590 monitors the EOP bit 368 of each word traveling along the data path 202. The EOP bit 368 from successive words forms an EOP bit stream which will undergo a transition (e.g., falling edge) at a predetermine number of words prior to the end of the packet. In this way, the packet-forwarding module 590 knows when it is near the end of a packet. Upon detecting a falling edge in the EOP bit stream, the packet-forwarding module 590 records the base address provided on the base_address line 582 and triggers the next grant via the grant_enable line 515.

The packet-forwarding module 590 then proceeds to cause the words of a packet to be read from the data memory

502 of the receiver indexed by the grant line 511. This is achieved by providing a read address along the corresponding read_address line 593$_j$. The first address placed on the read_address line 593$_j$ is the base address and the address is incremented until the end of the next packet is detected, and so on. It will be appreciated that rather than providing a separate read_address line for each receiver, there may be a single read_address line which passes through a demultiplexer (not shown) that is under control of the signal on the grant line 511.

Assertion of the grant_enable line 515 causes the following chain reaction. Specifically, assertion of the grant_enable line 515 will affect only the queue controller 510 on the receiver identified by the signal on the grant line 511. Assume, for the sake of this example, that the queue controller in question is the one in receiver 150$_j$, and that it had requested transmission of the packet in slot 508$_C$. Upon detection of the grant_enable line 515, the queue controller 510 will send an acknowledgement to the arbiter 260 via the corresponding pointer_update line 529$_j$, which will trigger an update in the active pointer stored by the pointer control entity and used by the PRRA in the request-processing module 570. In addition, the queue controller 510 will access entry 514$_C$, which is associated with slot 508$_C$. More specifically, it will modify the occupancy status of slot 508$_C$ to indicate that this slot is no longer occupied.

Modification of the occupancy status of slot 508$_C$ may cause one or more of the following:
  (i) Firstly, the change in occupancy status may cause the logic in the queue controller 510 to update the signals on the corresponding request line 503$_j$, slot_id line 505$_j$ and priority line 507$_j$;
  (ii) Secondly, the change in occupancy status will be signaled to the packet insertion module 504 via the queue_full line 526$_j$, which may change the outcome of the decision regarding where a received packet may be inserted;
  (iii) Thirdly, the change in occupancy status is sent by the queue controller 510 along the back channel 212$_{K,j}$ to the transmitter 140 in cell 114$_j$. This will alert the transmitter that there is room in slot 508$_C$, which may trigger the transmittal of a new packet to the receiver 150$_j$ via forward channel 210$_j$.

Since a new packet will arrive after the old packet has begun to be read, this advantageously results in efficient data pipelining. Where the transmission of a packet is an atomic action that is at least as fast receipt of a new packet, the occupancy status of the slot corresponding to the old packet can be set to "no longer occupied" as soon transmission begins. If receipt can be up to twice as fast as transmission, the occupancy status may be reset when one-half of the packet is transmitted, etc. Moreover, as already described, the features of the transmitter 140 will prevent transmission of a packet to occur unless the packet can be accommodated by a receiver, thereby advantageously avoiding contention at the receiver which may arise if the transmission were effected without regard to the availability of space further downstream.

A packet entering the switch fabric 100 has a priority level which is identified in the priority field 364 of the packet's header 360. That same priority level is associated with the packet upon exit from the switch fabric 100. Nonetheless, it is within the scope of the present invention to provide a mechanism for temporarily modifying the priority level of the packet while the it is being processed by the transmitter or receiver in a given cell. More specifically, it is within the scope of the invention for the transmitter or receiver on a given cell to maintain a "virtual" priority level associated with a packet and to use the virtual priority level in its decision-making process, without altering the actual priority level of the packet as defined in the packet's header 360. It should therefore be appreciated that the priority level of a packet as stored in an entry of the control memory 512 of the queue controller 510 of the $j^{th}$ receiver 150$_j$ in the $k^{th}$ cell 114$_k$ or in an entry of the control memory 712$_j$ of the $j^{th}$ queue controller 710$_j$ of the transmitter 140 in the $k^{th}$ cell 114$_k$ may refer either to the actual priority level of the packet or to its virtual priority level.

Figure 6:
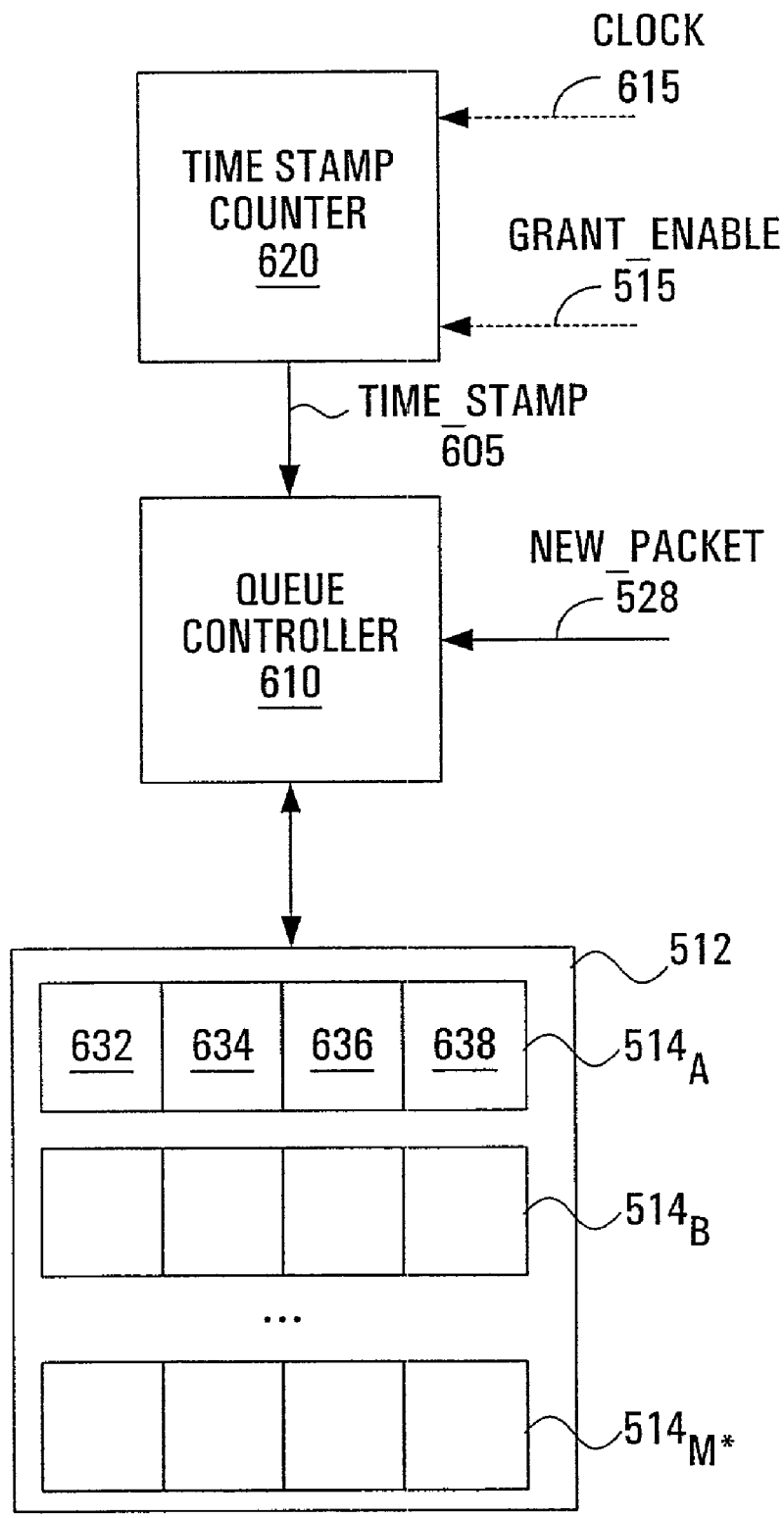
FIG. 6 shows, in schematic form, an arrangement of functional modules used in the administration of an aging policy with respect to packets stored in the receiver of FIG. 5.

With additional reference to FIG. 6, there is shown a queue controller 610, which is a modified version of queue controller 510 which was previously described with reference to the transmitter 140 in FIG. 5. The queue controller 610 has access to a "time stamp" from a time stamp counter 620 via a time_stamp line 605. The time stamp counter 620 is operable to track an ongoing measure of time, such as clock cycles. In other embodiments, time may be measured in terms of a number of elapsed atomic events, a number of transmitted or received packets, etc. Accordingly, the time stamp counter 620 may be driven by the signal on a clock line 615 or on the aforedescribed grant_enable line 515, among others.

The queue controller 610 has access to the control memory 512. It is recalled that the control memory 512 comprises a plurality of entries 514$_A$, 514$_B$, ..., 514$_{M^*}$. Each entry stores information pertaining to a corresponding slot 508 in the data memory 502. As has been previously described, the information in each entry is indicative of the availability of the corresponding slot and the priority level of the packet occupying that slot, if applicable. In order to implement an aging policy, additional information is stored in each of the entries 514.

Accordingly, entry 514$_A$ includes a status field 632, a virtual priority field 634, a time stamp field 636 and an age mask field 638. The status field 632 is indicative of whether slot 508$_A$ is occupied or unoccupied. The virtual priority field is indicative of the current virtual priority of the packet in slot 508$_A$. The time stamp field 636 is indicative of the time stamp which was in force at the time the packet currently occupying slot 508$_A$ was written thereto. The age mask field 638 holds an increment which is added to the virtual priority at specific times as the packet ages. The increment may be fixed or variable, depending on the aging policy being implemented. If it is envisaged that the aging policy will always utilize a fixed aging mask (or if there is no aging policy), then the age mask field 638 is optional.

The queue controller 610 implements an aging policy (e.g., none, linear, exponential, logarithmic) by modifying the virtual priority of a packet as a function of a variety of parameters, including the age of the packet and one or more of the following: the contents of the age mask field 638, the kill limit value (the maximum age for a packet before the packet is eliminated from the data memory, regardless of its priority level), the time interval and the maximum allowable virtual priority level.

Figure 8:
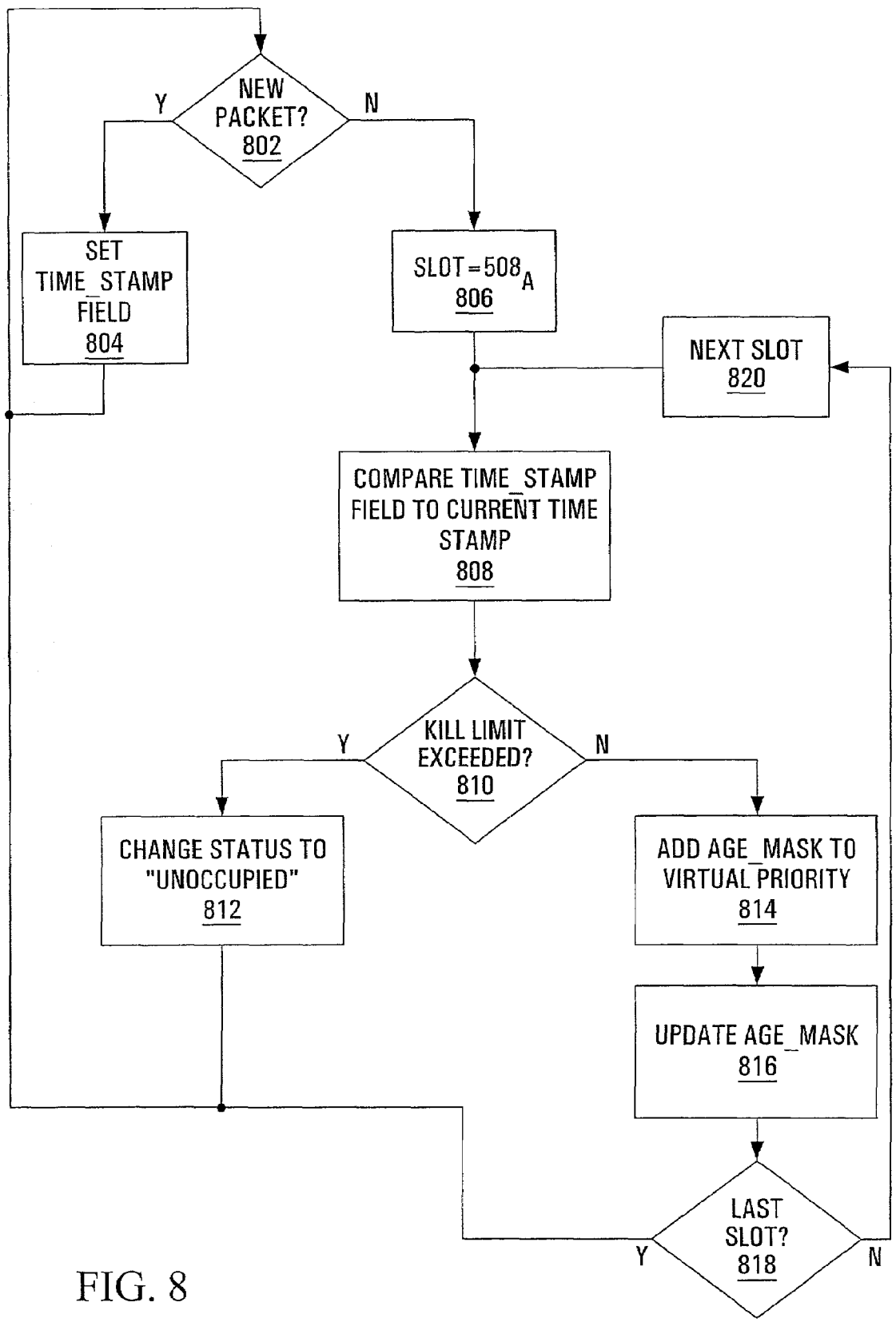
FIG. 8 is a flowchart representing the operational steps executed by the queue controller of FIG. 6 in administering the aging policy.

FIG. 8 illustrates the steps involved in administering an aging policy, in accordance with an embodiment of the present invention. At step 802, the queue controller 610 checks the new_packet line 528 in order to determine whether a new packet is about to be written into a slot in the data memory 502. If so, the new_packet line 528 will indicate the identity of the slot and its priority level. At step 804, the queue controller 610 inserts the time stamp (received from the time stamp counter 620 via the time_stamp line 605) into the time stamp field 636 of the identified slot.

In addition, the queue controller 610 selects a value to insert into the age mask field 638 of the identified slot. This value may be determined as a function of the priority level of the new packet, as received along the new_packet line 528. The queue controller 610 returns to step 802.

If, however, the queue controller 610 establishes at step 802 that no new packet is about to be written into the data memory 502, the queue controller 610 proceeds to step 806, where the queue controller 610 begins by selecting a first slot, say slot $508_A$. The queue controller then executes step 808, which consists of obtaining the value in the time stamp field 636 of the corresponding entry (in this case $514_A$) and subtracting it from the present time stamp as received from the time stamp counter 620. This produces an age value for the packet in the selected slot (in this case $508_A$). At step 808, the queue controller 610 compares the age of the packet in the selected slot to a "kill limit", which represents the maximum allowable age of a packet.

If the kill limit is exceeded at step 810, the queue controller 610 proceeds to step 812, where the packet is effectively "eliminated" from the data memory 502. "Elimination" of a packet from the data memory 502 can encompass actual erasure of the packet from the corresponding slot in the data memory, as well as resetting of the status field 362 in the entry corresponding to the selected slot. After having eliminated the packet from the data memory 502, the queue controller 610 returns to step 802.

If the kill limit is not exceeded at step 810, the queue controller proceeds to step 814, where the contents of the age mask field 368 may or may not be added to the contents of the virtual priority field 364. If the contents of the age mask field 368 is indeed added to the contents of the virtual priority field 364, this results in a higher virtual priority level for the packet in the selected slot (in this case slot $508_A$). Whether the contents of the age mask field 368 is added to the contents of the virtual priority field 364 depends on the aging policy in place. Also dependent on the aging policy is the extent to which the age mask field 638 is updated at step 816.

According to a "no aging" policy, the virtual priority level of a packet does not change over time. According to a linear aging policy, a change is effected to the virtual priority level of a packet at fixed time intervals of duration T by a constant value V. The output of the time stamp counter 620 can be consulted in order to establish whether yet another time interval has elapsed, at which point it would be appropriate to update the virtual priority of the packet. The constant value V may be specified in the age mask field 638 or it may be pre-determined.

According to the "exponential" aging policy, the virtual priority level is incremented by an exponentially increasing value V(t) at fixed time intervals of duration T. Again, the output of the time stamp counter 620 can be consulted in order to establish whether yet another time interval has elapsed, at which point it would be appropriate to update the virtual priority of the packet. In order to create the exponentially increasing value, a dynamic parameter is needed and this is provided by the age mask field 638. Specifically, adding the contents of an ever-increasing age mask field 638 to the contents of the virtual priority field 634 at evenly spaced apart time intervals will result in an exponentially increasing value for the contents of both the age mask field 638 and the virtual priority field 634. In one example embodiment, the contents of the age mask field 638 is doubled every time the virtual priority level of the packet is updated.

According to the "logarithmic" aging policy, the virtual priority level is incremented by a constant value V at time intervals which increase in duration as a function of time. The constant value V may be pre-determined or it may be a function of the actual priority level of the packet. In order to create logarithmically increasing time intervals, a dynamic parameter is needed and this is provided by the age mask field 638. Specifically, by comparing the contents of an ever-increasing age mask field 638 to the time stamp received from the time stamp counter 620 in order to decide whether to update the virtual priority level of the packet will result in such updates happening at a logarithmically decreasing rate. In one example embodiment, the contents of the age mask field 638 is doubled every time the virtual priority level of the packet is updated. This effectively results in a slower aging process for the packet.

Other possible aging policies include but are not limited to policies quadratic and one-time increments or aging tables indexed off of a function of the packet age. Those skilled in the art will be appreciate that a plurality of such aging policies can be implemented, with a different policy applied based on a packet property such as destination, priority, etc.

Finally, at step 818, the queue controller 610 determines whether it has considered all the slots 508 in the data memory 502 (i.e., whether it has considered all the entries 514 in the control memory 512). If so, the queue controller 610 returns to step 802; if not, the next slot is selected at step 820 and the queue controller 610 proceeds to execute step 808 (and subsequent steps) using this next selected slot.

In some embodiments, the invention provides so-called "multicast" functionality, by virtue of which a packet entering the transmitter 140 in a given cell of the switch fabric 100 (say, cell $114_J$) is sent via the corresponding forward channel $210_J$ to the corresponding receiver $150_J$ on multiple destination cells, possibly including cell $114_J$ itself. Such a packet is referred to as a multicast packet; a special case of a multicast packet is a broadcast packet, whose destination cells include all of the cells in the switch fabric 100. To accommodate the transmission of multicast packets, the destination field 362 of the header 360 of a multicast packet is designed so as to be capable of specifying the two or more destination cells associated with the multicast packet. In one embodiment of the invention, this may be achieved by encoding the set of destination cells by way of a binary mask with a logic "1" in the position of each destination cell.

A multicast packet travelling through the switch fabric 100 of FIG. 2 undergoes three main stages of transmission, similar to the aforedescribed stages of transmission which are experienced by a non-multicast packet. The first stage involves the packet being transmitted from the off-chip environment to a given cell, say cell $114_J$, via that cell's input interface 116; upon receipt, the packet is written into a memory location by the transmitter 140 in that cell. The second stage involves the packet being sent from the transmitter 140 in cell $114_J$ via the corresponding forward channel $210_J$ to the corresponding receiver $150_J$ residing in each of the two or more destination cells associated with the packet; upon receipt of the packet at each of the destination cells, the packet is written into a memory location by receiver $150_J$ in that destination cell. This operation is performed independently by the receiver in each destination cell. Finally, the third stage involves the packet being sent from receiver $150_J$ in each destination cell to the off-chip input queue 228 via the arbiter 260 and the output interface 118 of that destination cell.

Figure 9:
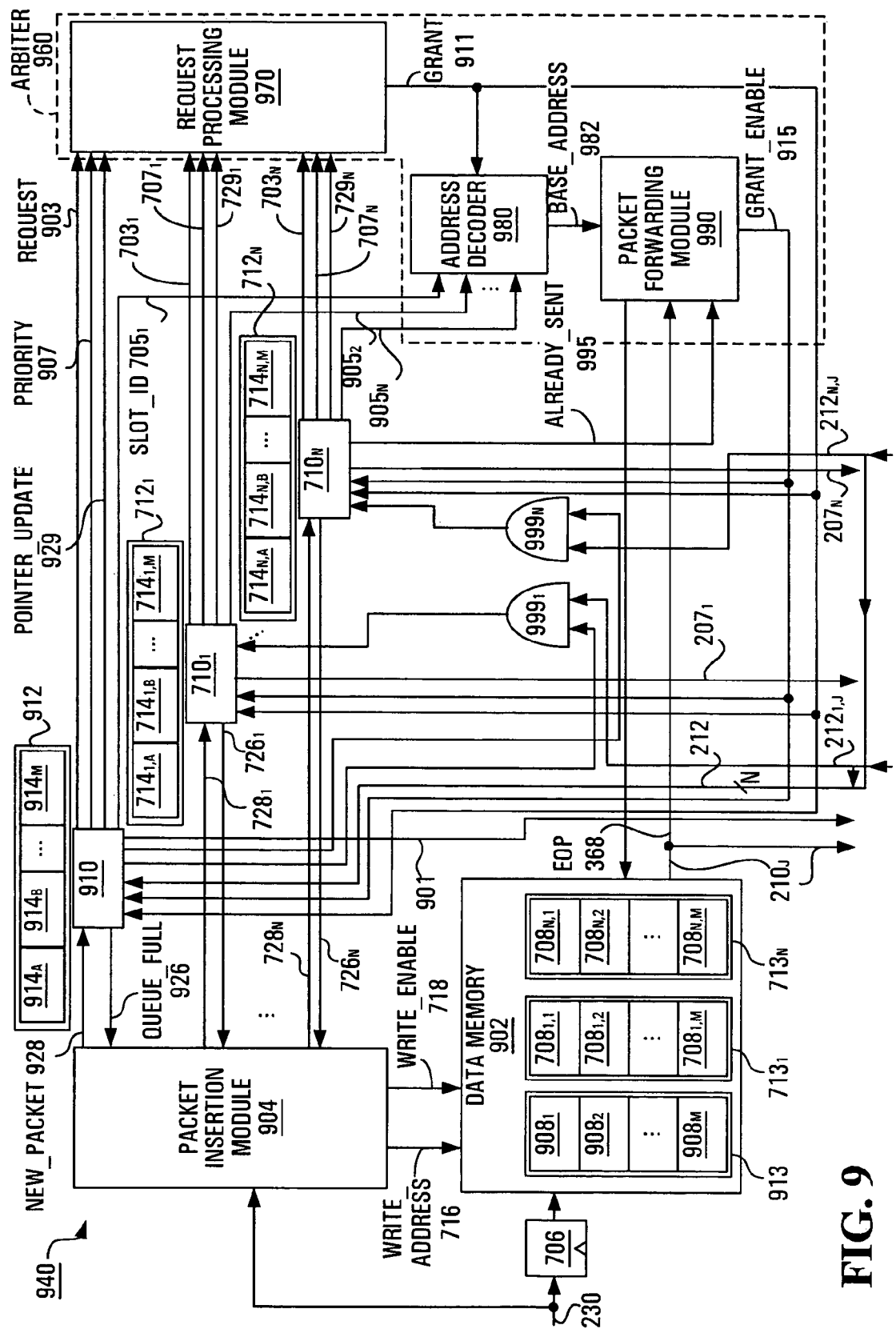
FIG. 9 shows, in schematic form, the transmitter of FIG. 2 adapted to provide multicast functionality.

To accommodate the transmission of multicast packets, the transmitter 140, previously described with reference to FIG. 7, needs to be modified. FIG. 9 shows an example non-limiting implementation of a transmitter 940 adapted to provide multicast functionality. Without loss of generality, the transmitter 940 is assumed to reside in cell $114_J$. The transmitter 940 receives words from the input interface 116 along the data path 230. The transmitter 940 has a memory which includes various storage areas, including a data memory 902, a plurality of control memories 712, 912 a set of registers used by a plurality of queue controllers 710, 910 and any other memory used by the transmitter 940. The words are fed to the data memory 902 via a plurality of data input ports.

The data memory 902 is writable in response to a write address signal and a write enable signal, which continue to be received from a packet insertion module 904 via the write_address line 716 and the write_enable line 718, respectively. The write_address line 716 carries the address in the data memory 902 to which the word presently on the data path 230 is to be written, while the actual operation of writing this word into the specified address is triggered by asserting a signal on the write_enable line 718. In order to coordinate the arrival of packets at the data memory 902 with the generation of signals on the write_address line 716 and the write enable line 718, the data path 230 may pass through an optional delay element 706 before entering the data input ports of the data memory 902.

The data memory 902 comprises the previously described segments 713, one for each of the N cells on the chip 110. The $j^{th}$ segment $713_j$ includes M slots $708_{j,A}$, $708_{j,B}$, ..., $708_{j,M}$, each slot being of such size as to accommodate a packet destined for cell $114_j$. Each of the segments 713 is represented by a corresponding one of the queue controllers 710. Queue controller $710_j$ has access to an associated control memory $712_j$ comprising a plurality of entries $714_{j,A}$, $714_{j,B}$, ..., $714_{j,M}$ which store the occupancy status (i.e., occupied or unoccupied) of the respective slots $708_{j,A}$, $708_{j,B}$, ..., $708_{j,M}$ in the $j^{th}$ segment $713_j$ of the data memory 902. For each slot that is occupied, the corresponding entry also stores the priority level of the packet occupying that slot.

In addition, the data memory 902 comprises an $N+1^{th}$ segment 913 for storing multicast packets. The different multicast packets stored in segment 913 may be destined for different combinations of two or more destination cells. Segment 913 includes M slots $908_A$, $908_B$, ..., $908_M$, each slot being of such size as to accommodate a packet. In one embodiment of the invention, at least one slot is reserved for each priority class. Segment 913 of the data memory 902 is represented by a multicast queue controller 910.

Multicast queue controller 910 has access to an associated control memory 912 comprising a plurality of entries $914_A$, $914_B$, ..., $914_M$ which store the occupancy status (i.e., occupied or unoccupied) of the respective slots $908_A$, $908_B$, ..., $908_M$ in segment 913 of the data memory 902. Each entry also stores the priority level of the corresponding packet as well as an address mask identifying the set of destination cells for which the corresponding packet is destined. The occupancy status is provided to the input interface 116 via a free_slot line 901.

In a manner similar to that already described with reference to the packet insertion module 704, the packet insertion module 904 is operable to monitor the EOP bit 368 on each word received via the data path 230 in order to locate the header of newly received packets. Because the EOP bit 368 undergoes a transition (e.g., falling edge) for the word that occurs in a specific position within the packet to which it belongs, detection and monitoring of the EOP bit 368 provides the packet insertion module 904 with an indication as to when a new packet will be received and, since the header 360 is located at the beginning of the packet, the packet insertion module 904 will know when the header 360 of a new packet has been received.

The packet insertion module 904 extracts control information from the header 360 of each received packet. Such information includes the destination cell (or cells) of a received packet and its priority level for the purposes of determining into which slot it should be placed in the data memory 902. The packet insertion module 904 first determines into which segment a received packet is to be written. This is achieved by extracting the destination 362 field from the header of the received packet in order to determine the destination cell (or cells) associated with the packet.

If the destination field 362 identifies one destination cell, then the received packet is a non-multicast packet and operation of the packet insertion module 904 in the case of a non-multicast cell is identical to that previously described with reference to the packet insertion module 704. However, if the destination field 362 identifies more than one destination cell, then the receiver packet is a multicast packet and the packet insertion module 904 operates differently. Specifically, the mere fact that a received packet is a multicast packet causes it to be written into segment 913. Selection of the particular slot into which the packet is written is achieved in a manner similar to that described with reference to the packet insertion module 704 of FIG. 7, namely by determining the priority class of the received packet and verifying the availability of the slot(s) associated with that priority class.

To this end, the packet insertion module 904 is operable to determine the priority class of a multicast packet by comparing the priority level of the packet to one or more priority thresholds. For example, let slots $908_A$, $908_B$, $908_C$, $908_D$, $908_E$ be associated with high, high, medium, medium and low priority levels, respectively. Also, let the low-medium priority threshold and the medium-high priority threshold be as defined previously, namely, at 100 and 200, respectively. If the priority level of a received multicast packet is 229, for example, then the potential slots into which the packet could be written include slots $908_A$ and $908_B$.

Next, the packet insertion module 904 is operable to determine which of the potential slots is available by communicating with the multicast queue controller 910, to which it is connected via a queue_full line 926 and a new_packet line 928. Alternatively, a bus structure could be used to connect the packet insertion module 904, the multicast queue controller 910 and the queue controllers 710. In either case, the packet insertion 904 module obtains the status (i.e., occupied or unoccupied) of the slots whose associated priority class matches the priority class of the received packet.

The status information may take the form of a bit pattern which includes a set of positioned bits equal in number to the number of slots, where a logic value of 0 in a particular position signifies that the corresponding slot is unoccupied and where a logic value of 1 in that position signifies that the corresponding slot is indeed occupied. In this way, it will be apparent to the packet insertion module 904 which of the slots associated with the priority class of the received packet are available.

In the above example, where the priority class of the received multicast packet was "high" and slots $908_A$ and $908_B$ were associated with the high priority class, the multicast queue controller 910 would supply the occupancy of slots $908_A$ and $908_B$ via the queue_full line 926. This information is obtained by consulting entries $914_A$ and $914_B$ in control memory 912. Of course, it is within the scope of the invention for the multicast queue controller 910 to provide, each time, the occupancy of all the slots in memory segment 913, not just those associated with the packet's priority class.

If only one slot associated with the packet's priority class is available, then that slot is chosen as the one to which the received packet will be written. If there is more than one available slot for the packet's priority class, then the packet insertion module 904 is free to choose any of these slots as the one to which the received packet will be written. Note that it is advantageous to regulate transmission of packets to the transmitter 940 by the off-chip packet-forwarding module 226 in order to avoid the situation in which none of the slots would be available for the packet's priority class. This may be done by configuring the off-chip packet-forwarding module 226 so that it transmits the multicast packet to cell $114_J$ (viz. the illustrated cell) only if it knows that there is room in the transmitter 940 for a multicast packet having the priority class in question.

Having determined the slot into which the received multicast packet shall be written to, the packet insertion module 904 is operable to determine a corresponding base address in the data memory 902. This may be done either by computing an offset which corresponds to the relative position of the slot or by consulting a lookup table which maps slots to addresses in the data memory 902. The packet insertion module 904 is adapted to provide the base address to the data memory 902 via the write_address line 716 and is further adapted to assert the write_enable line 718. At approximately the same time, the packet insertion module 904 sends a signal to the multicast queue controller 910 along the new_packet line 928, such signal being indicative of the identity of the slot which is being written to and the priority level of the packet which is to occupy that slot. The multicast queue controller 910 is adapted to process this signal by updating the status and priority information associated with the identified slot (which was previously unoccupied).

After the first word of the received multicast packet is written to the above-determined base address of the data memory 902, the address on the write_address line 716 is then incremented at each clock cycle (or at each multiple of a clock cycle) as new words are received along the data path 230. This will cause the words of the packet to fill the chosen slot in the data memory 902. Meanwhile, the EOP bit 368 in each received word is monitored by the packet insertion module 904. When a new packet is detected, the above process re-starts with extraction of control information from the header 360 of the newly received packet.

In addition to being writable, the data memory 902 is also readable in response to a read address supplied by an arbiter 960 along the aforedescribed read_address line 792. In a manner similar to that already described with reference to the arbiter 760 of FIG. 7, the arbiter 960 initiates reads from the data memory 902 as a function of requests received from the plurality of queue controllers 710, 910 via a corresponding plurality of request lines 703, 903. A particular request line $703_j$ will be asserted if the corresponding queue controller $710_j$ is desirous of forwarding a non-multicast packet to receiver $150_J$ in cell $114_J$, while request line 903 will be asserted if the multicast queue controller 910 is desirous of forwarding a multicast packet to receiver $150_J$ in a multiplicity of cells $114_{j1}, 114_{j2}, \ldots, 114_{jP}$.

The queue controllers 710 have already been described with reference to FIG. 7. The multicast queue controller 910, for its part, is implemented differently. The multicast queue controller 910 is adapted to generate a request for transmission of a received multicast packet to receiver $150_J$ residing in two or more destination cells $114_{j1}, 114_{j2}, \ldots, 114_{jP}$. Specifically, the multicast queue controller 910 is operable to generate a request for transmitting one of the possible multiplicity of packets occupying the slots $908_A$, $908_B, \ldots, 908_M$ in segment 913 of the data memory 902. The identity of the slot chosen to be transmitted is provided along a slot_id line 905 while the priority associated with the chosen slot is provided on a priority line 907.

The multicast queue controller 910 implements a function which determines the identity of the occupied slot which holds the highest-priority packet that can be accommodated by the destination receiver. This function can be suitably implemented by a logic circuit, for instance. By way of example, the multicast queue controller 910 can be designed to verify the entries in the associated control memory 912 in order to determine, amongst all occupied slots associated with segment 913 in the data memory 902, the identity of the slot holding the highest-priority packet. The multicast queue controller 910 then assesses the ability of receiver $150_J$ in each of the destination cells $114_{j1}, 114_{j2}, \ldots, 114_{jP}$ to accommodate the packet in the chosen slot. This is achieved by processing information received via the corresponding back channels $212_{j1,J}, 212_{j2,J}, \ldots, 212_{jP,J}$.

For example, let the chosen multicast packet be a high-priority packet stored in slot $908_A$ and let the address mask of the packet be 1011, indicating that the multicast packet is destined for cells $114_1, 114_3$ and $114_4$. In this case, the required occupancy information would be relevant to slots $508_A$ (i.e., the high-priority slot) in receiver $150_J$ in cells $114_1, 114_3$ and $114_4$. This occupancy information would be received via back channels $212_{1,J}, 212_{2,J},$ and $212_{4,J}$.

If the multicast queue controller 910 finds that the chosen multicast packet can indeed be accommodated by the receiver in each destination cell, it will attempt to seize control of forward channel $210_J$ before any of the affected (non-multicast) queue controllers 710 makes another request to the arbiter 960. Therefore, the multicast queue controller 910 makes a multicast request to the arbiter 960. In one embodiment, the multicast request is associated with a priority level associated with the packet. In other embodiments, the multicast request is given a higher priority in view of the probability associated with receiver $150_J$ being available in all of the destination cells. The multicast queue controller 910 places the identity of the chosen slot on the slot_id line 905, places the priority level of the multicast request on the priority line 907 and submits a request to the arbiter 960 by asserting the request line 903.

Assuming that a request of this type submitted by the multicast queue controller 910 has been granted, the multicast queue controller 910 will be made aware of the grant by the arbiter 960. This exchange of information can be achieved in many ways. For example, in a manner similar to that previously described with reference to the arbiter 760, the arbiter 960 may identify the queue controller whose request has been granted by sending a unique code on a grant line 911 and, when ready, the arbiter 960 may assert a grant_enable line 915 shared by the queue controllers 710, 910. A given queue controller would thus know that its request has been granted upon (i) detecting a unique code in the signal received from the arbiter via the grant line 911; and (ii) detecting the asserted grant_enable line 915.

It should be understood that other ways of signaling and detecting a granted request are within the scope of the present invention. For example, it is feasible to provide a separate grant line to each queue controller, including the multicast queue controller 910 and the non-multicast queue controllers 710; when a particular queue controller's request has been granted, the grant line connected to the particular queue controller would be the only one to be asserted. In this case, no grant enable line need be provided.

Upon receipt of an indication that its request has been granted, the multicast queue controller 910 accesses the entry in the control memory 912 corresponding to the slot whose packet now faces an imminent exit from the data memory 902 under the control of the arbiter 960. Specifically, the multicast queue controller 910 changes the status of that particular slot to "unoccupied", which will alter the result of the request computation logic, possibly resulting in the generation of a new request specifying a different slot. The changed status of a slot will also be reflected in the information provided to the packet insertion module 904 via the queue_full line 926.

Also upon receipt of an indication that its request has been granted, the multicast queue controller 910 asserts a pointer_update line 929 which returns back to the arbiter 960. In a manner similar to that described in connection with assertion of one of the pointer_update lines $729_j$, assertion of the pointer_update line 929 indicates to the arbiter 960 that the grant it has issued has been acknowledged, allowing the arbiter 960 to proceed with preparing the next grant, based on a possibly new request from the multicast queue controller 910 and on pending requests from the other queue controllers 710.

However, in the case where the multicast queue controller 910 finds that one or more destination receivers cannot accommodate the multicast packet, the multicast queue controller 910 may do one of three things, depending on the operational requirements of the invention. It can either (i) attempt to transmit the next-highest-priority multicast packet to all of the associated destination receivers; (ii) make a request to the arbiter 960 to transmit the multicast packet on the forward channel $210_J$ so that it is received by receiver $150_J$ on those destination cells which have an available slot, while being ignored by receiver $150_J$ on other destination cells; (iii) wait some time before making another request to the arbiter 960.

It is also within the scope of the present invention to modify the virtual priority level of the multicast packet if one or more of the destination receivers cannot accommodate the packet. If the virtual priority level is increased to such an extent that the multicast packet now belongs to a different priority class, then a different result will be obtained when the multicast queue controller 910 determines the availability of a suitable slot within receiver $150_J$ in each destination cell.

In case (i) above, the multicast controller 910 makes an attempt to transmit the next-highest-priority multicast packet. This can be done by consulting the back channels 212 in order to assess the availability of receiver $150_J$ in each destination cell to accommodate the next-highest-priority multicast packet occupying one of the slots 908. If the multicast queue controller 910 again finds that one or more destination cells cannot accommodate the multicast packet, the multicast queue controller 910 may attempt to transmit the next-next-highest-priority multicast packet, and so on.

In case (ii) above, the multicast controller 910 makes a request to the arbiter 960 to transmit the multicast packet on forward channel $210_J$ so that it is received by receiver $150_J$ in those destination cells which have an available slot. This may be achieved in the same way as if all the destination cells were able to accommodate the packet, i.e., by placing the identity of the chosen slot on the slot_id line 905, placing the appropriate priority level on the priority line 907 and submitting a request to the arbiter 960 by asserting the request line 903. However, upon receipt of an indication that its request has been granted, the multicast queue controller 910 would assert the pointer_update line 929 but would not yet change the status of the slot to "unoccupied".

Next, the multicast queue controller 910 would reset the bits in the address mask of the corresponding entry in those bit positions corresponding to destination cells that were found to have an available slot for accommodating the multicast packet. For example, let the chosen multicast packet be a high-priority packet stored in slot $908_A$ and let the address mask of the packet be 1011, as before. Let the occupancy information relevant to slot $508_A$ in receiver $150_J$ in cells $114_1$, $114_3$ and $114_4$, as received via respective back channels $212_{1,J}$, $212_{2,J}$, and $212_{4,J}$, be the following: "occupied, unoccupied, unoccupied". This would mean that there is room in slot $508_A$ in receiver $150_J$ in cells $114_3$ and $114_4$, but not in cell $114_1$. If a request to transmit the multicast packet is granted, cells $114_3$ and $114_4$ will process the packet, but cell $114_1$ will not. Consequently, the address mask would become 1000 and may be referred to as "residual address mask".

The residual address mask therefore indicates the destination cells of the multicast packet which have yet to receive the multicast packet. The multicast queue controller 910 is operable to make another request with the new address mask in the above described manner until the address mask has been reduced to "0000", at which point the multicast queue controller 910 would proceed with changing the status of the slot (in this case, slot $908_A$) to "unoccupied" in the appropriate entry (in this case $914_A$) in the control memory 912.

In addition, if a request to transmit the multicast packet to an incomplete subset of the destination cells has been granted, the multicast queue controller 910 must indicate to the packet-forwarding module in the arbiter 960 that the multicast packet has been transmitted to only some of the destination cells so that when the multicast packet is re-transmitted to the remaining destination cells by virtue of a subsequent request being granted, it is not picked up a second time by the destination cells which already received the packet. To this end, upon being granted a request to send the multicast packet to an incomplete subset of the destination cells, an already_sent mask is provided via a control line 995 to the packet-forwarding module 990 in the arbiter. The packet-forwarding module 990 uses the already_sent mask to modify the destination field 362 of the multicast packet in a manner to be described in greater detail herein below.

As a result, the destination field 362 of a multicast packet transmitted the first time to an incomplete set of destination cells will identify the original set of destination cells, while the destination field 362 of the same multicast packet, re-transmitted a second time due to some destination cells having had receivers that were not available the first time around, will identify only those destination cells which are known to have an available slot for accommodating the packet. It is also within the scope of the invention, however, to modify the destination field 362 of a multicast packet transmitted the first time so that it specifies only those destination cells which are known to have an available slot for accommodating the packet.

In case (iii) above, upon finding that receiver $150_j$ in one or more destination cells cannot accommodate the multicast packet, the multicast queue controller 910 can be adapted to wait an amount of time (or a number of transmitted packets) before making a delayed request to the arbiter 960 along the request line 903. The delayed request follows a re-verification of the availability of receivers which were initially found to be unavailable. Upon re-verification, it may be discovered that some additional receivers may have developed an availability to accommodate the packet.

The delayed request may be submitted in the same way as described with regard to case (ii) above. However, it should be appreciated that during the time when the request is being delayed, one or more receivers that may have been available at the time when their availability was first verified (and the request withheld) may become unavailable. It is therefore possible that the situation with regard to receiver availability is no better after having delayed the request, unless some way of making "tentative reservations" is provided. Accordingly, it is within the scope of the present invention for the multicast queue controller 910 to manipulate the request generation process in each of the non-multicast queue controllers 710 in such a way as to tentatively reserve a slot in receiver $150_J$ on those destination cells which can accommodate the multicast packet in question.

This can be achieved by altering the information received via the back channels 212, as perceived by the queue controllers 710. For example, the information regarding the availability of a given slot in receiver $150_J$ in cell $114_j$, as received via back channel $212_{j,J}$, might ordinarily be represented by logic "1" to indicate that the slot is available and by logic "0" to indicate that the slot is occupied. If that slot needs to be tentatively reserved by the multicast queue controller 910, then a two-input logical AND gate $999_j$ may be placed in the path of back channel $212_{j,J}$ prior to entry into any of the queue controllers 710. A first input of the AND gate would be the line $212_{j,J}$ leading from receiver $150_J$ in cell $114_j$, while a second input of the AND gate may be supplied by the multicast queue controller 910 via a logical inverter (not shown). In operation, the multicast queue controller 910 would set the input to the inverter to logical "1" when making a tentative reservation for that slot, which would make the slot appear unavailable to the other queue controllers 710. The multicast queue controller 910 would reset the input to the inverter (thereby rendering the output of each AND gate $999_j$ transparent to information received via the corresponding back channel) after it has been granted a delayed request that followed the tentative reservation.

If, by the time the delayed requested is granted, it turns out that the multicast packet can be accommodated by receiver $150_J$ in all of the destination cells specified in its original destination field 362, then the multicast queue controller 910 proceeds as in case (i) above. If, however, receiver $150_j$ in some destination cells is still unable to accommodate the multicast packet, the multicast controller 910 proceeds as in case (ii) above.

The arbiter 960 is now described with continued reference to FIG. 9. The function of the arbiter 960 is to grant one of the requests received from the various queue controllers 710, 910 and to consequently control read operations from the data memory 902. To this end, the arbiter 960 comprises a request-processing module 970, an address decoder 980 and a packet-forwarding module 990. The arbiter 960 may be essentially identical to the arbiter 760 previously described with reference to FIG. 4, with some differences in the implementation of the request-processing module 970, the address decoder 980 and the packet-forwarding module 990.

The request-processing module 970 receives the request lines 703, 903, the priority lines 707, 907 and the pointer_update lines 729, 929 from the queue controllers 710, 910, respectively. The request-processing module 970 functions to grant only one of the possibly many requests received from the queue controllers 710, 910 along the request lines 703, 903. The request-processing module 970 has an output which is the grant line 911. The grant line 911 is connected to each of the queue controllers 710, 910 as well as to the address decoder 980. In one embodiment of the present invention, the grant line 911 utilizes a unique binary code to identify the queue controller whose request has been granted. It will be noted that the request-processing module 970 in the arbiter 960 differs from the request-processing module 770 in the arbiter 760 merely in the number of inputs.

The address decoder 980 receives the grant line 911 from the request-processing module 970 and the slot_id lines 705, 905 from the queue controllers 710, 910, respectively. The address decoder 980 computes a base address in the data memory 902 that stores the first word of the packet for which a request for transmission has been granted. The base address is provided to the packet-forwarding module 990 via a base_address line 982. It will be noted that the address decoder 980 in the arbiter 960 differs from the address decoder 780 in the arbiter 760 merely in its ability to process an additional code on the grant line 911 and in its ability to generate a base address over a wider range incorporating segment 913 in the data memory 902.

The packet-forwarding module 990 receives, via the base_address line 982, the location of the first word of the next packet that it is required to extract from the data memory 902. The packet-forwarding module 990 also receives the already_sent mask via the control line 995 from the multicast queue controller 910. It is recalled that the already_sent mask is indicative of one or more destination cells whose corresponding receiver $150_j$ has already received the packet to be extracted from the data memory 902 by the packet-forwarding module 990.

The packet-forwarding module 990 is operable to wait until it has finished reading out the current packet before beginning to read the next packet from the data memory. After it has finished reading the current packet from the data memory 902, the packet-forwarding module 990 stores the initial address on the base_address line 982, asserts the grant_enable line 915 and proceeds to read from the data memory 902 starting from the initial address. In addition, the packet-forwarding module 990 applies the already_sent mask to the destination field of the packet extracted from the data memory 902. The packet-forwarding module 990 in the arbiter 960 differs from the packet-forwarding module 790 in the arbiter 760 in its ability to index larger data memory 902 and in its ability to apply the already_sent mask to the destination field of a packet extracted from the data memory 902.

It is not necessary to modify the aforedescribed receivers 150 or arbiter 260 in order to enable the processing of multicast packets arriving via the appropriate one of the forward channels 210.

It is noted that the packet insertion module 704 (or 904) in the transmitter 140 (or 940) controls where words are written into the data memory 702 (or 902), but it does not control the rate at which words arrive at the data input ports of the data memory 702 (or 902). This level of control is provided by an off-chip packet-forwarding module 226 as described herein below. The non-multicast case is considered for the purposes of the following but it should be appreciated that the concepts described herein below are equally applicable to the transmission of multicast packets.

Specifically, in preferred embodiments, the off-chip packet-forwarding module 226 is not allowed to send the words of a packet to the transmitter in a given cell unless there is room in that transmitter's data memory 702 to accommodate the packet, as this prevents having to discard packets in the switch fabric chip. A feature of the present invention which allows such control to be executed locally at the off-chip packet-forwarding module 226 stems from the use of the entries 714 stored in the control memories 712. Specifically, by providing the status of slots 708 in the data memory 702 of the transmitter of each cell via the control path 254, the off-chip packet-forwarding module 226 can be alerted as to the status (occupied or unoccupied) of each slot associated with a particular category of priority level.

Figure 20:
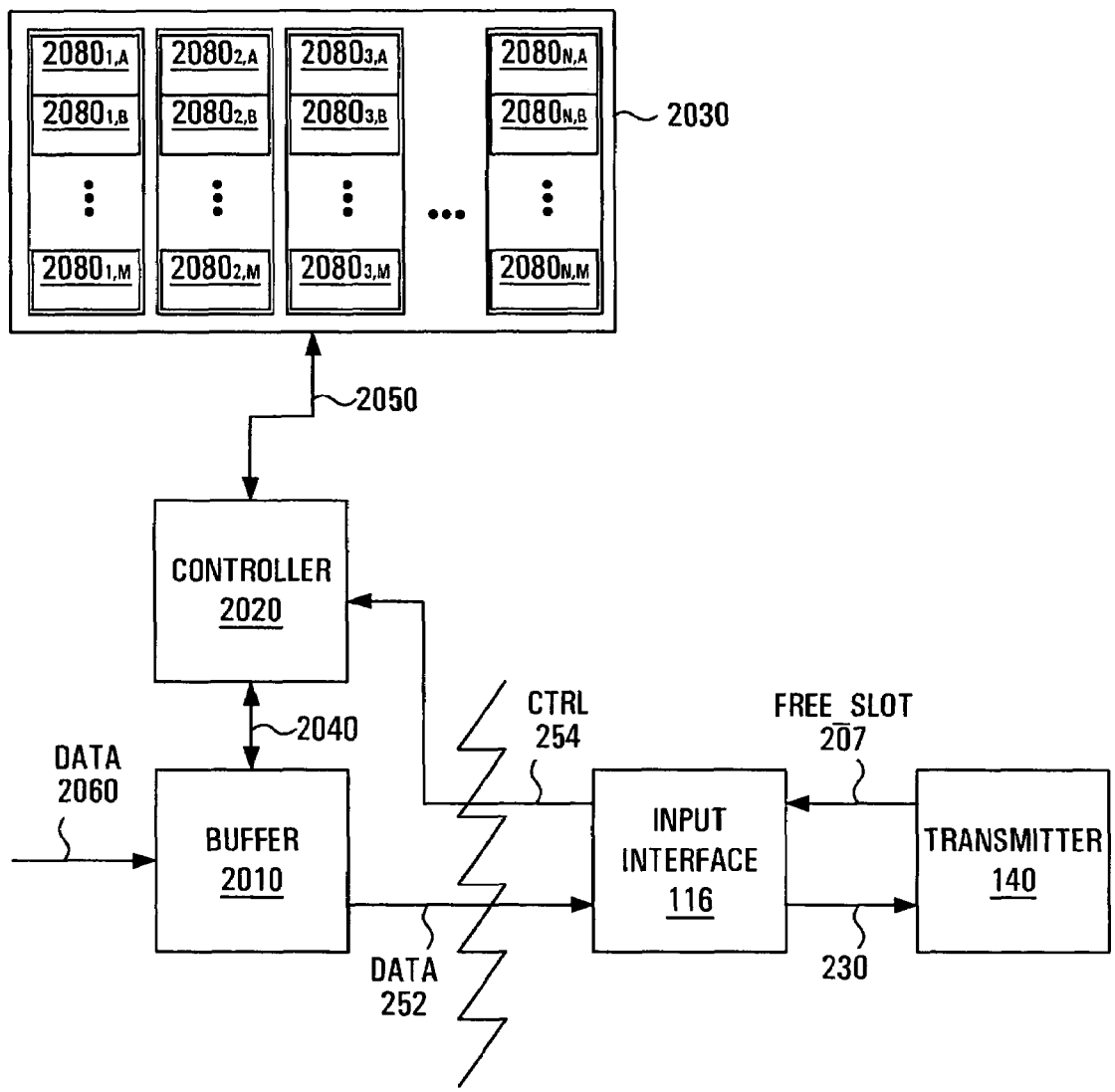
FIG. 20 shows interaction between a packet-forwarding module, an input interface and an output interface in accordance with an embodiment of the invention.

A detailed description of one possible implementation of the off-chip packet-forwarding module 226, along with its interaction with the input interface 116 and the output interface 118, is now provided with additional reference to FIG. 20. It is recalled that the off-chip packet-forwarding module 226 is connected to the input interface 116 in cell $114_J$ via data path 252 and a control path 254 (which flows in the opposite direction). The data path 252 can be of sufficient width to accommodate all the bits in a word or it may be narrower (and, therefore, also narrower than the data path 230) so as to accommodate only a subset of the bits in a word, thereby lowering the pin count of the chip 110. If the data path 252 is indeed narrower than the data path 230, then the input interface 116 should be configured to provide a rate matching functionality so that the total information transfer rate remains the same on both data paths. The control path 254 may be as narrow as one or two bits in order to keep the pin count to a minimum.

As can be seen in FIG. 20, the off-chip packet-forwarding module 226 comprises a buffer 2010, a controller 2020 and a memory 2030. A data path 2060 provides the buffer 2010 with a stream of packets for transmission to the transmitter 140 in cell $114_J$. The controller 2020, which is connected to the buffer 2010 via a control line 2040, is adapted to control the release of words from the buffer 2010 onto the data path 252.

The memory 2030 stores a plurality (N×M) of entries 2080. Entries 2080 may also be referred to as "zones". Entries $2080_{j,A}$ through $2080_{j,M}$ correspond to slots $708_{j,A}$ through $708_{j,M}$, $1 \leq j \leq N$, in the data memory 702 of the transmitter 140. Each entry may include one or more bits which are indirectly indicative of whether the corresponding slot in the data memory 702 is occupied or unoccupied. By "indirectly", it is meant that the memory 2030 might not be accurate with regard to the occupancy status of a particular slot in the data memory 702 of the transmitter 140, but it will nevertheless contain an accurate version of the number of slots for a given destination and priority level which are occupied. The controller 2020 receives updated occupancy information from the transmitter 140 via the input interface 116 and the control path 254. The controller 2020 has access to the memory 2030 via a control line 2050.

In operation, the controller 2020 performs the tasks of updating the occupancy information in the memory 2030 and controlling the release of packets from the buffer 2010. The two tasks may be performed asynchronously.

Regarding the transmission of packets from the buffer 2010, this is performed as a function of the contents of the buffer 2010 and as a function of the occupancy information stored in the memory 2030. Specifically, when the buffer 2010 contains a packet that is ready for transmission to the transmitter 140, the controller 2020 verifies the destination cell associated with that packet and verifies its priority class, in a similar manner to the packet insertion module 704 in the transmitter 104.

Assume that the destination cell is cell $114_K$. This means that it would be appropriate for the packet in question to occupy one of the slots $708_{K,A}, \ldots, 708_{K,M}$ in the data memory 702. Furthermore, the priority level of the packet may further narrow the selection of appropriate slots into which the packet may be inserted once it arrives at the transmitter 140. Since the memory 2030 knows which slots are occupied and which ones are not, the controller 2020 can therefore determine whether the packet can be accommodated by an appropriate slot in the data memory 702.

In one embodiment, the controller 2020 does not allow the packet to be transmitted to the input interface 116 via the data path 252 unless at least one appropriate slot is found to be unoccupied. In this case, the controller 2020 would effectively reserve one of the appropriate slots by setting one of the appropriate (and unoccupied) entries in the memory 2030 to "occupied" prior to or during transmission of the packet to the transmitter 140. It is not important which slot is reserved in this manner, as long as the priority class and destination are consistent with the slot into which the packet will actually be inserted once it arrives at the data memory 702.

Regarding the "occupancy update" task, it is recalled that the free_slot lines 207 provide the input interface 116 with information as to the release of packets from the data memory. If, while monitoring the free_slot line 207, the input interface 116 determines the slot position of a packet being transmitted to its destination receiver, the input interface 116 will send a "token release" message to the controller 2020 via the control path 254. Such a token release message may specify the precise slot which has been vacated. However, because reservations in the memory 2030 are made as a function of destination and priority class, the input interface 116 need only send the segment (i.e., destination cell) and the priority class associated with the slot being liberated. Upon receipt of the "token release" message, the controller 2020 changes the information in one of entries in the memory 2030 which is associated with that destination and priority class and whose slot had been previously "reserved".

Accordingly, a slot will be reserved for a packet before the packet has a chance to arrive at the transmitter 140. This is advantageous when compared to the situation in which a slot is marked "occupied" once it is actually occupied, as it prevents the occurrence of a situation in which two packets are transmitted when there is room for only one.

In addition, once the packet arrives at the transmitter, it will be written into the data memory 702. As soon as it starts being written from memory, a "token release" message is sent back to the controller 2020 on control path 254. This indicates to the controller 2020 that there is room in the transmitter 140 for a packet having a particular destination and priority class and an appropriate packet can be sent to the transmitter 140. This new packet will arrive after the old packet has begun to be read and, provided the write operation does not catch up to the read operation, advantageously resulting in efficient data pipelining, which is even more advantageous when combined with the efficient data pipelining that occurs between the transmitters 140 and receivers 150.

It is possible that due to a transmission error, the information contained in the "token release" message is incorrect. To this end, it may be advantageous to configure the controller 2020 so that it is capable of requesting the status of each slot in the data memory 702 of the transmitter 140, so as to perform a "refresh" of the memory 2030. This type of refresh operation may be performed at an initial phase or at other times during operation. This can be achieved by sending a "refresh request" message to the input interface 116 via a forward-traveling control path (not shown). The input interface 116 can be adapted to respond to a "refresh request" message by sending the occupancy status of each slot 708 in its data memory 702. This information is obtained from the entries 714 in the control memories 712. Upon receipt of the requested information from the input interface 116, the controller 2020 updates the contents of the entries 2080 in the memory 2030. In this way, the controller 2020 is able to gather information regarding the occupancy of each slot in the data memory 702.

It is also within the scope of the invention for the input interface 116 to have continuous access to up-to-date occupancy information by providing discrete or bussed signal connections between the input interface 116 and the entries 714 in the control memories 712 of the queue controllers 710. For example, such a bus may be N×M bits wide in some embodiments.

Figure 14:
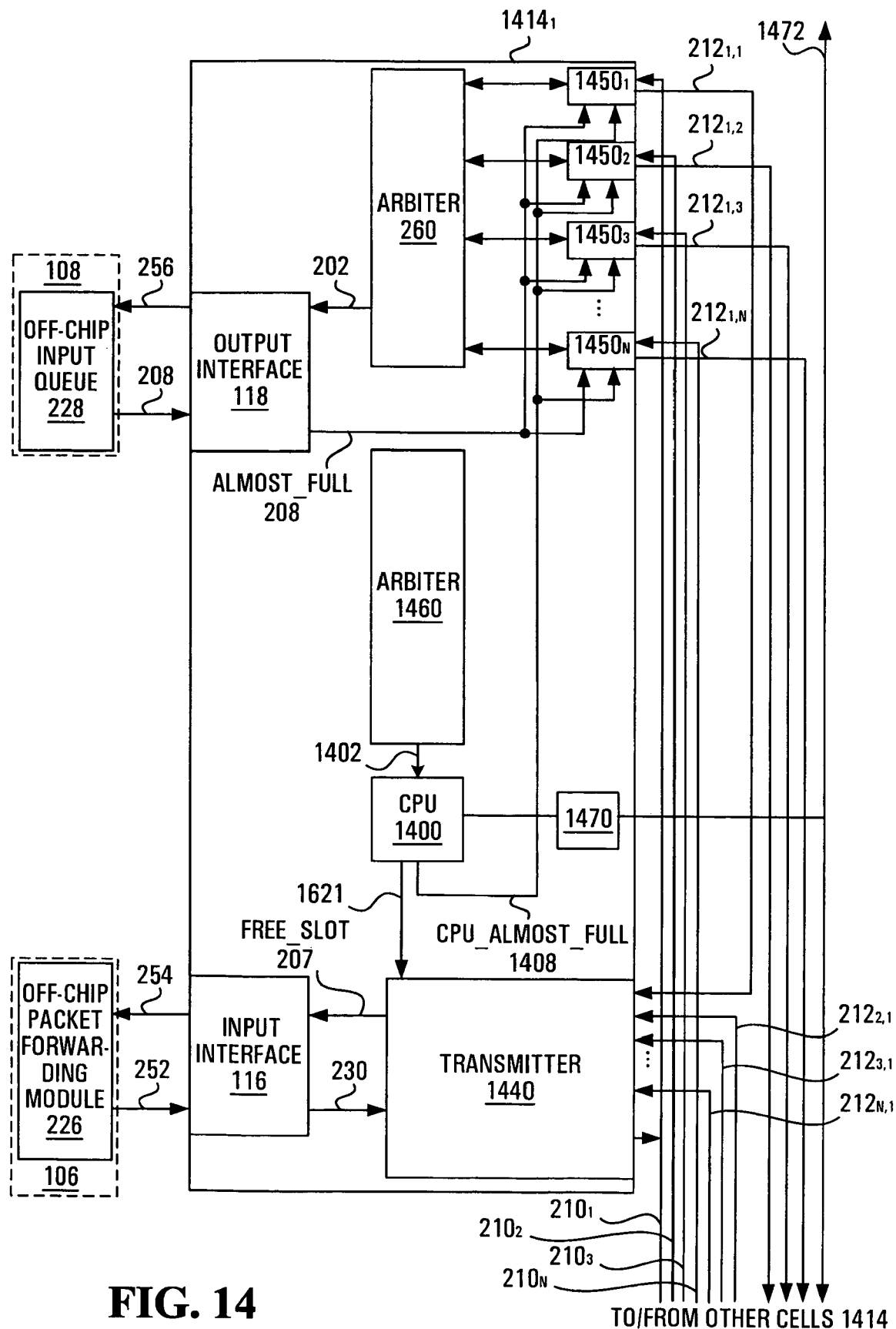
FIG. 14 shows, in schematic form, a cell adapted to provide transmission of system packets to and from a central processing unit.

Reference is now made to FIG. 14, which shows a cell $1414_1$ in accordance with another embodiment of the present invention, in which there is provided a central processing unit (CPU) 1400. Cell $1414_1$ is a modified version of cell 114 described previously with reference to FIG. 2. Specifically, in addition to the CPU 1400, cell $1414_1$ comprises an arrangement of functional modules including the previously described input and output interfaces 116, 118, as well as a modified transmitter 1440, N modified receivers $1450_1 \ldots 1450_N$, and two arbiters 260, 1460, among which arbiter 260 has already been described with reference to FIG. 5.

The main purpose of the CPU 1400 is to process, originate and/or respond to so-called "system packets". System packets generally do not carry data traffic; rather, they carry control information. Examples of control information which may be carried by a system packet generated by the CPU 1400 include the number of packets sent by the transmitter 1440, the number of occupied slots in the data memory of the transmitter 1440, the number of occupied slots in the data memory of one or more receivers 1450, the total number of packets sent or received by the external ports 116, 118, the number of packets killed by the transmitter 1440 or any receiver 1450, etc. Examples of control information which may be carried by a system packet destined for the CPU 1400 include instructions for changing the parameters used in the aging mechanism or setting the delay of a request by the multicast queue controller 910 in the transmitter (see FIG. 9) or instructing the time stamp counter 620 (see FIG. 6) to count packets sent rather than clock cycles (or vice versa).

In one embodiment, the CPU 1400 can be a 32-bit 4-stage pipelined RISC processor with access to a CPU random access memory (RAM). The CPU RAM is divided into scratch RAM, insert RAM and forward RAM. The scratch RAM is used for general computations of a temporary nature, while the insert RAM is used to store system packets arriving from the receivers 1450 and the forward RAM is used to store system packets to be transmitted along the appropriate forward channel by the transmitter 1440. In one embodiment, the size of both the insert RAM and the forward RAM can be one, two or more slots each, where each slot is of sufficient size to store a packet. The total RAM size may be on the order of 2 kilobytes, for example. Of course, other CPU types and memory sizes are within the scope of the present invention.

The CPU 1400 in cell $1414_1$ is also connected to other CPUs in other cells via an asynchronous peripheral bus 1472, which utilizes an internal peripheral bus interface 1470 in each cell, including cell $1414_1$, and a common external peripheral bus interface (not shown) elsewhere on the chip 100. The internal peripheral bus interface 1470 in cell $1414_1$ communicates the with external peripheral bus interface via the peripheral bus 1472. The purpose of the peripheral bus is to allow the CPU 1400 in each cell to exchange information with an external device (e.g., flash RAM, FPGA, UART, etc.) For example, the peripheral bus is useful when downloading the initial CPU code from an external memory device.

Figure 18:
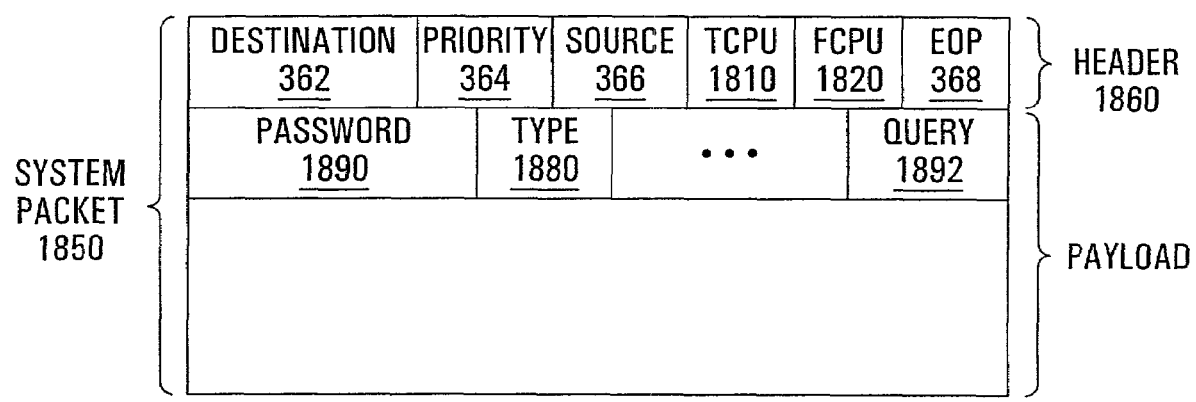
FIG. 18 shows the format of a system packet used in the cell of FIG. 14.

To accommodate the transmission of system packets to and from the CPU 1400, the destination field of the header of all packets is designed so as to be capable of specifying whether the packet is a system packet, i.e., is either destined for the CPU of a given destination cell or has been generated by the CPU of a given source cell. Accordingly, in one embodiment of the invention, and with reference to FIG. 18, a packet 1850 is provided with an additional "to CPU" (or TCPU) field 1810 and an additional "from CPU" (or FCPU) field 1820 in the packet's header 1860. To indicate that a packet is a system packet, either the TCPU field 1810 or the FCPU field 1820 is set (or both), as appropriate. If the packet 1850 is not a system packet, i.e., the packet 1850 is neither destined for the CPU of a given cell nor generated by the CPU of a given cell, then both the TCPU and FCPU fields 1810, 1820 remain blank.

If a packet is indeed a system packet, then further information concerning the meaning of the packet may be found in a subsequent word of the packet. For example, the second, third or other word of a system packet may contain a "type" field 1880. The type field 1880 identifies the nature of the control information carried by a system packet. When a system packet is routed to the CPU 1400, it will be processed according to the contents of the type field 1880. A system packet may also contain a password field 1890, which is encodable and decodable in software. Additionally, a system packet may include a query bit 1892, which indicates whether a response to the system packet is required from the CPU 1400. Either or both of the password field 1890 and the query bit 1892, if used, may appear in the header 1860 of the packet 1850 or in a subsequent word in the payload of the packet 1850.

Figure 15:
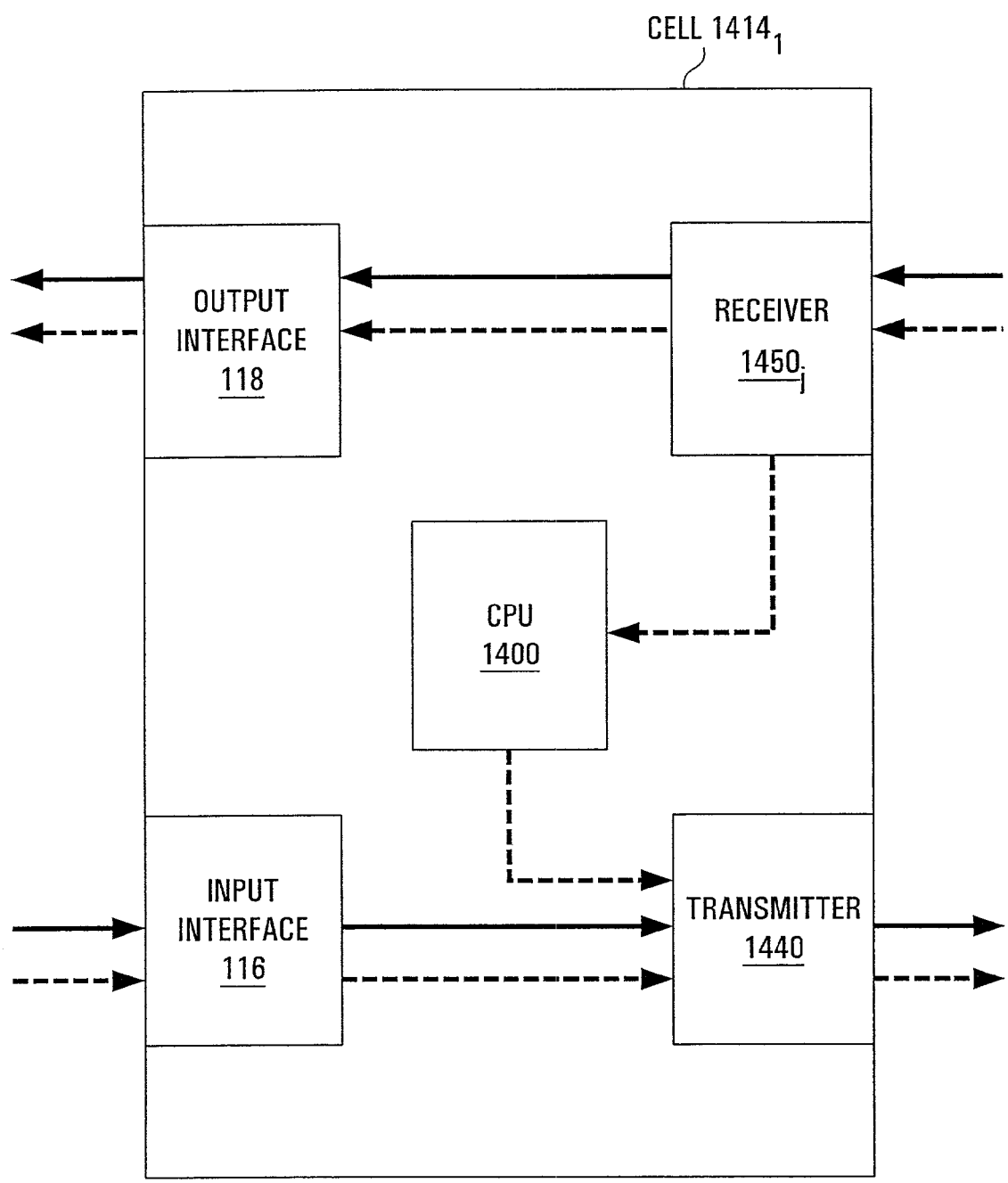
FIG. 15 shows potential path that may be taken by system packets and traffic packets through the cell of FIG. 14.

The flow of system packets and traffic packets (i.e., non-system packets) through cell $1414_1$ may be better understood by additionally referring to FIG. 15, which is simplified version of FIG. 14 in which the solid line represents the path that may be traveled by traffic packets, while the dashed line represents the path that may be traveled by system packets. The arbiters 260, 1460 have been omitted for simplicity of illustration.

With continued reference to FIG. 14, the input interface 116 receives system packets and traffic packets from the off-chip packet-forwarding module 226 via a data path 252 and forwards them to the transmitter 1440 via a data path 230 (previously described with reference to FIG. 2). Occupancy information regarding the transmitter 1440 is provided to the input interface 116 along a set of free_slot lines 207, which forwards this information to the off-chip packet-forwarding module 226 along an external back channel 254 (also previously described with reference to FIG. 2) running in the opposite direction of traffic flow.

The transmitter 1440 controls the transmission of system packets and traffic packets received from the off-chip packet-forwarding module 226 onto the corresponding forward channel, in this case forward channel 2101. In addition, the transmitter 1440 also controls the transmission of system packets generated by the CPU 1400, either independently or in response to a received system packet containing a query, onto forward channel 2101. One way of achieving the desired functionality will be described in greater detail later on.

Within cell 1414$_1$, the receivers 1450 receive packets, word by word, along the forward channels 210. Each such received packet may be a traffic packet, a system packet destined for the CPU 1400 or a system packet not destined for the CPU 1400. System packets destined for the CPU 1400 are stored in a different area than traffic packets or system packets that are not destined for the CPU 1400.

Requests for transmission of packets stored by the receivers 1450 may be made to arbiter 260 or to arbiter 1460. In the previously described manner, arbiter 260 is connected to the output interface 118 via the data path 202. The output interface 118 supplies packets to the off-chip input queue 228. Occupancy information regarding the off-chip input queue 228 is provided to the receivers 1450 in the form of the almost_full flag 208 (previously described) that runs through the output interface 118 in a direction opposite to that of traffic flow. This functionality may be provided by an external back channel. For its part, arbiter 1460 has an output connected to the CPU 1400 via a data path 1402. Occupancy information regarding the CPU 1400 is provided to the receivers 1450 in the form of a cpu_almost_full flag 1408.

It is noted that in this embodiment, system packets destined for the CPU 1400 in cell 1414$_1$, and which arrive via the off-chip packet-forwarding module 226, will reach the CPU 1400 via receiver 1450$_1$ in cell 1414$_1$ after having been placed onto forward channel 210$_1$ by the transmitter 1440 in cell 1414$_1$. It is envisaged that in other embodiments of the invention, such system packets may reach the CPU 1400 directly, without having to travel along forward channel 210$_1$.

Figure 16:
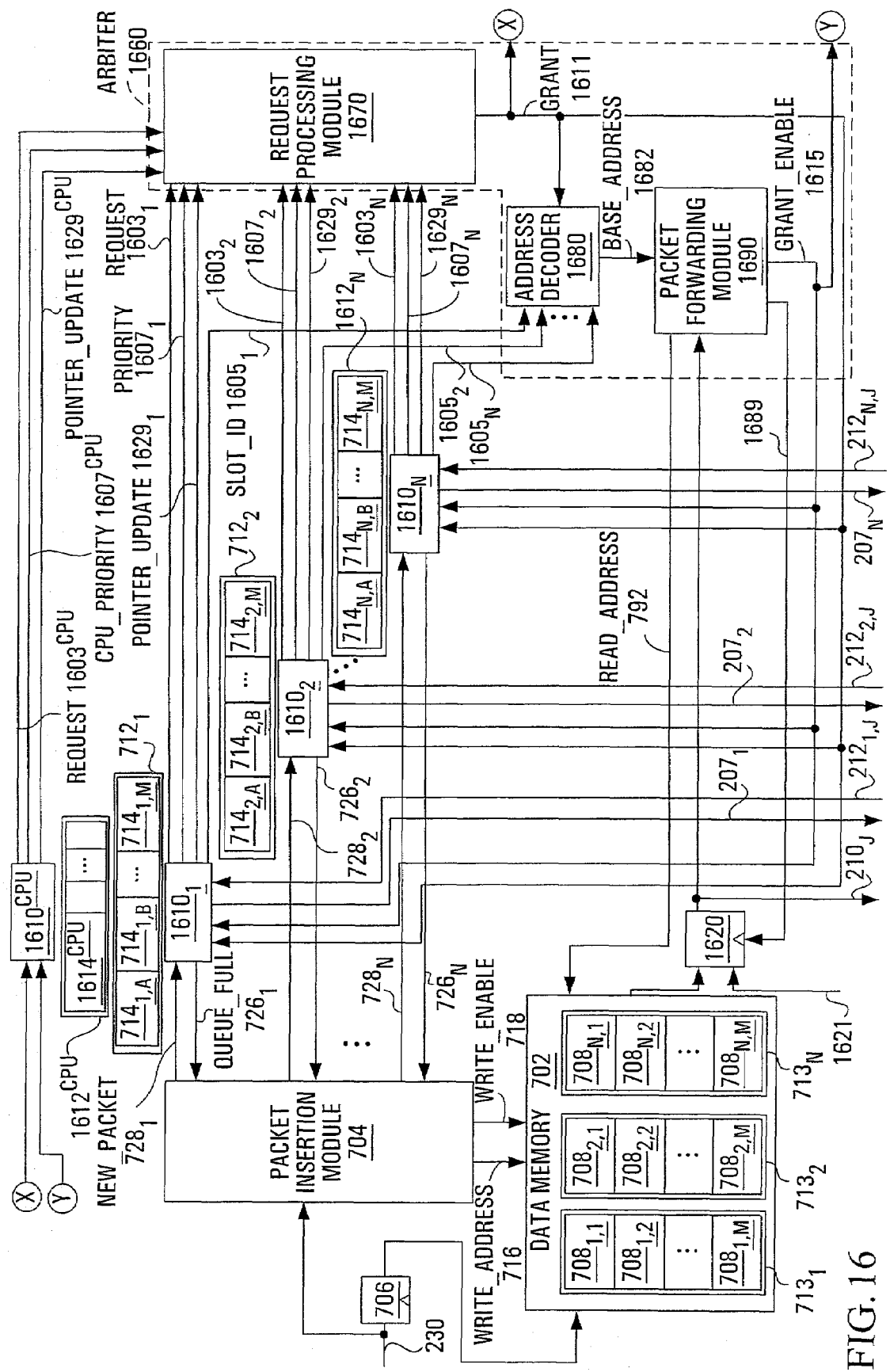
FIG. 16 shows, in schematic form, the transmitter of FIG. 14.

With reference now to FIG. 16, there is shown an example non-limiting implementation of a transmitter 1440 adapted to allow the transmission of system packets and traffic packets along the appropriate forward channel. Without loss of generality, the transmitter 1440 is assumed to reside in cell 1414$_J$ and hence the transmitter 1440 is connected to forward channel 210$_J$ and back channels 212$_{1,J}$, 212$_{2,J}$, ..., 212$_{N,J}$.

The transmitter 1440 receives words from the input interface 116 along the data path 230. The words are fed to the data memory 702 via a plurality of data input ports. The data memory 702 is writable in response to a write address signal and a write enable signal, which are received from a packet insertion module 704 via the write_address line 716 and the write_enable line 718, respectively. The write_address line 716 carries the address in the data memory 702 to which the word presently on the data path 230 is to be written, while the actual operation of writing this word into the specified address is triggered by asserting a signal on the write_enable line 718. In order to coordinate the arrival of packets at the data memory 702 with the generation of signals on the write_address line 716 and the write_enable line 718, the data path 230 may pass through an optional delay element 706 before entering the data input ports of the data memory 702.

The data memory 702 comprises the previously described segments 713, one for each of the N cells on the chip 110. Each of the segments 713 is represented by a corresponding one of a plurality of queue controllers 1610. Queue controller 1610$_j$ has access to an associated control memory 712$_j$ comprising a plurality of entries 714$_{j,A}$, 714$_{j,B}$, ..., 714$_{j,M}$ which store the occupancy status (i.e., occupied or unoccupied) of the respective slots 708$_{j,A}$, 708$_{j,B}$, ..., 708$_{j,M}$ in the $j^{th}$ segment 713$_j$ of the data memory 702. For each slot that is occupied, the corresponding entry also stores the priority level of the packet occupying that slot.

In the manner already described with reference to FIG. 7, the packet insertion module 704 is operable to monitor the EOP bit 368 on each word received via the data path 230 in order to locate the header of newly received packets. Because the EOP bit 368 undergoes a transition (e.g., falling edge) for the word that occurs in a specific position within the packet to which it belongs, detection and monitoring of the EOP bit 368 provides the packet insertion module 704 with an indication as to when a new packet will be received and, since the header 360 is located at the beginning of the packet, the packet insertion module 704 will know when the header 360 of a new packet has been received.

The packet insertion module 704 extracts control information from the header 360 of each received packet. Such information includes the destination cell (or cells) of a received packet and its priority level for the purposes of determining into which slot it should be placed in the data memory 702. This information is obtained by extracting the destination field 362 from the header of the received packet in order to determine the destination cell (or cells) associated with the packet. This automatically determines the segment into which the received packet is to be written. In addition, selection of the particular slot into which the packet belongs is achieved in the manner described with reference to the packet insertion module 704 of FIG. 7, namely, by determining the priority class of the received packet and verifying the availability of the slot(s) associated with that priority class. It is noted that the transmitter 1440 draws no distinction between system packets and traffic packets received from the input interface 116 along the data path 230.

The data memory 702 is also readable in response to a read address supplied by an arbiter 1660 along the read_address line 792. In a manner similar to that already described with reference to the arbiter 760 of FIG. 7, the arbiter 1660 initiates reads from the data memory 702 as a function of requests received from a plurality of queue controllers 1610, 1610$^{CPU}$ via a corresponding plurality of request lines 1603, 1603$^{CPU}$.

A particular one of the request lines 1603$_j$ will be asserted if the corresponding queue controller 1610$_j$ is desirous of forwarding a traffic packet or a system packet to receiver 1450$_j$ in cell 1414$_j$ (possibly even cell 1414$_J$ itself), while request line 1603$^{CPU}$ will be asserted if the CPU queue controller 1610$^{CPU}$ is desirous of forwarding a system packet from the CPU 1400 to receiver 1450$_J$ in one of the cells (possibly even cell 1414$_J$ itself).

The queue controllers 1610 generate requests in a manner similar to that of the queue controllers 710 described previously with respect to FIG. 7. Specifically, queue controller 1610$_j$ is operable to generate a request for transmitting one of the possible multiplicity of packets occupying the slots 708$_{j,A}$, 708$_{j,B}$, ..., 708$_{j,M}$ in the data memory 702. The identity of the slot chosen to be transmitted is provided along a corresponding one of a plurality of slot_id lines 1605$_j$ while the priority associated with the chosen slot is provided on a corresponding one of a plurality of priority lines 1607$_j$.

Queue controller 1610$_j$ implements a function which determines the identity of the occupied slot which holds the highest-priority packet that can be accommodated by the receiver in the destination cell. This function can be suitably implemented by a logic circuit, for example. By way of example, queue controllers 1610$_j$ in the transmitter 1440 in cell 1414$_J$ can be designed to verify the entries in the associated control memory $712_j$ in order to determine, amongst all occupied slots associated with segment $713_j$ in the data memory 702, the identity of the slot holding the highest-priority packet. Queue controller $1610_j$ then assesses the ability of the receiver in the destination cell (i.e., receiver $1450_J$ in cell $1414_j$) to accommodate the packet in the chosen slot by processing information received via the corresponding back channel $212_{j,J}$.

In one embodiment, receiver $1450_J$ in cell $1414_j$ includes a set of M slots similar to the M slots in the j th segment $713_j$ of the data memory 702, but M will be different from M. At least one of these slots will be reserved for accommodating packets destined for the CPU in that cell. The information carried by back channel $212_{j,J}$ in such a case will be indicative of the status (occupied or unoccupied) of each of these M** slots. (Reference may be had to FIGS. 17A and 17B, where the receiver slots not reserved for the CPU are denoted 508 and where the receiver slots reserved for the CPU are denoted 1708. This Figure will be described in greater detail later on when describing the receiver.) Thus, by consulting back channel $212_{j,J}$, queue controller $1610_j$ in cell $1414_j$ has knowledge of whether or not its highest-priority packet can be accommodated by the associated receiver $1450_J$ in cell $1414_j$.

If the highest-priority packet can indeed be accommodated, then queue controller $1610_j$ places the identity of the associated slot on the corresponding slot_id line $1605_j$, places the priority level of the packet on the corresponding priority line $1607_j$ and submits a request to the arbiter 1660 by asserting the corresponding request line $1603_j$. However, if the highest-priority packet cannot indeed be accommodated, then queue controller $1610_j$ determines, among all occupied slots associated with the segment $713_j$ in the data memory 702, the identity of the slot holding the next-highest-priority packet. As before, this can be achieved by processing information received via the corresponding back channel $212_{j,J}$.

If the next-highest-priority packet can indeed be accommodated, then queue controller $1610_j$ places the identity of the associated slot on the corresponding slot_id line $1605_j$, places the priority level of the packet on the corresponding priority line $1607_j$ and submits a request to the arbiter 1660 by asserting the corresponding request line $1603_j$. However, if the next-highest-priority packet cannot indeed be accommodated, then queue controller $1610_j$ determines, among all occupied slots associated with the segment $713_j$ in the data memory 702, the identity of the slot holding the next-next-highest-priority packet, and so on. If none of the packets can be accommodated or, alternatively, if none of the slots are occupied, then no request is generated by queue controller $1610_j$ and the corresponding request line $1603_j$ remains unasserted.

For its part, the CPU queue controller $1610^{CPU}$ is implemented quite differently from the queue controllers 1610. Specifically, the CPU queue controller $1610^{CPU}$ has access to an associated control memory $1612^{CPU}$. The control memory $1612^{CPU}$ comprises one or more entries $1614^{CPU}$ which store the occupancy status (i.e., occupied or unoccupied) of the respective slots in the forward RAM of the CPU 1400. For each slot in the forward RAM that is occupied (by a system packet), the corresponding entry in the control memory $1612^{CPU}$ also stores the priority level and the destination cell of that system packet.

The CPU queue controller $1610^{CPU}$ is operable to generate a request for transmitting a chosen one of the possible multiplicity of system packets occupying the forward RAM of the CPU 1400. Selection of the system packet to be transmitted is based upon the priority level of the packet and on the ability of receiver $1450_J$ in the destination cell to accommodate the chosen system packet. This is achieved by processing information received via the appropriate one of the back channel $212_{j1,J}, 212_{j2,J}, \ldots, 212_{jP,J}$.

This information will indicate whether the receiver in the destination cell has a free slot amongst its slots 508 (reserved for packets not destined for the CPU in that cell) or 708 (reserved for packets destined for the CPU in that cell). It is noted that both types of information are needed, as a system packet generated by the CPU 1400 and temporarily stored in the forward RAM may be destined for the CPU in the destination cell but it might just as easily not be destined for the CPU in the destination cell.

If the CPU queue controller $1610^{CPU}$ finds that the chosen system packet can indeed be accommodated by the receiver in the destination cell, it will make a request to the arbiter 1660. In one embodiment, such request is associated with a priority level identical to that of the system packet to be transmitted. In other embodiments, such request is given a lower priority in view of the fact that it is merely a system packet. In other, fault diagnosis situations, the request to transmit a system packet may be given a relatively high priority. To effect a request to the arbiter 1660, the CPU queue controller $1610^{CPU}$ places the priority level of the request on the cpu_priority line $1607^{CPU}$ and submits a request to the arbiter 1660 by asserting the cpu_request line $1603^{CPU}$.

Assuming that a request is submitted by one of the queue controllers 1610, $1610^{CPU}$ has been granted by the arbiter 1660, queue controllers 1610, $1610^{CPU}$ will be made aware of this fact by the arbiter 1660. This exchange of information can be achieved in many ways. For example, in a manner similar to that previously described with reference to the arbiter 760, the arbiter 1660 may identify the queue controller whose request has been granted by sending a unique code on a grant line 1611 and, when ready, the arbiter 1660 may assert a grant_enable line 1615 shared by the queue controllers 1610, $1610^{CPU}$. The targeted queue controller would thus know that its request has been granted upon (i) detecting a unique code in the signal received from the arbiter via the grant line 1611; and (ii) detecting the asserted grant_enable line 1615.

It should be understood that other ways of signaling and detecting a granted request are within the scope of the present invention. For example, it is feasible to provide a separate grant line to each queue controller, including the CPU queue controller $1610^{CPU}$ and the other queue controllers 1610; when a particular queue controller's request has been granted, the grant line connected to the particular queue controller would be the only one to be asserted. In this case, no grant enable line need be provided.

Upon receipt of an indication that its request has been granted, queue controller $1610_j$ accesses the entry in the control memory $712_j$ corresponding to the slot whose packet now faces an imminent exit from the data memory 702 under the control of the arbiter 1660. Specifically, queue controller $1610_j$ changes the status of that particular slot to "unoccupied", which will alter the result of the request computation logic, resulting in the generation of a new request that may specify a different slot. The changed status of a slot will also be reflected in the information subsequently provided upon request to the packet insertion module 704 via the corresponding queue_full line $726_j$.

On the other hand, upon receipt of an indication that its request has been granted, the CPU queue controller $1610^{CPU}$ accesses the entry $1614^{CPU}$ in the control memory $1612^{CPU}$ corresponding to the system packet to be transmitted. Specifically, the CPU queue controller $1610^{CPU}$ changes the status of that particular slot to "unoccupied", which will alter the result of the request computation logic, resulting in the generation of a new request that may specify a different slot.

Meanwhile, the CPU queue controller $1610^{CPU}$ places the system packet in the corresponding slot in the forward RAM of the CPU 1400 onto an output line 1621. Output line 1621 is multiplexed, at a multiplexer 1620, with the data exiting the data memory 702. The multiplexer 1620 is controlled by a signal on a select line 1689 which indicates whether or not the CPU queue controller $1610^{CPU}$ has been granted. This could be via a bit on the grant line 1611. That is to say, the state of the grant line 1611 may regulate whether the packet being sent along forward channel $210_J$ is taken from the data memory 702 or from the CPU queue controller $1610_{CPU}$.

Also upon receipt of an indication that its request has been granted, the target queue controller $1610_j$, $1610^{CPU}$ asserts a corresponding pointer_update line $1629_j$, $1629^{CPU}$, which returns back to the arbiter 1660. As will be described later on in connection with the arbiter 1660, assertion of one of the pointer_update lines $1629_j$, $1629^{CPU}$ indicates to the arbiter 1660 that the grant it has issued has been acknowledged, allowing the arbiter 1660 to proceed with preparing the next grant, based on a possibly new request from the target queue controller and on pending requests from the other queue controllers.

The arbiter 1660 is now described with continued reference to FIG. 16. The function of the arbiter 1660 is to grant one of the requests received from the various queue controllers 1610, $1610^{CPU}$ and to consequently control read operations from the data memory 702 and from the forward RAM in the CPU 1400. To this end, the arbiter 1660 comprises a request-processing module 1670, an address decoder 1680 and the above-mentioned packet-forwarding module 1690. The arbiter 1660 may be similar to the arbiter 760 previously described with reference to FIG. 4, with some differences in the implementation of the request-processing module 1670, the address decoder 1680 and the packet-forwarding module 1690.

The request-processing module 1670 receives the request lines 1603, $1603^{CPU}$, the priority lines 1605, $1605^{CPU}$ and the pointer_update lines 1629, $1629^{CPU}$ from the queue controllers 1610, $1610^{CPU}$, respectively. The request-processing module 1670 functions to grant only one of the possibly many requests received from the queue controllers 1610, $1610^{CPU}$ along the request lines 1603, $1603^{CPU}$. The request-processing module 1670 has an output which is the grant line 1611. The grant line 1611 is connected to each of the queue controllers 1610, $1610^{CPU}$ as well as to the address decoder 1680. In one embodiment of the present invention, the grant line 1611 utilizes a unique binary code to identify the queue controller whose request has been granted.

The address decoder 1680 receives the grant line 1611 from the request-processing module 1670 and the slot_id lines 1605 from the queue controllers 1610, respectively. If the grant line 1611 identifies a queue controller 1610 that is not the CPU queue controller $1610^{CPU}$, then the address decoder 1680 computes, as a function of the slot specified on the appropriate slot_id line, a base address in the data memory 702 that stores the first word of the packet for which a request for transmission has been granted. The base address is provided to the packet-forwarding module 1690 via a base_address line 1682.

However, if the grant line 1611 identifies the CPU queue controller $1610^{CPU}$, then a base address computation is not required, since the CPU queue controller $1610^{CPU}$ itself determines which system packet to transmit.

The packet-forwarding module 1690 is operable to wait until it has finished placing the current packet onto the forward channel $210_J$ before placing the next packet onto the forward channel $210_J$. After it has finished placing the current packet onto the forward channel $210_J$, the packet-forwarding module 1690 consults the grant line 1611. If it indicates that the granted queue controller is not the CPU queue controller $1610_{CPU}$, then the packet-forwarding module 1690 stores the initial address on the base_address line 1682, asserts the grant_enable line 1615 and proceeds to read from the data memory 702 starting from the initial address. In addition, the packet-forwarding module 1690 controls the multiplexer 1620 via the select line 1689 so that it admits words coming from the data memory 702 and blocks words coming from the forward RAM of the CPU 1400.

If, on the other hand, the grant line 1611 indicates that the granted queue controller is the CPU queue controller $1610_{CPU}$, then the packet-forwarding module 1690 asserts the grant_enable line 1615 and initiates a read operation from the forward RAM in the CPU 1400. In addition, the packet-forwarding module 1690 controls the multiplexer 1620 via select line 1689 so that it admits words coming from the forward RAM of the CPU 1400 and blocks words coming from the data memory 702.

At a given receiver, all received packets along the corresponding forward channel which are either traffic packets or system packets not destined for the CPU are processed as previously described with reference to the receiver of FIG. 5. However, the way in which system packets whose destination cell corresponds to the cell in which the receiver is located and which are specifically destined for the CPU 1400 in the destination cell are processed differently and hence it is necessary to modify the receiver previously described with reference to FIG. 5.

Figure 17A:
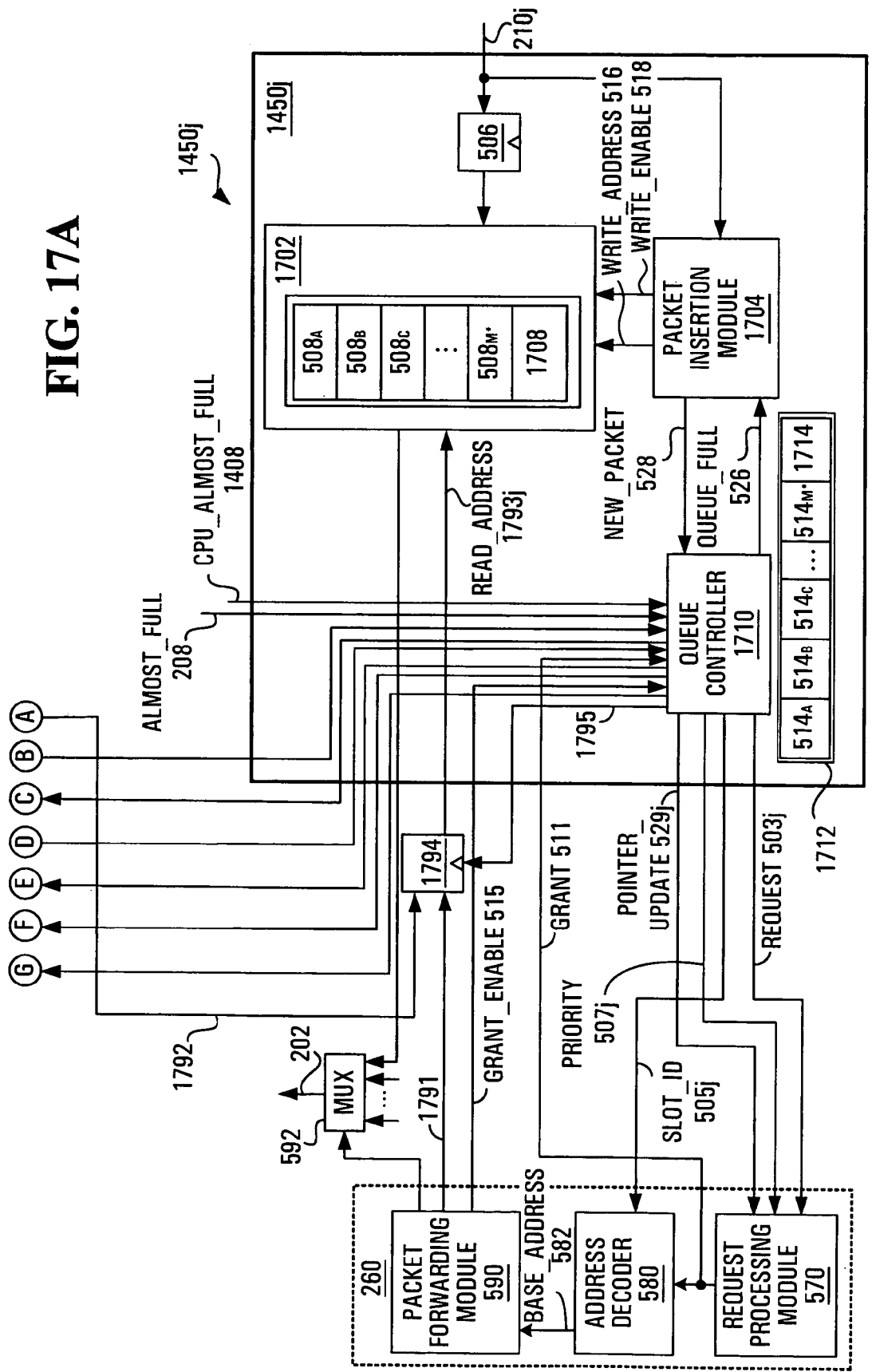
FIGS. 17A and 17B show, in schematic form, a receiver of FIG. 14.
Figure 17B:
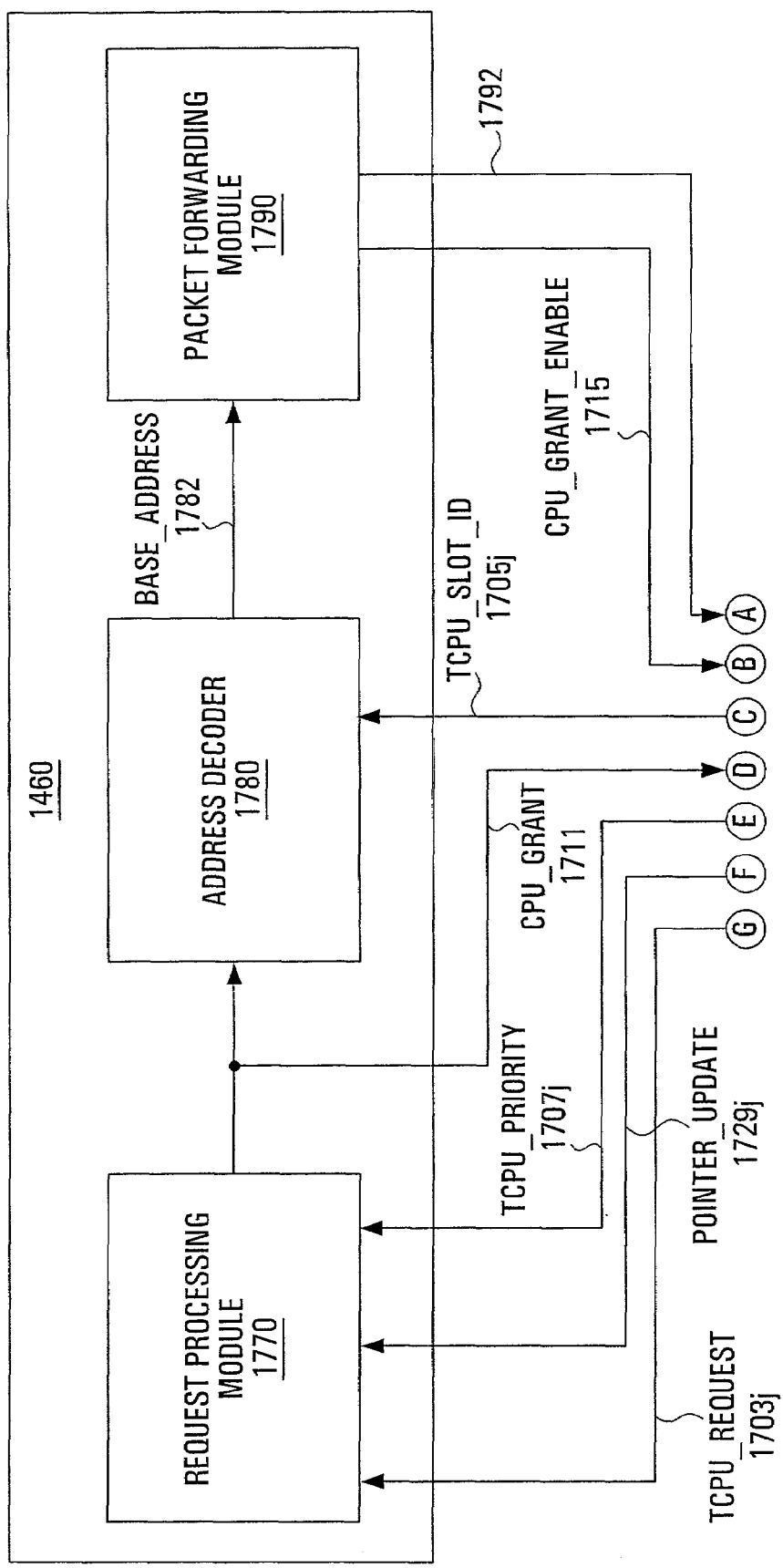

To this end, FIGS. 17A and 17B show a receiver $1450_j$ adapted to process system packets received via forward channel $210_j$. The receiver $1450_j$ has a memory which includes various storage areas, including a data memory 1702, a control memory 1712, any memory used by a queue controller 1710 and any other memory used by the receiver $1450_j$.

Received cells are fed to the data memory 1702 via a plurality of data input ports. The data memory 1702 is writable in response to a write address and a write enable signal received from a packet insertion module 1704 via the previously described write_address line 516 and a write_enable line 518, respectively. The write_address line 516 carries the address in the data memory 1702 to which the word presently on the forward channel $210_j$ is to be written, while the actual operation of writing this word into the specified address is triggered by asserting a signal on the write_enable line 518. In order to coordinate the arrival of packets at the data memory 1702 with the generation of signals on the write_address line 516 and the write_enable line 518, the forward channel $210_j$ may pass through the previously described optional delay element 506 before entering the data input ports of the data memory 1702.

The data memory 1702 contains M slots 508, 1708**, including the M* previously described slots $508_A$, $508_B$, ..., $508_{M*}$, as well as one or more additional slots 1708, where each slot is large enough to accommodate a packet as described herein above. Slots $508_A$, $508_B$, ... and $508_{M*}$ are reserved for packets destined for the off-chip input queue 228 and slot(s) 1708 are reserved for system packets destined for the CPU 1400. In one specific embodiment of the invention, the data memory 1702 includes four slots 508$_A$, 508$_B$, 508$_C$, 1708, where slot 508$_A$ may be associated with a high priority class, slot 508$_B$ may be associated with a medium priority class, slot 508$_C$ may be associated with a low priority class and slot 1708 may be associated with a system packet of any priority destined for the CPU 1400.

The queue controller 1710 in receiver 1450$_j$ has access control memory 1712, which comprises a plurality of entries 514$_A$, 514$_B$, ..., **514$_{M^*}$, 1714 for storing the occupancy status (i.e., occupied or unoccupied) of the respective slots 508$_A$, 508$_B$, ..., 508$_{M^*}$, 1708 in the data memory 1702. In addition, for each of the slots 508, 1708 that is occupied, the corresponding entry stores the priority level of the packet occupying that slot. In one embodiment, the entries 514$_A$, 514$_B$, ..., 514$_{M^*}$, 1714 may take the form of registers, for example. In other embodiments, the fill level or vacancy status may be stored by the control memory 1712**.

The packet insertion module 1704 is operable to monitor the EOP bit 368 on each word received via the forward channel 210$_j$ in order to locate the header of newly received packets. It is recalled that the EOP bit 368 undergoes a transition (e.g., falling edge) for the word that occurs in a specific position within the packet to which it belongs. In this way, detection and monitoring of the EOP bit 368 provides the packet insertion module 1704 with an indication as to when a new packet will be received and, since the header 360 is located at the beginning of the packet, the packet insertion module 1704 will know where to find the header 360 of a newly received packet.

The packet insertion module 1704 extracts control information from the header 360 of each newly received packet. Such information includes the destination of a newly received packet and an indication as to whether the received packet is a system packet that is destined for the CPU 1400. The packet insertion module 1704 accepts packets destined for which the destination cell is cell 114$_j$ and ignores packets for which the destination cell is not cell 114$_j$. The packet insertion module 1704 also determines the slot into which a received and accepted packet should be inserted.

In the case of a received packet being a system packet, such packet will not require special treatment unless the TCPU field in the header of the packet is set. If the TCPU field in the header of a system packet is indeed set, then the received packet needs to be placed into the slot reserved for system packets, which would be slot 1708 in the above example. On the other hand, if the TCPU field 1810 in the header 1860 of a system packet 1850 is not set (i.e., if only the FCPU 1820 field of the system packet is set), then the receiver 1450$_j$ is to treat such system packet like a traffic packet.

The header 360 of a traffic packet 350 will indicate the priority level of the packet for the purposes of determining into which slot it should be placed in the data memory 1702. The packet insertion module 1704 is operable to determine the priority class of the packet by comparing the priority level of the packet to the previously defined priority thresholds. By way of example, as suggested herein above, let slots 508$_A$, 508$_B$, ..., 508$_C$ be associated with high, medium, and low priority levels, respectively. Also, let the low-medium priority threshold and the medium-high priority threshold be established as previously defined, namely, at 100 and 200, respectively. If the priority level of the received packet is 12, for example, then the slot into which it should be written would be slot 508$_C$.

In this embodiment, the packet insertion module 1704 knows that it can write the received traffic packet into slot 508$_C$ because, it will be recalled, the packet could only be transmitted on the forward channel 210$_j$ if the corresponding slot were available in the first place. Nonetheless, it is within the scope of the present invention to include larger numbers of slots where more than one slot would be associated with a given priority class, which may require the packet insertion module 1704 to verify the occupancy of the individual slots 508 by consulting the queue_full line 526 (previously described) received from the queue controller 1710.

Next, the packet insertion module 1704 determines a corresponding base address in the data memory 1702 into which the first word of the packet is to be written. This may be done either by computing an offset which corresponds to the relative position of the chosen slot or by consulting a short lookup table that maps slots to addresses in the data memory 1702.

The packet insertion module 1704 is operable to provide the base address to the data memory 1702 via the write_address line 516 and is further operable to assert the write_enable line 518. At approximately the same time, the packet insertion module 504 sends a signal to the queue controller 1710 along the new_packet line 528 (previously described with reference to FIG. 5), such signal being indicative of the identity of the slot which is being written to and the priority level of the packet which shall occupy that slot. The queue controller 1710 is adapted to process this signal by updating the status and priority information associated with the identified slot (which was previously unoccupied).

After the first word of the received packet is written to the above-determined base address of the data memory 1702, the address on the write_address line 516 is then incremented at each clock cycle (or at each multiple of a clock cycle) as new words are received along the forward channel 210$_j$. This will cause the words of the packet to fill the chosen slot in the data memory 1702. Meanwhile, the EOP bit 368 in each received word is monitored by the packet insertion module 1704. When a new packet is detected, the above process re-starts with extraction of control information from the header 360 of the newly received packet.

In addition to being writable, the data memory 1702 is also readable in response to receipt of a read address supplied along a corresponding read_address line 1793$_j$. In some embodiments where higher switching speeds are desirable, dual ported RAM may be used to allow simultaneous reading and writing, although a single-ported RAM could be used in order to reduce chip real estate. The read_address line 1793$_j$ is the output of a 1×2 demultiplexer 1794 which is controlled by a control signal received from the queue controller 1710 via a control line 1795. The demultiplexer 1794 also has two data inputs, one of which (denoted 1791) stems from an arbiter 260 and another of which (denoted 1792) stems from an arbiter 1760.

The arbiter 260 operates as previously described, i.e., it initiates reads from the data memory 1702 as a function of requests received from the queue controller 1710 in each of the receivers 1450 via the corresponding plurality of request lines 503 (previously described). A particular request line 503$_j$ will be asserted if the queue controller 1710 in the corresponding receiver 1450$_j$ is desirous of forwarding a packet to the off-chip input queue 228. In a similar fashion, the arbiter 1760 initiates reads from the data memory 1702 as a function of requests received from the queue controller 1710 in each of the receivers 1450 via a corresponding plurality of tcpu_request lines 1703. A particular tcpu_request line 1703$_j$ will be asserted if the queue controller 1710 in the corresponding receiver 1450$_j$ is desirous of putting a system packet into the insert RAM of the CPU 1400.

The two arbiters 260, 1760 operate in parallel and can concurrently process two different requests from two different receivers 1450. However, the queue controller 1710 in each of the receivers 1450 only allows one granted request to be processed at any given time. To enable this functionality, the following provides one possible implementation of the queue controller 1710 in receiver 1450$_j$ which is adapted to generate up to two requests for the transmission of two packets, one for off-chip transmission of one from one of the slots 508$_A$, 508$_B$, ..., 508$_{M^*}$ in the data memory 1702 and one for CPU-bound transmission of one of the packets occupying the slot(s) 1708.

In the case of the request to the arbiter 260, the identity of the slot chosen to be transmitted is provided along a corresponding slot_id line 505$_j$, while the priority associated with the chosen slot is provided on a corresponding priority line 507$_j$. Specifically, the queue controller 1710 implements a function which verifies the entries in the control memory 1712 in order to determine the identity of the occupied slot which holds the highest-priority packet that can be accommodated by the off-chip input queue 228. This function can be suitably implemented by a logic circuit, for example. By way of example, the queue controller 1710 is designed to determine, amongst all occupied slots amongst slots 508 in the data memory 1702, the identity of the slot holding the highest-priority packet. The queue controller 1710 then assesses the ability of the off-chip input queue 228 to accommodate that packet by processing information received via the almost_full flag 208.

If the almost_full flag 208 is asserted, then it may be desirable to refrain from requesting the transmittal of further packets to the off-chip input queue 228. In some embodiments of the invention, the almost_full flag 208 may consist of a plurality of almost_full flags, one for each priority class (high, medium, low). This allows preferential treatment for high-priority packets by setting the occupancy threshold for asserting the high-priority almost_full flag higher than the threshold for asserting the low-priority almost_full flag.

If the highest-priority packet can indeed be accommodated, then the queue controller 1710 places the identity of the associated slot on the corresponding slot_id line 505$_j$, places the priority level of the packet on the corresponding priority line 507$_j$ and submits a request to the arbiter 260 by asserting the corresponding request line 503$_j$. However, if the highest-priority packet cannot indeed be accommodated, then the queue controller 1710 determines, among all occupied slots in the data memory 1702, the identity of the slot holding the next-highest-priority packet. As before, this can be achieved by processing information received via the almost_full flag 208.

If the next-highest-priority packet can indeed be accommodated, then queue controller 1710 places the identity of the associated slot on the corresponding slot_id line 505$_j$, places the priority level of the packet on the corresponding priority line 507$_j$ and submits a request to the arbiter 260 by asserting the corresponding request line 503$_j$. However, if the next-highest-priority packet cannot indeed be accommodated, then the queue controller 1710 determines, among all occupied slots in the data memory 1702, the identity of the slot holding the next-next-highest-priority packet, and so on. If none of the packets can be accommodated or, alternatively, if none of the slots are occupied, then no request is generated by the queue controller 1710 and the corresponding request line 503$_j$ remains unasserted.

In the case of the request to the arbiter 1460, the identity of the slot chosen to be transmitted is provided along a corresponding tcpu_slot_id line 1705$_j$, while the priority associated with the chosen slot is provided on a corresponding tcpu_priority line 1707$_j$. There may be only one slot 1708 for holding packets destined for the insert RAM of the CPU 1400, in which case the queue controller 1710 implements a function which verifies whether this slot is occupied and whether the slot can be accommodated by the CPU 1400. This function can be suitably implemented by a logic circuit, for example. The ability of the CPU 1400 to accommodate a received packet can be assessed by way of the cpu_almost_full flag 1408.

If the cpu_almost_full flag 1408 is asserted, then it may be desirable to refrain from requesting the transmittal of further packets to the CPU 1400. On the other hand, if the cpu_almost_full flag 1408 is not asserted, then the queue controller 1710 places the identity of slot 1708 on the corresponding tcpu_slot_id line 1705$_j$, places the priority level of the packet on the corresponding tcpu_priority line 1707$_j$ and submits a request to the arbiter 1760 by asserting the corresponding tcpu_request line 1703$_j$.

Now, assume that a request submitted by the queue controller 1710 has been granted. If this granted request had been submitted to the arbiter 260, the latter may identify the receiver containing the queue controller whose request has been granted by sending a unique code on a common grant line 511 and, when ready, the arbiter 260 may assert a grant_enable line 515 shared by the queue controller 1710 in each of the receivers 1450. The queue controller 1710 may thus establish that its request has been granted by (i) detecting a unique code in the signal received from the arbiter 260 via the grant line 511; and (ii) detecting the asserted grant_enable line 515.

In a similar fashion, if the granted request had been submitted to the arbiter 1460, the latter may identify the receiver containing the queue controller whose request has been granted by sending a unique code on a common cpu_grant line 1711 and, when ready, the arbiter 1460 may assert a cpu_grant_enable line 1715 shared by the queue controller 1710 in each of the receivers 1450. The queue controller 1710 may thus establish that its request has been granted by (i) detecting a unique code in the signal received from the arbiter 1460 via the cpu_grant line 1711; and (ii) detecting the asserted cpu_grant_enable line 1715.

Upon receipt of an indication that either or both of its requests have been granted, the queue controller 1710 processes at most one of these. In one embodiment, a granted request to arbiter 260 has priority over a granted request to arbiter 1460. Depending on which granted request is accepted, the queue controller 1710 reacts differently.

Firstly, regardless of whether the granted request was to arbiter 260 or arbiter 1460, the queue controller 1710 accesses the entry in the control memory 1712 corresponding to the slot whose packet now faces an imminent exit from the data memory 1702 under the control of the arbiter 260. Specifically, the queue controller 1710 changes the status of that particular slot to "unoccupied", which will alter the result of the request computation logic, resulting in the generation of a new request which may specify a different slot. In the case where the packet insertion module 1704 needs to know the status of a slot, the changed status of a slot will be reflected in the information provided via the queue_full line 526.

In the specific case where a granted request to arbiter 260 is accepted, the queue controller 1710 asserts the corresponding pointer_update line 529$_j$ (previously described) which runs back to the arbiter 260. Assertion of one of the pointer_update lines 529$_j$ indicates to the arbiter 260 that the grant it has issued has been acknowledged, allowing the arbiter 260 to proceed with preparing the next grant, based on a possibly new request from the queue controller 1710 in receiver 1450$_j$ and on pending requests from queue controllers in other ones of the receivers 1450. Additionally, the queue controller 1710 controls the signal on the control line 1795 leading to the multiplexer 1794 so that the address provided along the read_address line 1793$_j$ is the read address output by arbiter 260.

In the specific case where a granted request to arbiter 1460 is accepted, the queue controller 1710 asserts a corresponding pointer_update line 1729$_j$ which runs back to the arbiter 1460. Assertion of one of the pointer_update lines 1729$_j$ indicates to the arbiter 1460 that the grant it has issued has been acknowledged, allowing the arbiter 1460 to proceed with preparing the next grant, based on a possibly new request from the queue controller 1710 in receiver 1450$_j$ and on pending requests from queue controllers in other ones of the receivers 1450. Additionally, the queue controller 1710 controls the signal on the control line 1795 leading to the multiplexer 1794 so that the address provided along the read_address line 1793$_j$ is the read address output by arbiter 1460.

The function of the arbiter 260 is to receive a request from the queue controller 1710 in each of the receivers 1450, to grant only one of the requests and to control read operations from the data memory 1702. To this end, the arbiter 260 comprises a request-processing module 570, an address decoder 580 and a packet-forwarding module 590. The arbiter 260 is identical to the arbiter 260 previously described with reference to FIG. 5 and therefore no further description is necessary.

Similarly, the function of the arbiter 1460 is to receive a request from the queue controller 1710 in each of the receivers 1450, to grant only one of the requests and to control read operations from the data memory 1702. To this end, the arbiter 1460 comprises a request-processing module 1770, an address decoder 1780 and a packet-forwarding module 1790. The arbiter 1460 is very similar to the arbiter 260 previously described with reference to FIG. 5, with a minor variation in the implementation of the address decoder 1780.

Specifically, the address decoder 1780 receives the cpu_grant line 1711 from the request-processing module 1770 but and the slot_id lines 1705 from the queue controllers 1710 in the various receivers 1450. The address decoder 1780 computes a base address in the data memory 1702 that stores the first word of the system packet for which transmission has been granted. The base address is computed as a function of the code specified on the cpu_grant line 1711. The base address is provided to the packet-forwarding module 1790 via a base_address line 1782.

Of course, those skilled in the art will appreciate that cells could be adapted in order to provide both multicast functionality and system packet transmission/reception functionality.

Moreover, as used herein, the term "memory" should be understood to refer to any data storage capability, either distributed, or in one single block.

While specific embodiments of the present invention have been described and illustrated, it will be apparent to those skilled in the art that numerous modifications and variations can be made without departing from the scope of the invention as defined in the appended claims.

The invention claimed is:

1. A switch fabric implemented on a chip, comprising:
   a) an array of cells;
   b) an I/O interface in communication with said array of cells for permitting exchange of data packets between said array of cells and components external to said array of cells;
   c) each cell communicating with a plurality of other cells of said array permitting exchange of data packets between the cells of said array;
   d) each cell including:
      I) a memory for receiving a data packet from another cell of said array;
      II) a control entity to control release of a data packet toward a selected destination cell from among the plurality of other cells of said array at least in part on a basis of a degree of occupancy of the memory in said destination cell;
      III) a transmitter in communication with said I/O interface and in direct communication with every cell from among the plurality of other cells of said array, said transmitter operative to process a data packet received from said I/O interface to determine a destination of the data packet and forward the data packet to at least one cell from among the plurality of other cells of said array selected on a basis of the determined destination;
      IV) a plurality of receivers associated with respective cells from said array, each receiver being in direct communication with a respective cell allowing the respective cell to forward data packets to the receiver; said receivers in communication with said I/O interface for releasing data packets to said I/O interface.

2. A switch fabric as defined in claim 1, wherein said array of cells includes a plurality of data channels, each data channel being associated with a given cell, the data channel associated with said given cell directly connecting the transmitter of said given cell to receivers in cells other than said given cell and associated with said given cell.

3. A switch fabric as defined in claim 1, wherein said array of cells includes a plurality of data channels, each data channel being associated with a given cell, the data channel associated with said given cell directly connecting the transmitter of said given cell to a receiver in every cell of said array of cells and associated with said given cell.

4. A switch fabric as defined in claim 3, wherein the plurality of data channels are independent from one another, wherein transmission of a data packet over one data channel is made independently of a transmission of a data packet over another data channel.

5. A switch fabric as defined in claim 4, wherein each data channel performs a parallel data transfer.

6. A switch fabric as defined in claim 1, wherein said array of cells forms a matrix.

7. A switch fabric as defined in claim 6, wherein said matrix is bi-dimensional.

8. A switch fabric as defined in claim 6, wherein said matrix is three-dimensional.

9. A switch fabric as defined in claim 1, wherein said array of cells forms a toroidal mesh arrangement.

10. A switch fabric as defined in claim 1, wherein said memory is a first memory and wherein the transmitter of said given cell includes a second memory for storing data packets received from said I/O interface.

11. A switch fabric as defined in claim 10, wherein said second memory includes a plurality of segments, each segment being associated with a receiver in a cell of said array to which the transmitter of said given cell is capable of forwarding a data packet via the data channel.

12. A switch fabric as defined in claim 11, wherein the transmitter of said given cell includes said control entity, said control entity being operative to process a data packet forwarded from said I/O interface to determine a cell of said array to which the data packet is destined and identify on a basis of the determined cell a segment of said second memory into which the packet is to be loaded.

13. A switch fabric as defined in claim 12, wherein said control entity includes a plurality of queue controllers associated with respective segments of said second memory.

14. A switch fabric as defined in claim 13, wherein said second memory implements a plurality of registers, each register being associated with a queue controller and being suitable for holding data representative of a degree of occupancy of a segment of said second memory associated with the queue controller.

15. A switch fabric as defined in claim 14, wherein a data packet received by said transmitter from said I/O interface is characterized by a priority level selected in a group of priority levels, each segment of said second memory being partitioned into slots, each slot capable of storing at least one data packet, each slot being associated with a given priority level of said group of priority levels.

16. A switch fabric as defined in claim 15, wherein the registers of said second memory associated with each queue controller store data indicative of a degree of occupancy of the slots of said segment associated with the queue controller, for each priority level of the group of priority levels.

17. A switch fabric as defined in claim 12, wherein said first memory is divided into a plurality of sectors associated with respective ones of said receivers, said sectors capable of storing data packets forwarded to said receivers by cells of said array, said control entity being operative to communicate with each receiver associated with said given cell to assess a degree of occupancy of the sector of each receiver associated with said given cell.

18. A switch fabric as defined in claim 17, wherein said control entity communicates with each receiver associated with said given cell to assess the degree of occupancy of the sector of each receiver associated with said given cell, over a back channel.

19. A switch fabric as defined in claim 18, including a plurality of back channels, there being a dedicated back channel between said control entity and each receiver associated with said given cell.

20. A switch fabric as defined in claim 19, wherein each back channel transfers data serially.

21. A switch fabric as defined in claim 18, wherein said second memory includes an area for storing data indicative of the degree of occupancy of the sector of each receiver associated with said given cell.

22. A switch fabric as defined in claim 21, wherein said control entity is operative to process the data indicative of the degree of occupancy of the sector of each receiver associated with said given cell to determine which data packet stored in said second memory is suitable for transmission to a receiver.

23. A switch fabric as defined in claim 22, wherein when said control entity determines that a data packet is suitable for transmission, said control entity generates a control signal to request transmission of the data packet.

24. A switch fabric as defined in claim 23, wherein when said control entity determines that a plurality of data packets are suitable for transmission, said control entity generates a plurality of control signals to request transmission of the data packets, each control signal being associated with a data packet.

25. A switch fabric as defined in claim 24, wherein said control entity includes an arbiter for processing said control signals to select a data packet to transmit among the plurality of data packets suitable for transmission.

26. A switch fabric as defined in claim 25, wherein a data packet is characterized by a priority level, wherein each control signal conveys the priority level of the data packet associated with the control signal.

27. A switch fabric as defined in claim 26, wherein said arbiter selects a data packet to transmit among the plurality of data packets suitable for transmission on a basis of the priority levels of the plurality of data packets suitable for transmission.

28. A switch fabric as defined in claim 27 wherein said arbiter processes control signals to request transmission of data packets in a round robin manner.

29. A switch fabric as defined in claim 28, wherein said arbiter selects a data packet to transmit among the plurality of data packets suitable for transmission on a basis of the priority levels of the plurality of data packets suitable for transmission and on the basis of whether or not a data packet was previously submitted for transmission.

30. A switch fabric as defined in claim 17, wherein each receiver of said plurality of receivers communicates with said I/O interface.

31. A switch fabric as defined in claim 30, wherein said control entity is a first control entity and wherein said plurality of receivers include a second control entity to regulate a release of data packets from said sectors to said I/O interface.

32. A switch fabric as defined in claim 31, wherein said second control entity includes a plurality of queue controllers associated with respective sectors of said first memory.

33. A switch fabric as defined in claim 32, wherein a data packet received by a receiver of said plurality of receivers is characterized by a priority level selected in a group of priority levels, each sector of said second memory being divided into subdivisions, each subdivision capable of storing at least one data packet, each subdivision being associated with a given priority level of said group of priority levels.

34. A switch fabric as defined in claim 33, wherein said second control entity includes an arbiter in communication with said queue controllers, each queue controller operative to transmit a control signal to said arbiter for each data packet held in the sector associated with the queue control to request release of the data packet to said I/O interface.

35. A switch fabric as defined in claim 34, wherein each control signal conveys the priority level of the data packet associated with the control signal.

36. A switch fabric as defined in claim 35, wherein said arbiter selects a data packet for release to said I/O interface among the data packets corresponding to the control signals transmitted to said arbiter on the basis of the levels of priority of the data packets corresponding to the control signals transmitted to said arbiter.

37. A switch fabric as defined in claim 1, wherein each data packet comprises a plurality of words including a first word of said data packet and a last word of said data packet, wherein each word comprises a field indicative of whether said word is a pre-determined number of words away from said last word of said data packet.

38. A switch fabric as defined in claim 37, wherein the transmitter is operative to monitor said field in each word of each data packet forwarded to at least one cell of said array, the transmitter further being operative to begin forwarding a next data packet upon detecting that said field of a word in a packet currently being forwarded is indicative of said word being a pre-determined number of words away from the last word of said data packet currently being forwarded.

39. A switch fabric as defined in claim 1, each cell further including a central processing unit (CPU) connected to the transmitter, said transmitter being further operative to process a data packet received from said CPU to determine a destination of the data packet and forward the data packet to at least one cell of said array selected on the basis of the determined destination.

40. A switch fabric as defined in claim 2, each cell further including a central processing unit (CPU) connected to the transmitter, said transmitter being further operative to process a data packet received from said CPU to determine a destination of the data packet and forward the data packet to at least one cell of said array selected on the basis of the determined destination, wherein data packets received by the transmitter in a given cell from the I/O interface and from the CPU in said given cell share the data channel associated with said given cell.

41. A switch fabric as defined in claim 1, each cell further including a central processing unit (CPU) connected to the plurality of receivers, said receivers being further operative to determine whether data packets are to be released to the I/O interface or to the CPU and release said data packets accordingly.

42. A switch fabric as claimed in claim 41, wherein each data packet comprises a field indicative of whether the data packet is destined for a CPU and wherein said receivers are operative to determine whether data packets are to be released to the I/O interface or to the CPU on the basis of said field.

43. A switch fabric as defined in claim 24, each cell further including a central processing unit (CPU) connected to the plurality of receivers, wherein said control entity includes a first arbiter for processing said control signals to select a data packet to transmit to the I/O interface among the plurality of data packets suitable for transmission to the I/O interface, wherein said control entity includes a second arbiter for processing said control signals to select a data packet to transmit to the CPU among the plurality of data packets suitable for transmission to the CPU.

* * * * *